(12) United States Patent
Tanaka et al.

(10) Patent No.: US 8,222,776 B2
(45) Date of Patent: Jul. 17, 2012

(54) ROTATION DETECTOR AND DIRECT-CURRENT MOTOR

(75) Inventors: Ken Tanaka, Nukata-gun (JP); Tsutomu Nakamura, Kariya (JP); Kenji Takeda, Okazaki (JP); Masaru Touge, Kariya (JP); Yasuhiro Fukagawa, Obu (JP)

(73) Assignee: Denso Corporation, Kariya (JP)

( * ) Notice: Subject to any disclaimer, the term of this patent is extended or adjusted under 35 U.S.C. 154(b) by 386 days.

(21) Appl. No.: 12/535,968

(22) Filed: Aug. 5, 2009

(65) Prior Publication Data

US 2010/0033064 A1 Feb. 11, 2010

(30) Foreign Application Priority Data

Aug. 6, 2008 (JP) .................................. 2008-203112
Jun. 12, 2009 (JP) .................................. 2009-141437

(51) Int. Cl.
*H02K 11/00* (2006.01)

(52) U.S. Cl. ....................................... 310/67 R; 310/179

(58) Field of Classification Search .......... 310/158–165, 310/177–182, 233, 67 R; 318/490
See application file for complete search history.

(56) References Cited

U.S. PATENT DOCUMENTS

| 3,638,098 A | 1/1972 | Guggi | |
| 4,590,635 A * | 5/1986 | Tucker et al. ................. | 15/50.1 |
| 7,560,887 B2 * | 7/2009 | Pierret et al. .................. | 318/490 |
| 2003/0075998 A1 * | 4/2003 | Edelson ....................... | 310/68 R |
| 2010/0072933 A1 * | 3/2010 | Wuerstlein et al. ........... | 318/490 |

FOREIGN PATENT DOCUMENTS

| DE | 196 24 355 | 1/1998 |
| JP | 61-247260 | 11/1986 |
| JP | 03-270662 | 12/1991 |
| JP | 6-47865 | 6/1994 |
| JP | 2000-055998 | 2/2000 |
| JP | 2003-111465 | 4/2003 |
| JP | 2006-197754 | 7/2006 |

OTHER PUBLICATIONS

German Office Action dated Feb. 11, 2011, issued in corresponding German Application No. 10 2009 036 274.6-32 with English Translation.

* cited by examiner

*Primary Examiner* — Quyen Leung
*Assistant Examiner* — Naishadh Desai
(74) *Attorney, Agent, or Firm* — Nixon & Vanderhye P.C.

(57) ABSTRACT

A power supply unit superimposes alternating-current voltage on direct-current voltage and applies it to a motor. As a result, when the motor is rotated, a current containing an alternating-current component flows. Further, the motor includes a capacitor connected in parallel with one phase coil. Owing to this capacitor, the impedance of the motor circuit between brushes is varied according to the rotation of the motor. Variation in impedance appears as variation in the amplitude of the alternating-current component in motor current. A signal processing unit extracts an alternating-current component from the motor current detected by the current detection unit and generates a rotation pulse corresponding to variation in the amplitude. A rotation angle detection unit detects the rotation angle of the motor based on this rotation pulse.

23 Claims, 30 Drawing Sheets

FIG. 30A
FIG. 30B
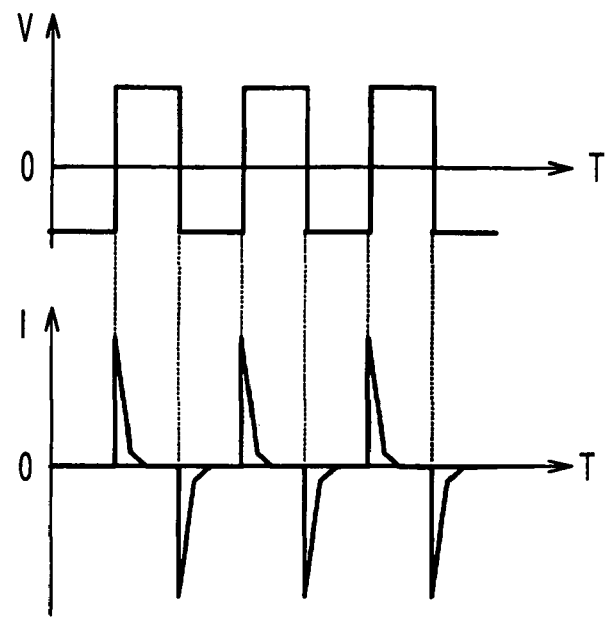
FIG. 30C
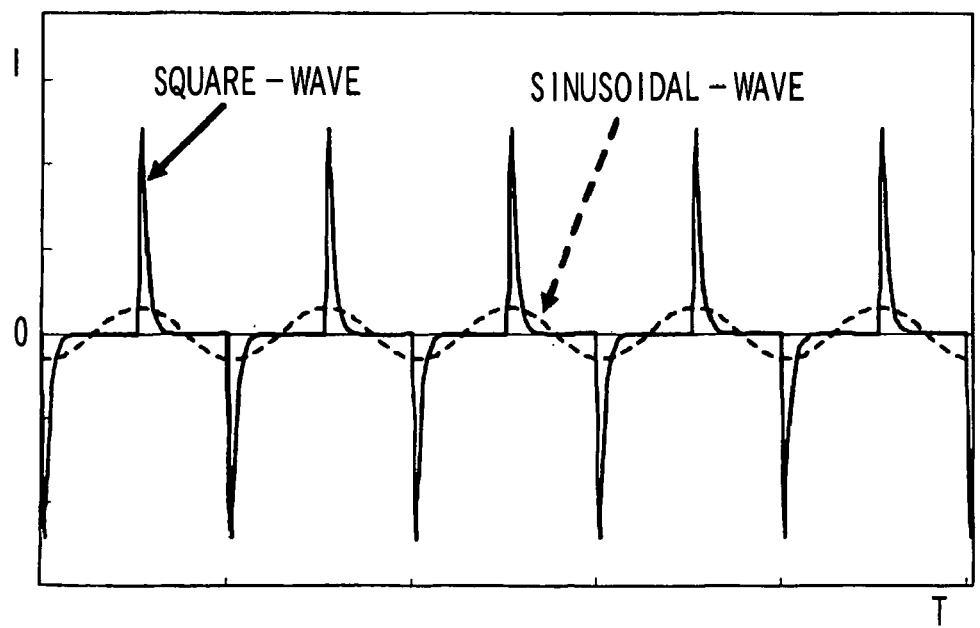

ROTATION DETECTOR AND DIRECT-CURRENT MOTOR

CROSS REFERENCE TO RELATED APPLICATION

This application is based on Japanese Patent Application No. 2008-203112 filed on Aug. 6, 2008, and Japanese Patent Application No. 2009-141437 filed on Jun. 12, 2009, the contents of which are incorporated herein by reference in its entirety.

FIELD OF THE INVENTION

The present invention relates to a rotation detector that detects the rotational state, such as rotation angle, rotation direction, and rotational speed, of a brushed direct-current motor and a brushed direct-current motor whose rotational state can be detected with this rotation detector.

BACKGROUND OF THE INVENTION

Brushed direct-current motors (hereafter, simply referred to as "direct-current motors") have been conventionally used in vehicles as well. They are used to adjust, for example, the opening angle of an air mix damper for temperature adjustment or a mode damper for mode selection in a vehicle air conditioner. To control a direct-current motor used in these applications, the following measure is taken to accurately control the opening angle of each damper: the rotational state, such as rotation angle, rotation direction, and rotational speed, of the direct-current motor is detected; and control is carried out so that the opening angle of each damper becomes equal to a desired angle based on the detected rotational state.

As one of generalized methods for detecting the rotational state of a direct-current motor, the following method is well known: a sensor, such as a rotary encoder and a potentiometer, is provided and the rotational state is detected based on a detection signal from the sensor. For this reason, vehicles also adopt the method of providing such a sensor to detect a rotational state.

However, this method of providing a sensor to detect a rotational state involves a problem. A space for installing the sensor is required for each direct-current motor. Aside from a harness for direct-current power supply to direct-current motors, a harness for transmitting a detection signal from a sensor to any other device (in-vehicle ECU and the like) is also required for each direct-current motor. This incurs increase in the weight and cost of the vehicle. For this reason, there is increasingly demand for the introduction of sensor-less methods for reducing sensors and harnesses associated therewith.

There have been proposed various sensor-less methods for detecting the rotational state of a direct-current motor without use of a large-scale sensor, such as a rotary encoder. For example, a method of detecting it by detecting and counting surge pulses produced when the connection between a commutator and brushes is switched is known. However, this method also involves a problem. When a motor is started or stopped and its number of revolutions is low, the electromotive force of the motor is reduced and surge pulses also get smaller. As the rotational speed is reduced, for this reason, it becomes more difficult to detect a surge pulse and the possibility of erroneous detection is increased.

As another sensor-less method, the following method has been proposed: a resistor is connected between two specific ones of multiple segments (commutator segments) formed in a commutator (that is, in parallel with a phase coil connected between these segments); and a rotation pulse is detected based on a current flowing between the segments. (Refer to Patent Document 1, for example.)

In this sensor-less method disclosed in Patent Document 1, a resistor is connected in parallel with any one phase coil. As a result, when a direct current is supplied to a motor circuit (a circuit comprised of phase coils of multiple phases on the armature coil side) through brushes, a current flowing between the brushes changes with periodical fluctuation according to the rotation angle of the motor. A rotation pulse is detected based on this change in current. This makes it possible to enhance detection accuracy as compared with the above-mentioned detection method simply based on surge pulses Patent Document 1 JP-A-2003-111465

However, the method disclosed in Patent Document 1 involves a problem. In this method, a direct current passed through a motor circuit is caused to fluctuate by connecting a resistor to any one phase coil; therefore, motor torque inevitably fluctuates with this current fluctuation. Motor torque fluctuation causes noise in the motor itself or noise in an object driven by the motor.

Also in the method disclosed in Patent Document 1, the same problem as in the above-mentioned method based on surge pulses still remains. That is, as the rotational speed is reduced, change in current is reduced and the possibility of erroneous detection is increased.

SUMMARY OF THE INVENTION

The invention has been made with the above problems taken into account. It is an object of the invention to provide a rotation detector capable of accurately detecting the rotational state of a direct-current motor regardless of its rotational speed without providing a sensor, such as an encoder so that torque fluctuation is not caused and a direct-current motor whose rotational state can be detected using this rotation detector.

The invention made to solve the above problems is a rotation detector that includes a direct-current motor including: armature coils comprised of phase coils of at least three phases; a commutator having multiple commutator segments to which the armature coils are connected; and at least one pair of brushes that supply current to each phase coil through the commutator, and detects the rotational state of this direct-current motor. The rotation detector includes: a power supplying means capable of applying, at least, alternating current superimposed voltage obtained by superimposing alternating-current voltage on direct-current voltage to between at least the one pair of brushes of the direct-current motor; an energization detecting means for detecting a motor current passed through the direct-current motor via the brushes or path voltage, or voltage on an energization path through which this motor current flows; and a rotational state detecting means for detecting at least one of the rotation angle, rotation direction, and rotational speed as the rotational state of direct-current motor based on the alternating-current component contained in the motor current or path voltage detected by the energization detecting means.

In the direct-current motor, any two commutator segments of the multiple commutator segments are taken as one set and the section between at least the one set of commutator segments has a capacitance value different from those of the sections between commutator segments in the other sets.

In the thus configured rotation detector, the following takes place in the armature coil-side circuit (hereafter, also referred to as "motor circuit") formed between at least one pair of brushes in the direct-current motor: the section between at least one set of commutator segments (hereafter, referred to as "section between specific commutator segments") has a capacitance value different from those of the sections between commutator segments in the other different sets.

For this reason, the following takes place when the direct-current motor is rotated: commutator segments in slidable contact with a pair of brushes are changed in conjunction with this rotation and this varies the impedance of the motor circuit formed between the pair of brushes. Specifically, while the direct-current motor is rotated 180°, the impedance of the motor circuit varies and takes at least two different values (varies in two stages). For this reason, the following are also varied with the variation in impedance: the alternating-current component in a motor current passed through the direct-current motor by the application of alternating current superimposed voltage and the voltage on an energization path through which the motor current flows (path voltage).

Consequently, the energization detecting means detects the motor current or path voltage and the rotational state detecting means detects the rotational state, that is, at least one of the rotation angle, rotation direction, and rotational speed of the direct-current motor based on the following: the alternating-current component contained in the detected motor current (alternating current component) or the alternating-current component contained in the detected path voltage (alternating-current voltage component).

Detection of rotational state based on an alternating-current component can be specifically carried out based on, for example, change in the amplitude of the alternating current-component. When the impedance of the motor circuit varies in conjunction with changing of commutator segments in contact with a pair of brushes while the direct-current motor is rotating, the amplitude of the alternating-current component contained in motor current or path voltage also varies. In case of alternating-current component contained in the motor current, for example, its amplitude is reduced with increase in impedance and its amplitude is increased with reduction in impedance. For this reason, a rotational state can be detected based on variation in the amplitude of the alternating-current component.

The torque of the direct-current motor is produced by a direct current component in a motor current passed through the motor by alternating current superimposed voltage applied by the power supplying means. The alternating current component has no influence on the torque of the direct-current motor. For this reason, an alternating current can be constantly passed by applying constant alternating-current voltage to the direct-current motor regardless of the state of the direct-current motor (during acceleration/deceleration, at constant speed, at a stop, or the like).

According to the rotation detector of the invention, therefore, a rotational state can be detected without fail also during a period from when the motor is decelerated to when it is stopped by continuously applying alternating-current voltage (continuously supplying alternating current). This can be done even if the direct-current voltage applied from the power supplying means is zeroed during braking. In addition, the detection of a rotational state is carried out based on the alternating-current component in the motor current or path voltage of the direct-current motor; therefore, it is detected without influence on direct current (that is, without influence on motor torque).

For this reason, it is possible to provide a rotation detector capable of accurately detecting the rotational state of a direct-current motor regardless of its rotational speed without providing a sensor, such as an encoder, so that the torque does not fluctuate.

The other sections between the commutator segments, different from the section between specific commutator segments can be arbitrarily configured with respect to capacitance value. That is, the other sections between commutator segments different from the section between specific commutator segments may not have a capacitance value. Or, conversely, the sections between commutator segments in all the other sets may have a capacitance value. However, it is required to configure the motor at least so that all the sections between commutator segments do not have an identical capacitance value.

What to specifically detect as a rotational state and which to detect, the alternating-current component in motor current or that in path voltage, can be appropriately determined. For this reason, when a rotation angle is to be detected based on the alternating-current component contained in motor current, for example, the invention can be configured as a rotation angle detector. This rotation angle detector detects the energization current (motor current) of the direct-current motor, flowing through brushes. It extracts the alternating current component contained in the detected motor current and detects a rotation angle based on the extracted alternating current component.

The direct-current motor may include a capacitive element of a predetermined capacitance value, connected in parallel with part or whole of a phase coil of at least one phase.

The above configuration that a section between at least one set of commutator segments has a capacitance value different from those of the sections between commutator segments in the other sets is realized as mentioned above. That is, the configuration is realized by connecting a capacitive element in parallel with part or whole of a phase coil.

The capacitive element has such a property that it is impossible (difficult) to pass a direct current through it but it is easy to pass an alternating current through it. That is, it has so high a resistance that a current hardly flow (less prone to flow) in terms of direct current and so low an impedance that a current is prone to flow in terms of alternating current.

For this reason, the most part of the direct current component in the motor current passed through the motor circuit flows to the armature coils and does not flow to the capacitive element or negligible part thereof flows to it. That is, the capacitive element is in a state equivalent to that it does not exist in terms of direct current. For this reason, the torque of the direct-current motor that operates on direct current is not influenced by the presence of the capacitive element.

Therefore, variation in the impedance of the motor circuit in conjunction with the rotation of the direct-current motor can be caused without fail by the following simple configuration: such a simple configuration that the capacitive element is connected in parallel with part or whole of a phase coil of at least one phase.

In a direct-current motor, capacitive elements different in capacitance value are respectively connected to phase coils of at least two phases. The rotational state detecting means detects the rotation direction of the direct-current motor based on at least the pattern of variation in the above-mentioned alternating-current component.

When capacitive elements different in capacitance value are respectively connected in parallel with at least two of phase coils comprising armature coils, the following takes place: the impedance of the motor circuit varies in multiple stages (in at least three or more stages) in conjunction with the rotation of the direct-current motor. The alternating-current component in motor current or path voltage also varies stepwise in conjunction with this stepwise variation in impedance.

Consequently, a rotation detector capable of detecting at least a rotation direction can be provided by configuring it so that the rotation direction of a direct-current motor from the pattern of stepwise variation in alternating-current component. Further, it is also possible to detect a rotation angle and a rotation direction based on variation in alternating-current component. Therefore, it is also possible to provide a high-performance rotation detector capable of detecting either or both of a rotation angle and a rotational speed in addition to a rotation direction.

When a rotation detector is so configured as to detect a rotation angle and a rotation direction, the result of rotation angle detection can also be corrected based on the result of rotation direction detection. Therefore, even though the rotation direction of a direct-current motor is changed, its rotation angle can be accurately detected according thereto.

A direct-current motor may include armature coils comprised of phase coils of three phases.

There are a wide variety of the numbers of phases of armature coils in a brushed direct-current motor and a number of phases is appropriately selected according to an object to be driven. For direct-current motors for driving various objects to be driven, including the above-mentioned air conditioner, in a vehicle, three-phase motors are frequently used. The three-phase direct-current motor is small sized and lightweight and it is in large demand not only in the field of vehicle component.

Consequently, the rotation detector of the invention is applied as a device for detecting the rotational state of such a three-phase direct-current motor. Since it is unnecessary to provide a sensor such as an encoder in this case, it is possible to sufficiently make good use of the benefits, small size and light weight, of the three-phase direct-current motor and further accurately detect a rotational state. Therefore, this is more effective.

When the number of phases of the armature coils of a direct-current motor is three as mentioned above, it is advisable to connect, for example, the capacitive element to a phase coil of any one phase. In case of three-phase direct-current motor, that is, capacitive elements may be respectively connected to phase coils of any two phase or capacitive elements may be respectively connected to phase coils of all the three phases. (In this case, however, it is required to use at least one capacitive element different in capacitance value from those of the other capacitive elements.) However, when multiple capacitive elements are used as mentioned above, increase in the size, weight, and cost of the direct-current motor is incurred. In addition, an energization path of only the capacitive element constantly exists between brushes during rotation and the amount of variation in impedance that varies in conjunction with rotation is also reduced.

According to the invention, meanwhile, one capacitive element, or a required minimum capacitive element, only has to be provided. This makes it possible to reduce the size, weight, and cost of the entire equipment. In addition, the following different periods are produced depending on the rotation angle: a period during which an energization path of only the capacitive element exists between brushes and the impedance is very low; and a period during which an energization path of only the capacitive element does not exist (a phase coil exists on the energization path between brushes without fail) and the impedance is high. Therefore, the rotational state detecting means can easily detect a rotational state based on alternating-current component. For this reason, it is possible to more accurately detect a rotational state.

In case of a rotation detector capable of detecting at least a rotation direction, it is advisable to take the following measure: when a direct-current motor includes armature coils comprised of phase coils of three phases, for example, capacitive elements different in capacitance value are respectively connected to phase coils of any two phases.

With the thus configured rotation detector, the rotation direction of a three-phase direct-current motor can be detected by providing two capacitive elements, or required minimum capacitive elements. Therefore, it is possible to suppress increase in the size and cost of the direct-current motor and accurately detect its rotation direction.

There are various possible methods with respect to where and how the capacitive element should be actually provided in a direct-current motor. When a ring varistor, which is known as a component for surge absorption, is provided, it can be provided on the ring varistor, for example.

For example, a direct-current motor has a ring varistor having multiple electrodes, fixed on the rotating shaft of the direct-current motor and each of multiple commutator segments is respectively connected with any electrode in the ring varistor. The capacitive element is fixed and connected between any two electrodes in the ring varistor.

There are various possible concrete methods with respect to how the capacitive element should be fixed on the plate surface of the ring varistor. In addition, for example, the following measure may be taken: a ring varistor with capacitive element in which a ring varistor and a capacitive element are integrally molded is constructed as a component and this component is used.

In case of a direct-current motor with a ring varistor installed, the number of man-hours needed to manufacture the direct-current motor can be reduced by fixing a capacitive element on the ring varistor. Further, this makes it possible to reduce the number of man-hours needed to manufacture the entire rotation detector.

Especially, electrical connection can be carried out together with mechanical fixation by connecting a capacitive element to between electrodes of the ring varistor by soldering, for example. This makes it possible to further reduce the number of man-hours needed for wiring between the capacitive element and the armature coils.

Any material is applicable as the capacitive element as long as it has a predetermined capacitance value. When one comprised of a capacitor is used as the capacitive element, it is possible to accurately detect a rotational state with a simpler device configuration.

There are various possible methods for configuring the power supplying means. For example, one power source that generates and outputs alternating current superimposed voltage (pulsating current) obtained by superimposing alternating-current voltage on direct-current voltage can be configured.

The power supplying means may include: a direct-current power source for applying direct-current voltage to a direct-current motor; and an alternating-current voltage applying means for applying alternating-current voltage to the direct-current motor Direct-current voltage from the direct-current power source and alternating-current voltage from the alternating-current voltage applying means are applied to the direct-current motor. Alternating current superimposed voltage can be thereby applied to the direct-current motor.

More specific description will be given. The direct-current power source and the alternating-current voltage applying means are separately provided and direct-current voltage and alternating-current voltage are respectively applied from them. As a result, alternating current superimposed voltage obtained by superimposing alternating-current voltage on direct-current voltage is applied.

Each of the direct-current power source and the alternating-current voltage applying means can be easily configured at low cost by separately providing them as mentioned above.

The power supplying means may include: a direct-current power source for applying direct-current voltage to a direct-current motor; a direct current interrupting means for interrupting the application of direct-current voltage from the direct-current power source to the direct-current motor; and an alternating-current voltage applying means for applying alternating-current voltage to the direct-current motor. Further, the rotation detector may include a direct current interruption controlling means for controlling the direct current interrupting means. This direct current interruption controlling means operates as follows: when a direct-current motor is rotated, it applies direct-current voltage from the direct-current power source to the direct-current motor so that alternating current superimposed voltage is applied to the direct-current motor; and when the direct-current motor is braked, it interrupts the application of direct-current voltage from the direct-current power source.

The direct current interruption controlling means controls the direct current interrupting means. Thus, when the direct-current motor is braked, braking is carried out by the application of direct-current voltage from the direct-current power source being interrupted. For this reason, the application of alternating-current voltage by the alternating-current voltage applying means can be continuously carried out even in braking. This makes it possible to reliably detect a rotational state not only in steady rotation but also during a period from when braking is started to when the direct-current motor is completely stopped.

The power supplying means may include: a direct-current power source that outputs direct-current voltage; a motor driver that is inputted with direct-current voltage from the direct-current power source and applies this direct-current voltage to a direct-current motor and thereby drives the direct-current motor; a direct current interrupting means for interrupting the output of direct-current voltage from the direct-current power source; and an alternating-current voltage applying means for applying alternating-current voltage to the direct-current motor. Further, the rotation detector may include a direct current interruption controlling means for controlling the direct current interrupting means. This direct current interruption controlling means operates as follows: when a direct-current motor is steadily rotated, it inputs direct-current voltage from the direct-current power source to the motor driver so that alternating current superimposed voltage can be applied to the direct-current motor; and when the direct-current motor is braked, it interrupts the input of direct-current voltage from the direct-current power source to the motor driver.

Direct-current voltage from the direct-current power source is applied to a direct-current motor through the motor driver. The application of alternating-current voltage by the alternating-current voltage applying means may be carried out through the motor driver; or the alternating-current voltage may be applied to the direct-current motor without the intervention of the motor driver, that is, regardless of the operating state of the motor driver.

At the time of braking, the input of direct-current voltage from the direct-current power source to the motor driver is interrupted and the application of direct-current voltage from the motor driver to the direct-current motor is interrupted. Braking is thereby carried out. For this reason, the application of alternating-current voltage by the alternating-current voltage applying means can be continuously carried out even at the time of braking.

Therefore, a rotational state can be reliably detected not only in steady rotation but also during a period from when braking is started to when the direct-current motor is completely stopped.

There are various possible concrete methods for configuring the direct current interrupting means. For example, the direct current interrupting means may be comprised of a semiconductor switching element.

The power supplying means may include: a direct-current power source that outputs direct-current voltage; a motor driver that is inputted with direct-current voltage from the direct-current power source and applies this direct-current voltage to a direct-current motor and thereby drives the direct-current motor; and an alternating-current voltage applying means for applying alternating-current voltage to the direct-current motor. Further, the rotation detector may include a motor driver controlling means for controlling the motor driver. When the direct-current motor is braked, the motor driver controlling means alternately switches the polarity of direct-current voltage applied to the direct-current motor at a predetermined frequency.

In the thus configured rotation detector, the application of direct-current voltage is continued also when the direct-current motor is braked. That is, even at the time of braking, alternating current superimposed voltage obtained by superimposing alternating-current voltage on direct-current voltage is applied to the direct-current motor. However, when alternating current superimposed voltage is continuously applied as in steady rotation, braking is naturally not carried out.

Consequently, the motor driver controlling means brakes the direct-current motor by alternately switching the polarity of direct-current voltage applied to the direct-current motor through the motor driver at a predetermined frequency. Switching the polarity of direct-current voltage applied to a direct-current motor is synonymous with an attempt to alternately change the rotation direction of the direct-current motor.

The average value of direct-current voltage applied to a direct-current motor can be lowered to the extent that the rotation of the direct-current motor can be stopped, by appropriately setting the following ratio: a ratio of a time for which one polarity is established within one cycle of switching when the polarity is alternately switched to a time for which the other polarity is established. (The one polarity refers to the polarity of direct-current power to be applied to the direct-current motor to rotate the direct-current motor in one direction.) (The other polarity refers to the polarity of direct-current power to be applied to the direct-current motor to rotate the direct-current motor in the other direction.) (This ratio will be hereafter also referred to as "switching time ratio")

Therefore, it is possible to implement the following not only in steady rotation but also during a period from when braking is started to when the direct-current motor is completely stopped: it is possible to continue the application of alternating current superimposed voltage (that is, without necessity for interrupting the application of direct-current voltage) and reliably detect a rotational state.

The switching time ratio used when the polarity of applied direct-current voltage is switched in braking can be appropriately set as long as the direct-current motor can be braked and finally stopped. For example, when the switching time ratio is set to 50% (1:1), the average value of direct-current voltage applied to the direct-current motor can be zeroed. Therefore, the rotating direct-current motor can be more rapidly stopped.

The frequency at which the motor driver controlling means alternately switches the polarity of applied direct-current voltage can be appropriately set. However, it is advisable to set it to a value different from the frequency of alternating-current voltage applied by the alternating-current voltage applying means.

This makes it possible to remove an unwanted alternating-current component, such as a noise component, if any, caused by the above switching, contained in the motor current or path voltage detected by the energization detecting means. The unwanted alternating-current component may be contained together with the component of alternating-current voltage from the alternating-current voltage applying means. The unwanted alternating-current component can be removed by using a filter, for example, or any other like means. For this reason, a rotational state can be accurately detected.

When the above frequency at which the polarity is alternately switched is set to a value different from the frequency of alternating-current voltage form the alternating-current voltage applying means, it is advisable to take the following measure: the frequency is set to a value lower than the frequency of alternating-current voltage from the alternating-current voltage applying means.

This makes it possible to easily extract the component of alternating-current voltage from the alternating-current voltage applying means from the alternating-current component contained in the motor current or path voltage detected by the energization detecting means using a high-pass filter, for example.

The power supplying means may include: a direct-current power source that outputs direct-current voltage; a motor driver that is inputted with direct-current voltage from the direct-current power source, applies this direct-current voltage to a direct-current motor to drive the direct-current motor, and can short-circuit at least one pair of brushes; and an alternating-current voltage applying means for applying alternating-current voltage to the direct-current motor. Further, the rotation detector may include a motor driver controlling means for controlling the motor driver. This motor driver controlling means operates as follows: when a direct-current motor is steadily rotated, it applies direct-current voltage from the direct-current power source to the direct-current motor and thereby applies alternating current superimposed voltage to the direct-current motor; and when the direct-current motor is braked, it carries out short circuit braking in which at least the one pair of brushes are short-circuited to apply a brake.

The alternating-current voltage applying means and the energization detecting means are provided on a common current path. The common current path is an energization path through which motor current flows both in steady rotation and in short circuit braking among energization paths from the direct-current power source to the direct-current motor.

The alternating-current voltage applying means is provided on a common current path through which motor current flows both in steady rotation and in short circuit braking. (That is, alternating-current voltage from the alternating-current voltage applying means is applied onto the common current path.) At the same time, the energization detecting means is also provided on a common current path and the motor current or path voltage on this common current path is detected. For this reason, even in the configuration that the direct-current motor is braked by short circuit braking, it is possible to reliably detect a rotational state both in steady rotation and in braking.

The alternating-current voltage applying means can be provided on a first common current path extending from one brush of the two brushes comprising the above one pair of brushes of the direct-current motor to the motor driver among the common current paths. Meanwhile, the energization detecting means can be provided on a second common current path extending from the other brush of the two brushes comprising the above one pair of brushes of the direct-current motor to the motor driver among the common current paths.

If the alternating-current voltage applying means and the energization detecting means are adjacently provided, for example, alternating-current voltage from the alternating-current voltage applying means is directly detected by the energization detecting means. As a result, change in the alternating-current component due to variation in the impedance of the motor circuit is not detected any more. When they are adjacently provided, to cope with this, it is required to provide an impedance element, such as a resistor, between them.

When the alternating-current voltage applying means and the energization detecting means are separately provided with the direct-current motor in-between, meanwhile, the following can be implemented: it is unnecessary to provide an impedance element between them on a common current path and the device configuration can be prevented from being complicated.

In the above description, the alternating-current voltage applying means is provided on one common current path, the first common current path, and the energization detecting means is provided on the other common current path, the second common current path. Instead, for example, the alternating-current voltage applying means and the energization detecting means may be provided at each end of the direct-current motor on a common current path (that is, both on the first common current path and on the second common current path). In this case, an applied alternating current controlling means controls either of the alternating-current voltage applying means provided on the respective common current paths so as to apply alternating-current voltage to the direct-current motor. The rotational state detecting means detects a rotational state based on the result of detection by either or both of the energization detecting means provided on the respective common current paths.

It can be appropriately determined which one of the alternating-current voltage applying means provided on the first common current path and second common current path should be used to apply alternating-current voltage. Or, it can be appropriately determined the result of detection by which energization detecting means should be based on to detect a rotational state.

When a direct-current motor is in the above-mentioned steady rotation, the applied alternating current controlling means can carry out the following processing: it can cause the alternating-current voltage applying means provided on the common current path connected to the positive pole of the direct-current power source among the common current paths to apply alternating-current voltage. The rotational state detecting means can detect a rotational state based on the result of detection by the energization detecting means provided on the common current path connected to the negative pole of the direct-current power source among the common current paths. Meanwhile, when the direct-current motor is subjected to short circuit braking, the applied alternating current controlling means can cause the other alternating-current voltage applying means, different from that at the time of steady rotation, to apply alternating-current voltage. The rotational state detecting means can also detect a rotational state based on the result of detection by the other energization detecting means different from that at the time of steady rotation.

More specific description will be given. In steady rotation, alternating-current voltage is applied to the high potential side of the direct-current motor (the positive pole side of the direct-current power source); and a rotational state is detected using the result of detection by the energization detecting means provided on the low potential side of the direct-current motor (the negative pole side of the direct-current power source). In short circuit braking, meanwhile, the alternating-current voltage applying means and the energization detecting means on the different side from the side in steady rotation are used.

In short circuit braking, the direction of current passed through a direct-current motor is reversed from the direction in steady rotation by the back electromotive force of the direct-current motor. In short circuit braking, for this reason, the alternating-current voltage applying means and the energization detecting means on the different side from the side in steady rotation are used. As a result, alternating-current voltage is applied to the high potential side of the direct-current motor both in steady rotation and in short circuit braking. To detect a rotational state, the result of detection by the energization detecting means provided on the low potential side of the direct-current motor is used.

As mentioned above, alternating-current voltage is applied from the high potential side of the direct-current motor both in steady rotation and in short circuit braking. Therefore, the following can be implemented as compared with cases where alternating-current voltage is applied from the low potential side of the direct-current motor: it is possible to reliably produce change in alternating-current component due to variation in the impedance of the motor circuit in conjunction with rotation and further enhance the accuracy of rotational state detection.

A measure different from the foregoing may be taken. When a direct-current motor is in steady rotation, the applied alternating current controlling means causes the alternating-current voltage applying means provided on the common current path connected to the positive pole of the direct-current power source among the common current paths to apply alternating-current voltage. The rotational state detecting means detects a rotational state based on the result of detection by the energization detecting means provided on the common current path connected to the negative pole of the direct-current power source among the common current paths. Also when a direct-current motor is subjected to short circuit braking, the applied alternating current controlling means causes the same alternating-current voltage applying means as in steady rotation to apply alternating-current voltage. The rotational state detecting means also detects a rotational state based on the result of detection by the same energization detecting means as in steady rotation.

That is, the alternating-current voltage is applied by the same alternating-current voltage applying means both in steady rotation and in short circuit braking. A rotational state is detected based on the result of detection by the same energization detecting means both in steady rotation and in short circuit braking. In short circuit braking, for this reason, alternating-current voltage is applied to the low potential side of the direct-current motor. However, since it is unnecessary to change the alternating-current voltage applying means and energization detecting means used in steady rotation and in short circuit braking, the device configuration can be simplified.

The motor driver is formed of an H-bridge circuit comprised of multiple switching elements and MOSFET can be used as the switching elements comprising this H-bridge circuit.

When a direct-current motor is braked by short circuit braking, the following can be implemented by using MOSFET as the switching elements comprising the H-bridge circuit: even in short circuit braking, a rotational state can be reliably detected until the direct-current motor is completely stopped.

To achieve the above object, the following direct-current motor can be adopted: a direct-current motor including armature coils comprised of phase coils of at least three phases, a commutator having multiple commutator segments to which the armature coils are connected, and at least one pair of brushes for supplying current to each phase coil through the commutator. Of the commutator segments any two commutator segments are taken as one set and only at least the section between the one set of commutator segments has a capacitance value different from those of the sections between commutator segments in the other sets.

The rotational state of this direct-current motor can be detected using the above rotation detector.

The direct-current motor may include a capacitive element of a predetermined capacitance value connected in parallel with part or whole of a phase coil of at least one phase.

BRIEF DESCRIPTION OF THE DRAWINGS

Additional objects and advantages of the present invention will be more readily apparent from the following detailed description of preferred embodiments when taken together with the accompanying drawings. In which:

FIG. 30A is a waveform chart indicating another example of alternating current waveform;
FIG. 30B is a waveform chart indicating another example of alternating current waveform;
FIG. 30C is a waveform chart indicating another example of alternating current waveform.

DETAILED DESCRIPTION OF THE PREFERRED EMBODIMENTS

Hereafter, description will be given to preferred embodiments of the invention with reference to the drawings.

(First Embodiment)

Figure 1:
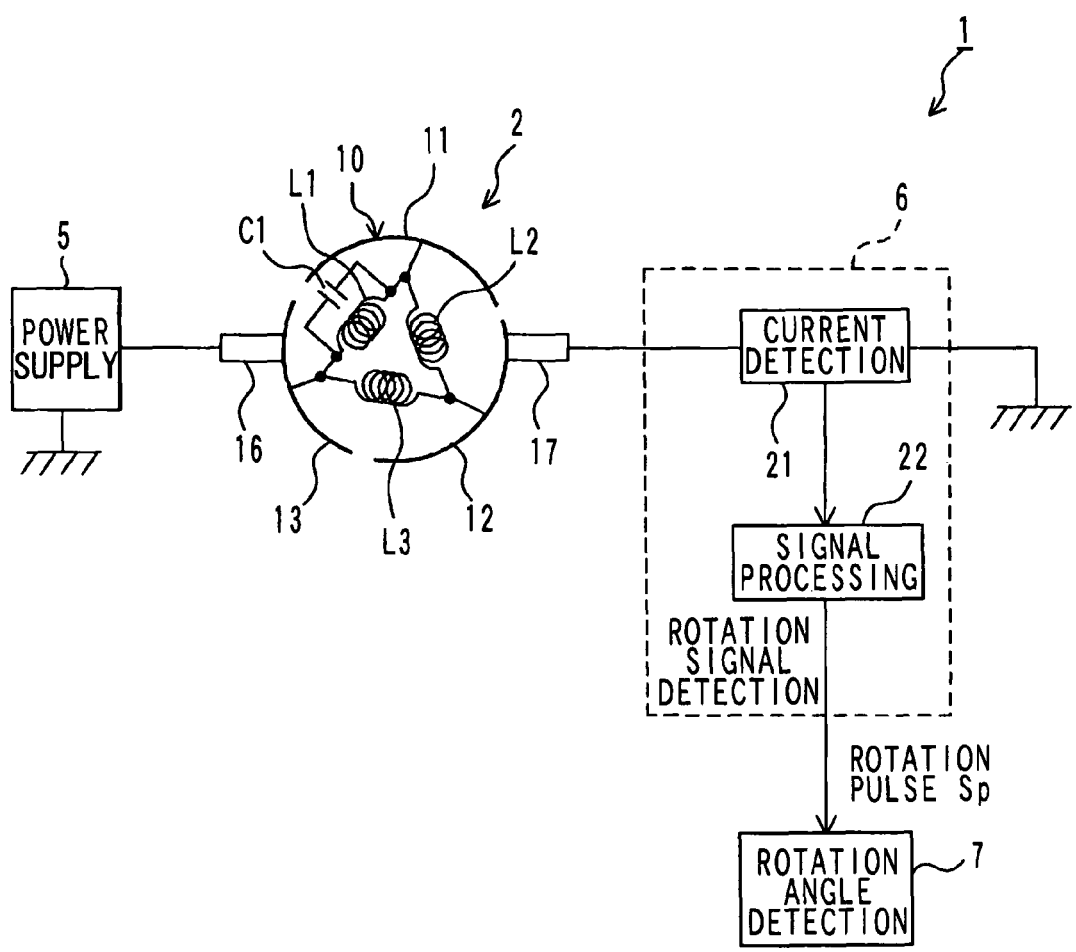
FIG. 1 is a block diagram of a rotation angle detector in a first embodiment of the invention.

FIG. 1 illustrates the general configuration of a rotation angle detector in an embodiment of the invention. As illustrated in FIG. 1, the rotation angle detector 1 in this embodiment is a device for detecting the rotation angle of a motor 2. The rotation angle detector 1 includes a power supply unit 5 that outputs alternating current superimposed voltage obtained by superimposing alternating-current voltage of a predetermined frequency on direct-current voltage for causing the motor 2 to generate torque and rotationally driving the motor 2. In addition, the rotation angle detector 1 includes: a rotation signal detection unit 6 that generates and outputs a rotation pulse Sp as a signal corresponding to the rotation angle of the motor 2 based on motor current passed through the motor 2; and a rotation angle detection unit 7 that detects the rotation angle of the motor 2 based on the rotation pulse Sp outputted from this rotation signal detection unit 6.

The rotation angle detector 1 in this embodiment is used to detect the rotation angle of a motor for driving, for example, each above-mentioned damper in a vehicle air conditioner. The application to a vehicle air conditioner is just an example of embodiments of the invention.

Figure 2A:
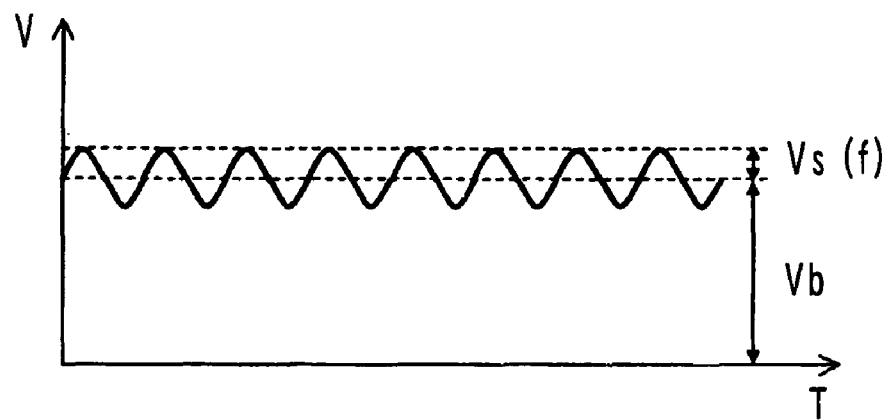
FIG. 2A is a graph indicating the waveform of alternating current superimposed voltage outputted from a power supply unit.

The alternating current superimposed voltage outputted from the power supply unit 5 and applied to the motor 2 is an alternating current and direct current-mixed voltage. This voltage is obtained by superimposing alternating-current voltage with an amplitude of Vs and a frequency of f on direct-current voltage Vb as illustrated in FIG. 2A. This type of waveform is also designated as pulsating current. For this reason, when this alternating current superimposed voltage is applied to the motor 2, the motor current passed through the motor 2 is also a current in which alternating current is superimposed on direct current.

In the drawings, "V" denotes a voltage value, "I" denotes a current value, "T" denotes time, "f" denotes a frequency, and "Z" denotes an impedance value.

Figure 2B:
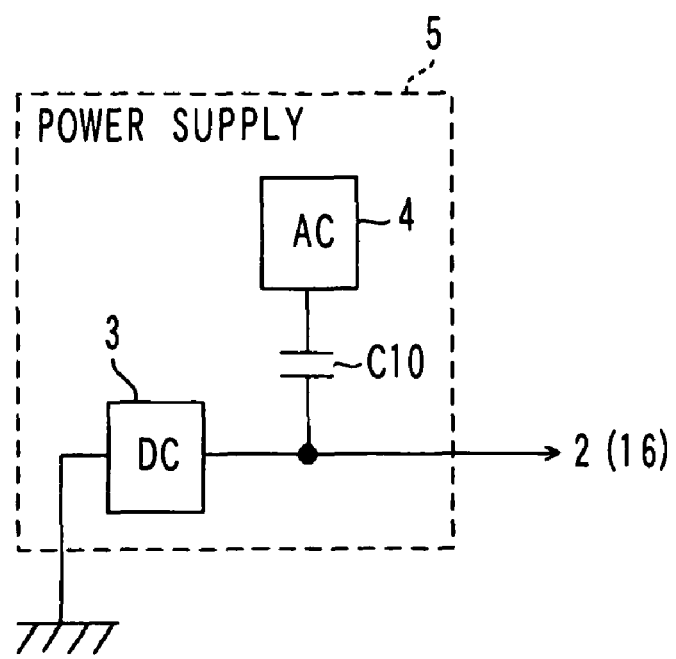
FIG. 2B is a block diagram of a power supply unit.

The internal configuration of the power supply unit 5 is as illustrated in FIG. 2B. It includes: a direct-current power source 3 that generates and outputs direct-current voltage for driving the motor 2; an alternating-current power source 4 that generates and outputs alternating-current voltage of a predetermined frequency for detecting the rotation angle of the motor 2; and a coupling capacitor C10 for superimposing alternating-current voltage outputted from the alternating-current power source 4 on direct-current voltage outputted from the direct-current power source 3 and applying it to the motor 2.

With this configuration, not only direct-current voltage outputted from the direct-current power source 3 is applied to the motor 2. Alternating-current voltage outputted from the alternating-current power source 4 is superimposed on direct-current voltage outputted from the direct-current power source 3 and the resulting voltage is also applied. For this reason, a current obtained by superimposing an alternating current arising from alternating-current voltage from the alternating-current power source 4 on a direct current arising from direct-current voltage from the direct-current power source 3 is passed through the motor 2. That is, it can also be said that the direct-current power source 3 generates and supplies direct current to the motor 2 and the alternating-current power source 4 generates and supplies alternating current to the motor 2.

The power supply unit 5 may be so configured to output only alternating-current voltage from the alternating-current power source 4 without outputting direct-current voltage from the direct-current power source 3.

The motor 2 is a brushed three-phase direct-current motor having a pair of brushes 16, 17 disposed opposite to each other and phase coils of three phases as armature coils. It includes a commutator 10 comprised of three commutator segments 11, 12, 13 brought in contact with each brush 16, 17. For example, the brushes 16, 17 are disposed away from each other by 180° (degrees) in the direction of rotation. Each of the three (three-phase) phase coils L1, L2, 3 comprising the armature coils are connected in a delta form as illustrated in the drawing. The armature coils in the drawing is three-phase winding and is also designated as poly-phase winding.

That is, a first phase coil L1 is connected between a third commutator segment 13 and a first commutator segment 11; a second phase coil L2 is connected between the first commutator segment 11 and a second commutator segment 12; and a third phase coil L3 is connected between the second commutator segment 12 and the third commutator segment 13. An armature is constructed of the armature coils comprised of these three phase coils L1, L2, L3 and the commutator 10. The phase coils L1, L2, L3 are identical in inductance value (L=L2=L3). The phase coils L1, L2, L3 are so disposed that they are away from one another by an electrical angle of $\frac{2}{3}\pi$ (⅔ PI).

Any two of the three commutator segments 11, 12, 13 are respectively in contact with the brushes 16, 17. The two commutator segments brought into contact with the respective brushes 16, 17 are changed in conjunction with the rotation of the commutator due to the rotation of the motor 2.

Though not shown in the drawing, the motor 2 in this embodiment has a yoke housing. A magnetic field system comprised of a permanent magnet is provided on the inner wall side of the yoke housing and the armature is disposed opposite to this magnetic field system.

In this embodiment, further, a capacitor C1 is connected in parallel with the first phase coil L1 in the motor 2. For this reason, the following takes place with respect to the alternating current superimposed voltage obtained by voltages being outputted from the respective power sources 3, 4 comprising the power supply unit 5 and being superimposed by the coupling capacitor C10: the alternating current superimposed voltage is applied to a circuit comprising the phase coils L1, L2, L3 and the capacitor C1 internal to the motor 2 through the individual brushes 16, 17 and any two commutator segments in contact therewith. This circuit is also designated as motor circuit. As the result of the alternating current superimposed voltage being applied as mentioned above, a current containing an alternating current component is passed through the motor circuit.

The capacitor C1 is a capacitive element of a predetermined capacitance value. The capacitor C1 is connected in parallel with part or whole of a phase coil of at least one phase. The capacitor C1 turns the motor circuit formed by connecting the multiple phase coils into an asymmetrical alternating-current impedance network.

As is publicly known, the capacitor C1 functions as a high resistance through which a current hardly flows in terms of direct current and has so low-impedance characteristic that a current is prone to flow in terms of alternating current. For this reason, the capacitor C1 can be handled as being equivalently absent when viewed from the direct-current power source 3; therefore, direct current from the direct-current power source 3 is passed through only the individual phase coils L1, L2, L3.

When viewed from the alternating-current power source 4, each phase coil L1, L2, L3 is of high impedance whereas the capacitor C1 is low impedance and there is a great difference between them. For this reason, the motor 2 is rotated clockwise from the state illustrated in FIG. 1, for example. That is, the commutator 10 is rotated clockwise. As the result, the following takes place when the first commutator segment 11 is brought into contact with the brush 17 on the downstream side of the energization path (ground potential side): a parallel circuit of the first phase coil L1 and the capacitor C1 is formed between the brushes 16, 17. That is, an energization path of only the capacitor C1 is formed between the brushes 16, 17. In this state, for this reason, the impedance of the motor circuit between the brushes 16, 17 is different from that in the state illustrated in FIG. 1 and, for example, the impedance becomes very low in a range of a specific frequency or higher.

That is, from the viewpoint of direct current, the motor circuit can be considered as a circuit comprised of only the three phase coils L1, L2, L3. Consequently, the presence of the capacitor C1 has no influence on the rotational speed or torque of the motor 2 that is rotated by direct current from the direct-current power source 3.

From the viewpoint of alternating current, meanwhile, the following takes place each time the two commutator segments in contact with the respective brushes 16, 17 are changed according to the rotation angle of the motor 2: the motor circuit formed between the brushes is also changed and thus the impedance of the motor circuit is also varied. In this embodiment, however, the following takes place because one capacitor C1 is connected only to the first phase coil L1: while the motor 2 is rotated 180°, the commutator segments are changed three times but the impedance is varied in two stages. This will be described in detail later with reference to FIG. 4A and FIG. 43. Variation in impedance appears in change in the alternating-current component contained in the motor current passed through the motor 2. That is, it appears in change in alternating current component. Or, it appears as change in alternating-current component contained in the voltage on the energization path through which this motor current flows, that is, path voltage. That is, it appears as change in alternating-current voltage component.

For this reason, if the impedance varying according to rotation angle can be detected, the rotation angle of the motor 2 can be detected. Variation in impedance directly appears as change in alternating current. In the rotation angle detector 1 in this embodiment, consequently, the rotation signal detection unit 6 detects variation in the amplitude of the alternating current component contained in the motor current. That is, variation in the amplitude of the alternating current component caused by variation in impedance is indirectly detected.

Then, as described later, the rotation pulse Sp is generated based on the detected variation in the amplitude of the alternating current component.

Figure 3:
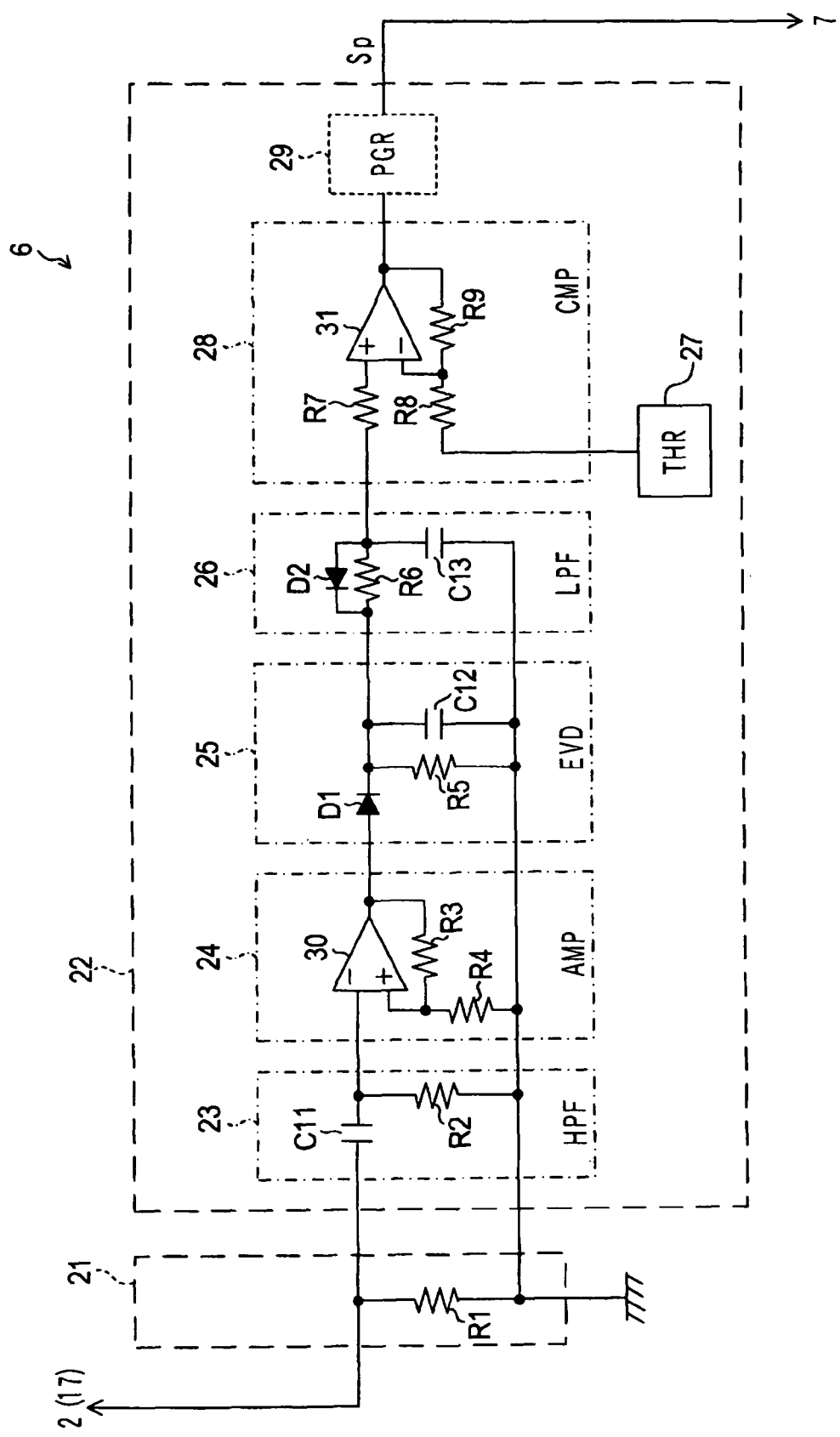
FIG. 3 is a block diagram illustrating the configuration of a rotation signal detection unit.

The rotation signal detection unit 6 includes: a current detection unit 21 provided on an energization path of the motor 2; and a signal processing unit 22 that carries out varied signal processing based on the motor current detected by the current detection unit 21 and thereby generates the rotation pulse Sp. The current detection unit 21 is provided on an energization path extending from the brush 17 on the land potential side to ground potential. FIG. 3 illustrates the more concrete configuration of this rotation signal detection unit 6.

As illustrated in FIG. 3, the current detection unit 21 is comprised of a current sensing resistor R1 placed on an energization path of the motor 2. The voltage across this current sensing resistor R1 is taken as a detection signal corresponding to motor current into the signal processing unit 22.

Figure 5:
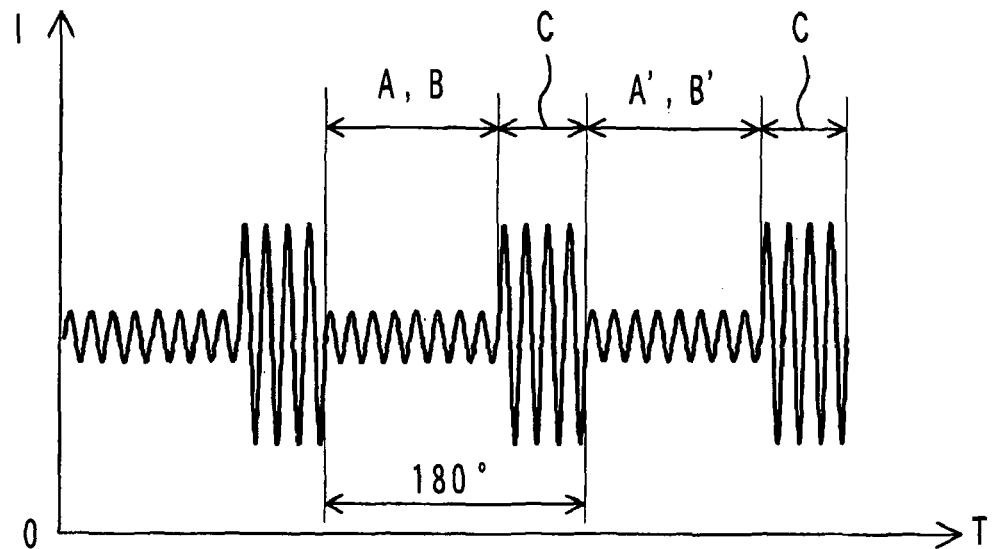
FIG. 5 is a waveform chart of motor current flowing while a motor in the first embodiment is rotating.

The motor current varies as illustrated in FIG. 5. The details of FIG. 5 will be described later. In short, the motor current is in such a form that an alternating current component is superimposed on a direct current component. In addition, while the motor 2 is rotated 180° (degrees), the amplitude of the alternating current component varies in two stages.

The signal processing unit 22 includes a high-pass filter (HPF) 23, an amplification unit (AMP) 24, an envelope detection unit (EVD) 25, a low-pass filter (LPF) 26, a threshold setting unit (THR) 27, a comparison unit (CMP) 28, and a pulse generation unit (PGR) 29.

The HPF 23 is of publicly known configuration and is comprised of a capacitor C11 and a resistor R2. Detection signals from the current sensing resistor R1 taken into the signal processing unit 22 are processed by this HPF 23 as follows: signals in a band of a predetermined cut-off frequency or below, including a direct current component, are cut; and frequency components higher than this cut-off frequency, including the frequency of alternating-current voltage generated at the alternating-current power source 4, are extracted and inputted to the amplification unit 24. For this reason, the direct current component in the detected motor current is cut off by this HPF 23 and only the alternating current component is inputted to the amplification unit 24, The detected motor current is also designated as detection signal.

The detection signal (alternating current component) detected by the current sensing resistor R1 and extracted through the HPF 23 is amplified at the amplification unit 24.

The amplification unit 24 includes: an operational amplifier 30; a resistor R3 connected between the output terminal and non-inverting input terminal of the operational amplifier 30; and a resistor R4 connected between the non-inverting input terminal of the operational amplifier 30 and ground potential. A signal inputted to the inverting input terminal, that is, a detection signal from the HPF 23 is amplified at a predetermined amplification factor.

A detection signal amplified at the amplification unit 24 is subjected to envelope detection at the envelope detection unit 25. This envelope detection unit 25 includes: a diode D1 for rectification; a resistor R5 one end of which is connected to the cathode of this diode D1 and the other end of which is connected to ground potential; and a capacitor C12 one end of which is connected to the cathode of the diode D1 and the other end of which is connected to ground potential. The detection signal amplified at the amplification unit 24 is inputted to the anode of the diode D1.

An alternating-current detection signal inputted from the amplification unit 24 is subjected to envelope detection by this envelope detection unit 25 and a certain signal corresponding to the amplitude of the alternating current component is generated. The signal generated by the envelope detection unit 25 is also designated as envelope detection signal.

The envelope detection signal has its high-frequency component cut through the LPF 26 and then inputted to the comparison unit 28. The LPF 26 is of publicly known configuration and is comprised of a resistor R6 and a capacitor C13. The resistor R6 is connected in parallel with a diode D2. The direction of connection of this diode D2 is opposite to the direction of input of the envelope detection signal.

The comparison unit 28 includes: a comparator 31; a resistor R9 connected between the output terminal and inverting input terminal of the comparator 31; a resistor R7 one end of which is connected to the non-inverting input terminal of the comparator 31 and the other end of which is connected to the LPF 26; and a resistor R8 one end of which is connected to the inverting input terminal of the comparator 31 and the other end of which is connected to the threshold setting unit 27.

An envelope detection signal is inputted to the comparison unit 28 through the LPF 26 and is inputted to the non-inverting input terminal of the comparator 31 through the resistor R7 in this comparison unit 28. Meanwhile, the inverting input terminal of the comparator 31 is inputted with a threshold value form the threshold setting unit 27 through the resistor R8. As a result, the envelope detection signal and the threshold value are compared with each other at the comparator 31, from which the result of comparison is outputted.

In this embodiment, a threshold value set at the threshold setting unit 27 and inputted to the comparison unit 28 is set as follows: it is set to a predetermined value that is higher than that of the envelope detection signal in a period during which the amplitude of the motor current waveform shown in FIG. 5 is small and lower than that of the envelope detection signal in a period during which the amplitude is large.

During a period of small amplitude, for this reason, the value of the envelope detection signal is lower than the threshold value from the threshold setting unit 27; therefore, a signal of low level is outputted from the comparator 31. During a period of large amplitude, meanwhile, the value of the envelope detection signal is higher than the threshold value; therefore, a signal of high level is outputted from the comparator 31.

The signal of low level or high level outputted from the comparator 31 has its waveform and level appropriately shaped and adjusted at the pulse generation unit 29. Then it is outputted as a rotation pulse Sp corresponding to the rotation angle of the motor 2 to the rotation angle detection unit 7.

At the signal processing unit 22, as mentioned above, the following varied signal processing is carried out with respect to the motor current detected at the current sensing resistor R1: cut-off of the low-frequency component, amplification of the alternating current component, envelope detection, and the like. Thereafter, the rotation pulse Sp is generated. For this reason, the accurate rotation pulse Sp with reduced disturbance and noise is generated.

In place of the HPF 23, for example, a band-pass filter that passes only a predetermined band including the frequency of the alternating current component may be used. Also in place of the LPF 26, a band-pass filter may be similarly used. The signal outputted from the comparison unit 28 is a pulse signal that is relatively stable itself and may be directly inputted to the rotation angle detection unit 7. For this reason, the pulse generation unit 29 may be omitted.

The rotation angle detection unit 7 detects the rotation angle of the motor 2 based on a rotation pulse Sp inputted from the pulse generation unit 29 by, for example, a method of detecting and counting leading edges of the rotation pulse Sp.

The detected rotation angle is used as a feedback signal in a control circuit, not shown, for the motor 2.

Figure 4A:
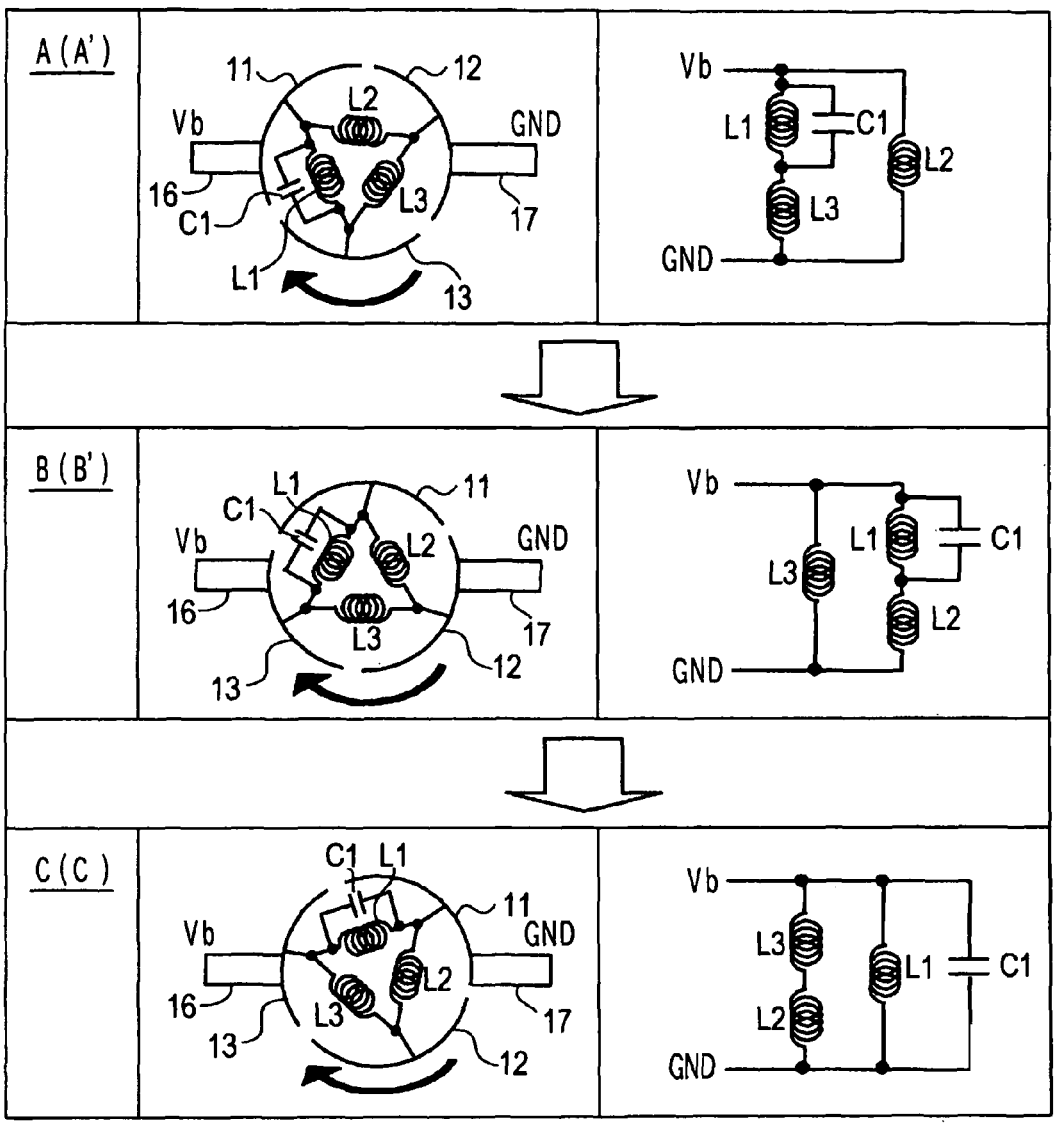
FIG. 4A is a set of circuit diagrams illustrating the state transition in conjunction with rotation of a motor.

FIG. 4A illustrates change in the state of connection in the motor 2, that is, change in the motor circuit formed between the brushes 16, 17 that occurs while the motor 2 is rotated 180°. As illustrated in FIG. 4A, the motor circuit of the motor 2 in this embodiment is changed into three different states, state A, state B, and state C, while the motor 2 is rotated 180°.

As illustrated in the drawing, state A is a state in which: the first commutator segment 11 is in contact with the brush 16 on the positive pole side (hereafter, also referred to as "Vb side") of the direct-current power source 3; and the second commutator segment 12 is in contact with the brush 17 on the ground potential side (hereafter, also referred to as "GND side"). The equivalent circuit of the motor 2, that is, the motor circuit formed between the brushes 16, 17 in state A is as illustrated on the right side of the drawing. As described with reference to FIG. 2A, Vb denotes the direct-current voltage outputted from the direct-current power source 3.

In state A, the capacitor C1 and the third phase coil L3 are connected in series with each other. Therefore, an energization path of only the capacitor C1 does not exist between the brushes 16, 17 and any phase coil definitely exists in the paths extending from one brush 16 to the other brush 17. In state A, for this reason, the impedance of the entire circuit is increased; therefore, the amplitude of the alternating current component contained in the motor current is small.

State B is established when the direct-current motor is rotated clockwise approximately 50° from state A. In this state, the commutator segment in contact with the brush 16 on the Vb side has been changed from the first commutator segment 11 in state A to the third commutator segment 13. The brush 17 on the GND side is in contact with the second commutator segment 12.

Also in state B, the capacitor C1 and the second phase coil L2 are connected in series with each other. Therefore, an energization path of only the capacitor C1 does not exist between the brushes 16, 17 and any coil definitely exists in the paths extending from one brush 16 to the other brush 17. Also in state B, for this reason, the impedance of the entire circuit is high; therefore, the amplitude of the alternating current component contained in the motor current is small. As is apparent from comparison of the equivalent circuits in the drawing, state B and state A are identical in the impedance of the entire circuit. For this reason, they are also identical in the amplitude of the alternating current component.

State C is established when the direct-current motor is further rotated clockwise approximately 50° from state B. In this state, the commutator segment in contact with the brush 17 on the GND side has been changed from the second commutator segment 12 in states A and B to the first commutator segment 11. The brush 16 on the Vb side is in contact with the third commutator segment 13.

In state C, the series circuit of the second phase coil L2 and the third phase coil L3, the first phase coil L1, and the capacitor C1 are respectively connected in parallel with one another. For this reason, an energization path of only the capacitor C1 exists between the brushes 16, 17. As a result, the impedance of the entire circuit is reduced; therefore, the amplitude of the alternating current component contained in the motor current is large.

While the motor 2 is rotated 180°, as mentioned above, the commutator segments in contact with the respective brushes 16, 17 are changed three times. In conjunction therewith, the motor circuit between the brushes 16, 17 is changed into three different states, states A, B, and C. As mentioned above, however, state A and state B are identical with each other in the impedance of the entire circuit; therefore, variation in impedance that occurs during a 180°-rotation is in two stages.

In the process of rotation of the motor 2, there is a transitional period during which one brush is in simultaneous contact with two adjacent commutator segments. Also in this transitional period, the impedance between the brushes varies. However, this transitional period is instantaneously produced while the motor 2 is rotated once and variation in impedance in conjunction therewith is also instantaneous. In this embodiment, for this reason, this transitional period is not taken into account.

When the rotation further progresses from state C, the commutator segment in contact with the brush 16 on the Vb side is changed from the third commutator segment 13 in state C to the second commutator segment 12. The brush 17 on the GND side is in contact with the first commutator segment 11. This state is a state in which the brush 16 on the Vb side and the brush 17 on the GND side in the above-mentioned state A are transposed and the impedance of the entire circuit is the same as that in state A. In the following description, for this reason, this state will be designated as state A'.

When the rotation further progresses from state A' the commutator segment in contact with the brush 17 on the GND side is changed from the first commutator segment 11 in state A' to the third commutator segment 13. The brush 16 on the Vb side is in contact with the second commutator segment 12. This state is a state in which the brush 16 on the Vb side and the brush 17 on the GND side in the above-mentioned state B are transposed and the impedance of the entire circuit is the same as that in state B. In the following description, for this reason, this state will be designated as state B'.

When the rotation further progresses from state B8 the commutator segment in contact with the brush 16 on the Vb side is changed from the second commutator segment 12 in state B' to the first commutator segment 11. The brush 17 on the GND side is in contact with the third commutator segment 13. This state is a state in which the brush 16 on the Vb side and the brush 17 on the GND side in the above-mentioned state C are transposed and the impedance of the entire circuit is the same as that in state C. In the following description, for this reason, this state will be designated as state C'.

When the rotation further progresses from state C', the state is changed to state A again. As the rotation thereafter progresses, the state is changed in the order of state B →state C→state A'→state B'→state C'→state A→ . . . .

That is, while the motor 2 is rotated once, the state of the motor circuit is sequentially changed into six different states, states A, B, C, A', B', and C' according to its rotation angle. This means that the state is changed every 60°-rotation. Of these states, states A, B, A', and B' are all of the same impedance that can be designated as high impedance. States C and C' are of the same impedance and the value of this impedance is much lower than that of the impedance in state A and the like.

For this reason, the motor current is as indicated in FIG. 5. That is, the amplitude of the alternating current component is small in states A, B, A', and B' and the amplitude of the alternating current component is large in states C and C'.

In addition, this embodiment is so configured that the difference in impedance varying according to the rotation angle of the motor 2 is increased. More specific description will be given. As described with reference to FIG. 4A, the impedance in states A, B, A', and B' is high because a path of only the capacitor C1 is not produced between the brushes 16, 17; and the impedance in states C and C' is very low because a path of only the capacitor C1 is produced between the brushes 16, 17.

Since there is a grate difference in impedance in states A, B, A', and B' and impedance in states C and C', as mentioned above, the phenomenon indicated in FIG. 5 occurs. That is, a great difference is produced also in the amplitude of the alternating current component in the motor current between in states A, B, A', and B' and in states C and C'. As an example, FIG. 5 indicates the waveform obtained when the impedance in states A, B, A', and B' is approximately four times the impedance in states C and C'

For this reason, the threshold value to be generated at the threshold setting unit 27 in the signal processing unit 22 can be set within a wider range with a higher degree of freedom. For example, if the threshold value is set to a value close to the intermediate value between the value of the envelope detection signal in state A and that of the envelope detection signal in state C, the following can be implemented: the comparison unit 28 more accurately carries out comparison and the pulse generation unit 29 can reliably generate the accurate rotation pulse Sp corresponding to the rotation angle.

In this embodiment, the frequency of alternating-current voltage outputted from the alternating-current power source 4 is set as follows: letting the resonance frequency in the motor circuit in states A, B, A', and B' be f1 and the resonance frequency in the motor circuit in states C and C' be f2, it is set to a frequency different from both of these resonance frequencies. More specifically, this embodiment is so configured that an alternating current of a predetermined frequency higher than both the frequencies f1 and f2 is supplied from the alternating-current power source 4.

Figure 4B:
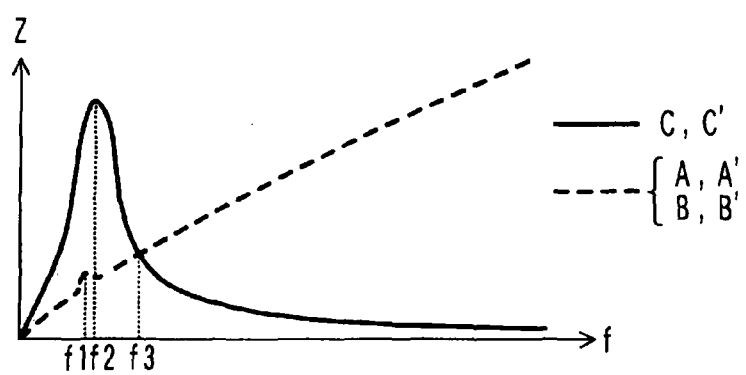
FIG. 4B is a graph indicating the impedance characteristic of a motor.

FIG. 4B indicates the frequency characteristic of impedance in each state illustrated in FIG. 4A. As mentioned above, the motor circuits in states A, B, A', and B' are identical in impedance. In states A, B, A', and B' the capacitor C1 has almost no influence and the impedance has such a characteristic that though a low peak value is produced at resonance frequency f1, the impedance is increased with increase in frequency as seen as a whole.

In states C and C', meanwhile, the impedance characteristic is largely changed by resonance between the phase coils L1, L2, L3 and the capacitor C1 and the impedance is reduced with resonance frequency f2 at the center. The impedance takes the maximum value at resonance frequency f2. For this reason, the impedance differs between these states, except when the frequency is f3 at which the characteristic line in states A, B, A', and B' and that in states C and C' intersect each other and thus the impedances are matched with each other. Especially, in a predetermined band with resonance frequency f1 at the center and in a band with frequencies higher than frequency f3 to some extend, the ratio of impedance is increased. Especially, in a range with frequencies higher than frequency f3 to some extent, the impedance ratio does not change so much. The impedance ratio does not change so much even though the capacitance value of the capacitor C1 is changed by, for example, variation in ambient temperature and as a result, resonance frequencies f1 and f2 change. Therefore, this range is convenient to use for the frequency of alternating-current voltage from the alternating-current power source 4 from the viewpoint of circuit design as well.

In this embodiment, for this reason, the frequency of alternating-current voltage from the alternating-current power source 4 is set to a predetermined frequency higher than frequency f3.

Figure 6:
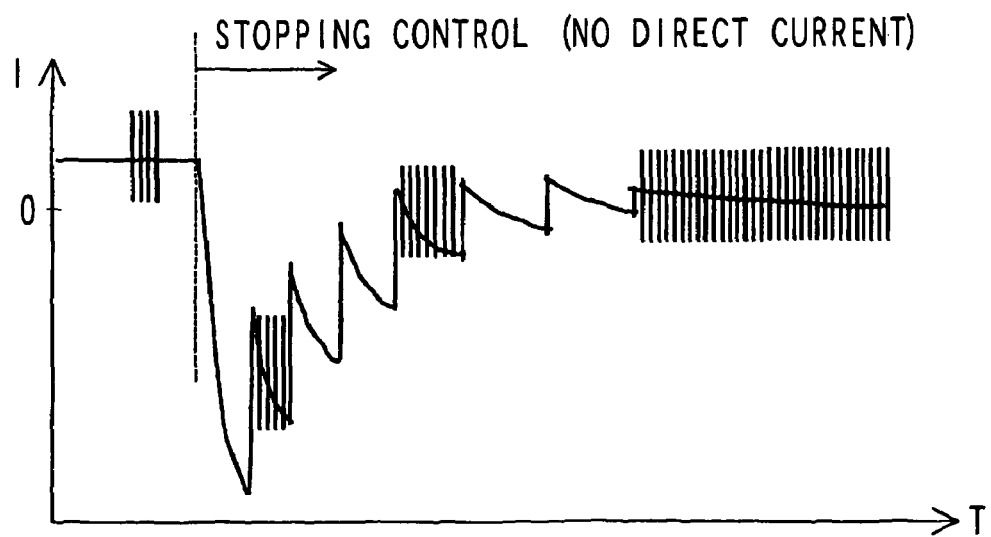
FIG. 6 is a waveform chart of motor current observed when a motor in the first embodiment is at a stop.

Subsequently, FIG. 6 indicates an example of motor current waveform obtained when the rotating motor 2 is stopped. During a period during which the impedance is high and the amplitude of the alternating current component is small, that is, a period during which state A, B, A', or B' is established, the waveform of the alternating current component is very small. In FIG. 6, therefore, these periods are omitted. This is the same with FIG. 7A and FIG. 7B referred to later.

In the example illustrated in FIG. 6, application of direct-current voltage from the direct-current power source 3 to the motor 2 is stopped in stopping control in which the rotating motor 2 is braked and thereby stopped. Stopping control is also designated as braking control. Meanwhile, alternating-current voltage or alternating current from the alternating-current power source 4 doe not take part in driving of the motor 2 and it is supplied strictly to detect the rotation angle of the motor 2. Therefore, it is constantly supplied to the motor 2 as long as the rotation of the motor 2 is controlled regardless of whether it is rotating or under stopping control.

After stopping control is started, for this reason, the motor current becomes a current in which an alternating current from the alternating-current power source 4 is superimposed on a current produced by induced electromotive force as indicated in the drawing. When stopping control is started, the supply of direct-current power from the direct-current power source 3 is stopped. The magnitude of the current produced by induced electromotive force is reduced with reduction in the rotational speed of the motor 2. Therefore, this current due to induced electromotive force is gradually reduced and is zeroed when the motor 2 is stopped.

As mentioned above, an alternating current is constantly supplied from the alternating-current power source 4 for rotation angle detection. Therefore, an alternating current of amplitude corresponding to the rotation angle flows regardless of the rotational speed of the motor 2 as indicated in FIG. 6. This amplitude is also amplitude corresponding to variation in the impedance of the motor circuit. For this reason, the rotation angle of the motor 2 can be detected regardless of the rotational speed of the motor 2.

Figure 7A:
FIG. 7A is a waveform chart of motor current generated when a motor in the first embodiment is at a stop.
Figure 7B:
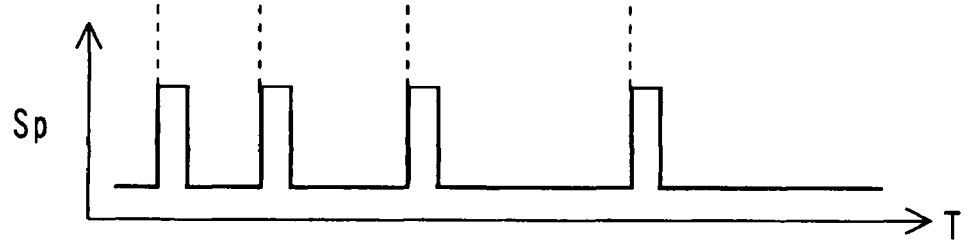
FIG. 7B is a waveform chart of a rotation pulse Sp generated when a motor in the first embodiment is at a stop.

FIG. 7A and FIG. 7B indicate rotation pulses Sp generated at the signal processing unit 22 in the stopping control illustrated in FIG. 6. The waveform in FIG. 7A is that of a detection signal amplified at the amplification unit 24 and the waveform in FIG. 7B is that of the rotation pulses Sp generated at the pulse generation unit 29. In this example, the rotation pulse Sp having a predetermined time width is generated each time the amplitude of the alternating current component changes from small amplitude to large amplitude.

In this embodiment, the rotation pulse Sp is generated each time the motor 2 is rotated 180°. For this reason, each time this rotation pulse Sp is generated, the motor 2 can be considered to have been rotated 180° and the rotation angle of the motor 2 can be detected.

The rotation angle detector 1 in this embodiment is so configured to detect the rotation angle of the motor 2 based on the rotation pulse Sp. Instead, it may be so configured that it can also detect the rotational speed of the motor 2 based on the intervals of the rotation pulses Sp. For example, the intervals between leading edges of the rotation pulses S can be utilized. Or, the invention may be configured as a rotational speed detector that detects rotational speed, not rotation angle. What degree the motor 2 is rotated before each rotation pulse Sp is outputted is known beforehand. Therefore, if intervals at which the rotation pulse Sp is outputted are known, the rotational speed of the motor 2 can be detected. The interval of the rotation pulses S is also designated to as period.

In the rotation angle detector 1 in this embodiment, as described up to this point, the alternating-current power source 4 for rotation angle detection is provided aside from the direct-current power source 3 as a power source for driving the motor 2. When the motor 2 is rotated, alternating current superimposed voltage obtained by superimposing alternating-current voltage from the alternating-current power source 4 on direct-current voltage from the direct-current power source 3 is applied to the motor 2. As a result, a motor current containing an alternating-current component is passed through the motor 2.

In the motor 2, the capacitor C1 for rotation angle detection is connected in parallel with the first phase coil L1 of the phase coils L1, L2, L3 of three phases. At the signal processing unit 22, only an alternating current component is extracted from the motor current detected at the current detection unit 21. Then a rotation pulse Sp corresponding to variation in the amplitude of this alternating current component is generated. Since the capacitor C1 is connected, the impedance of the motor circuit between the brushes 16, 17 is varied according to change in the rotation angle of the motor 2 and this change appears as variation in the amplitude of the alternating current component. For this reason, generation of the rotation pulse Sp and thus detection of the rotation angle can be achieved based on variation in the amplitude of the alternating current component.

With the rotation angle detector 1 in this embodiment, therefore, the following can be implemented even though application of direct-current voltage and supply of direct current from the direct-current power source 3 are stopped and the voltage is zeroed when the motor 2 is under stopping control: the application of alternating-current voltage and the supply of alternating current are continued and thus a rotation angle can be reliably detected even during a period from when the motor is decelerated to when it is stopped. In addition, the detection of a rotation angle is carried out based on the alternating current component contained in the motor current and it is detected without influence on the direct current for driving the motor. For this reason, a rotation angle can be accurately detected regardless of rotational speed without providing a large-scale sensor, such as a rotary encoder, so that torque fluctuation is not caused.

The frequency of alternating-current voltage applied from the alternating-current power source 4 to the motor 2 is set to the following predetermined frequency: a predetermined frequency higher than the resonance frequencies f1, f2 of the motor circuit formed between the brushes 16, 17 while the motor 2 is rotating. As a result, the impedance of the entire motor circuit does not vary so much even though the ambient temperature changes and the capacitance value of the capacitor C1 is changed due to this temperature characteristic. For this reason, it is possible to stably detect a rotation angle without the influence of the temperature characteristic of the capacitor C1.

It is not indispensable to make the frequency of alternating-current voltage produced by the alternating-current power source 4 different from the resonance frequencies f1, f2. Conversely, an alternating current of the same frequency as that of either resonance frequency f1, f2 may be produced. This increases the ratio of impedance that varies with rotation and thus variation in the amplitude of the alternating current component is also increased.

In this embodiment, variation in the impedance of the motor circuit caused by rotation of the motor 2 is detected as variation in the amplitude of the alternating current component contained in the motor current. Further, this variation in amplitude is detected by the comparison unit 28 comprised of the comparator 31 and the like after a detection signal is processed by the HPF 23, amplification unit 24, envelope detection unit 25, and LPF 26. This makes it possible to suppress the influence of noise and disturbance and accurately detect variation in amplitude through a simple configuration and thus to accurately detect a rotation angle.

The number of capacitors C1 connected to the motor 2 is one, which is a required minimum number. The capacitor C1 is connected only to one phase armature coil. In addition, as the result of one capacitor C1 being connected, the following periods are produced depending on the rotation angle: a period during which an energization path of only the capacitor C1 exists between the brushes 16, 17 and the impedance is very low (states C and C'); and a period during which an energization path of only the capacitor C1 does not exist and the impedance is high (states A, B, A' and B'). The difference in impedance between these periods is increased and thus the difference in the amplitude of the alternating current component between these periods is also increased. During a period of high impedance, any phase armature coil definitely exists on an energization path.

For this reason, it is possible to suppress increase in the size and cost of the motor 2 and accurately detect its rotation angle. This brings the effect of prevention of increase in the size and cost of the entire device as well.

In the method disclosed in Patent Document 1, variation in direct current is detected; therefore, there is a high probability that detection accuracy is degraded, for example, distortion is produced in waveform, because of age deterioration in a brush or the commutator. Meanwhile, the rotation angle detector 1 in this embodiment detects a rotation angle based on variation in the amplitude of an alternating current component. Since this variation in amplitude depends on the impedance of the motor circuit, it is possible to suppress influence of age deterioration in a brush or the commutator.

In this embodiment, the power supply unit 5 corresponds to the power supplying means of the invention and the current detection unit 21 corresponds to the energization detecting means of the invention. The rotational state detecting means of the invention is comprised of the signal processing unit 22 and the rotation angle detection unit 7.

(Second Embodiment)

Figure 8:
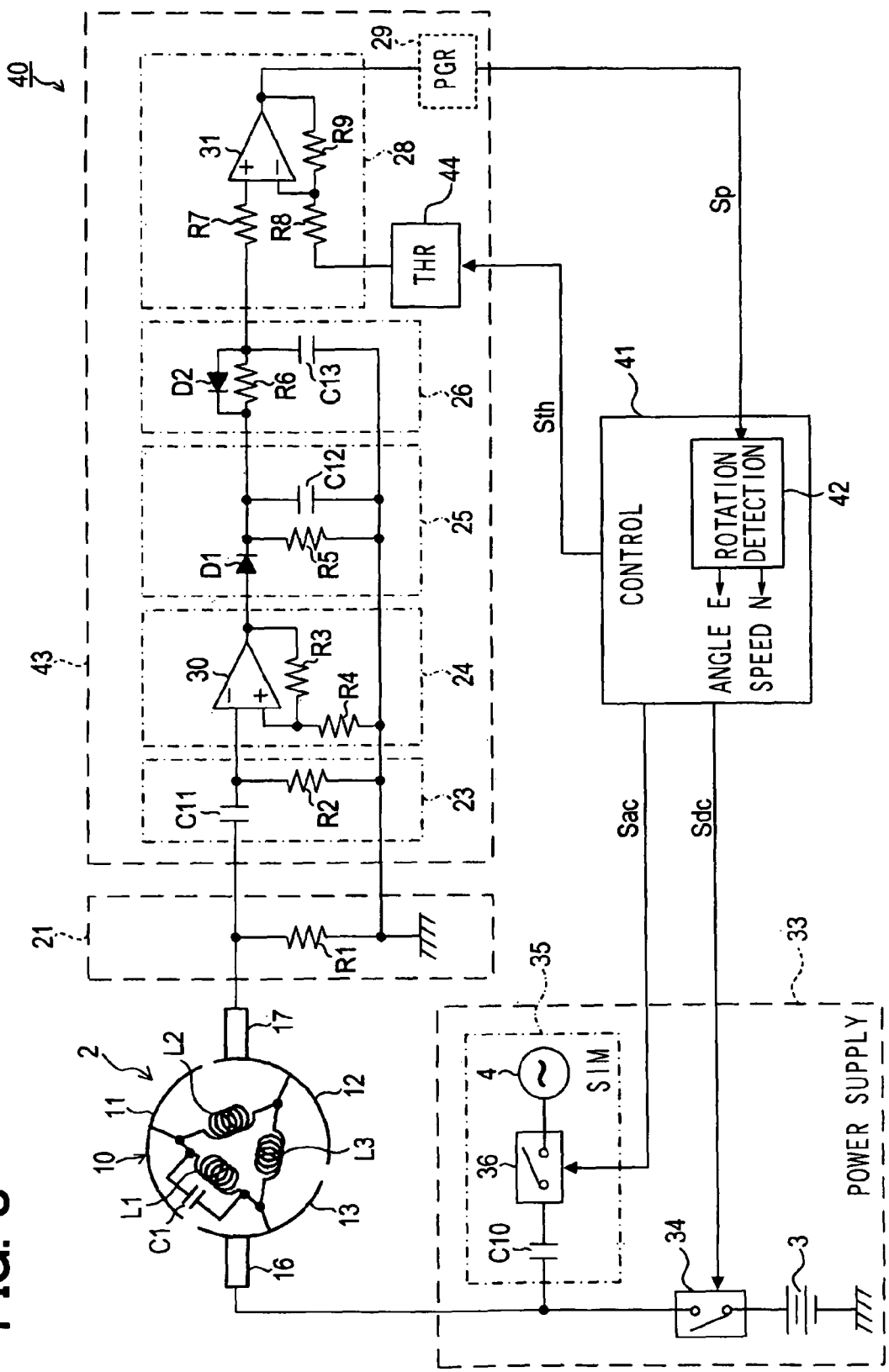
FIG. 8 is a block diagram of a rotation detector in a second embodiment.

FIG. 8 illustrates the general configuration of a rotation detector 40 in this embodiment. As illustrated in FIG. 8, the rotation detector 40 in this embodiment includes: the motor 2; a power supply unit 33 that supplies power to this motor 2; the current detection unit 21 that detects a motor current passed through the motor 2; a signal processing unit 43 that generates a rotation pulse Sp based on the motor current detected by this current detection unit 21; and a control unit 41 that controls the power supply unit 33 and the signal processing unit 43.

The power supply unit 33 is identical with the power supply unit 5 in the first embodiment in that it includes the direct-current power source 3, alternating-current power source 4, and coupling capacitor C10. However, the power supply unit 33 in this embodiment is additionally provided with a direct-current power switch 34 located on the energization path extending from the direct-current power source 3 to the motor 2. Switching of this direct-current power switch 34 is controlled by a direct current application control signal Sdc from the control unit 41. When the switch is on, direct-current voltage from the direct-current power source 3 is applied to the motor 2. When the switch is off, the application of direct-current voltage from the direct-current power source 3 to the motor 2 is interrupted.

In this embodiment, a signal of high (H) level or low (L) level is outputted as the direct current application control signal Sdc. When the direct current application control signal Sdc is of H level, the direct-current power switch 34 is turned on. When the direct current application control signal Sdc is of L level, the direct-current power switch 34 is turned off.

Further, the power supply unit 33 includes a superimposition unit (SIM) 35 for applying alternating-current voltage to the motor 2. Specifically, the superimposition unit is comprised of the alternating-current power source 4 and the coupling capacitor C10 in the power supply unit 5 illustrated in FIG. 2B. In addition, an alternating-current power switch 36 is provided between the alternating-current power source 4 and the coupling capacitor C10. Switching of the alternating-current power switch 36 is controlled by an alternating current superimposition control signal Sac from the control unit 41. When the switch is on, alternating-current voltage from the alternating-current power source 4 is applied to the motor 2. When the switch is off, the application of alternating-current voltage from the alternating-current power source 4 to the motor 2 is interrupted.

In this embodiment, a signal of high (H) level or low (L) level is outputted as the alternating current superimposition control signal Sac. When the alternating current superimposition control signal Sac is of H level, the alternating-current power switch 36 is turned on. When the alternating current superimposition control signal Sac is of L level, the alternating-current power switch 36 is turned off.

There are various possible concrete methods for configuring each switch 34, 36. For example, they may be comprised of a semiconductor switching element, such as MOSFET, or may be comprised of a relay or the like.

The current detection unit 21 is the same as the current detection unit 21 in the first embodiment illustrated in FIG. 3. Therefore, it is marked with the same reference numeral as in the first embodiment and the description thereof will be omitted.

The configuration of the signal processing unit 43 is also the same as that of the signal processing unit 22 in the first embodiment illustrated in FIG. 3, except the threshold setting unit 44. Therefore, the same constituent elements as in the first embodiment will be marked with the same reference numerals and the description thereof will be omitted.

The threshold setting unit 44 provided in the signal processing unit 43 in this embodiment is so configured that a threshold value is variably set according to a threshold value signal Sth from the control unit 41.

The control unit 41 controls switching of the direct-current power switch 34 and the alternating-current power switch 36 and thereby controls rotation of the motor 2. More specific description will be given. To rotate the motor 2, it turns on both the switches 34, 36 and thereby applies both direct-current voltage and alternating-current voltage to the motor 2. This is equivalent to, for example, a period including time when the motor 2 is started to start rotation and time when the motor 2 is steadily rotated. As a result, when the motor 2 is rotated, alternating current superimposed voltage obtained by superimposing alternating-current voltage on direct-current voltage is applied to the motor 2.

To brake the motor 2 and eventually stop it, the control unit keeps on the alternating-current power switch 36 and turns off the direct-current power switch 34. That is, the application of direct-current voltage from the direct-current power source 3 is interrupted for braking but the application of alternating-current voltage from the alternating-current power source 4 is continued. Thus detection of rotation angle D and rotational speed N is continued until the motor 2 is completely stopped.

When the motor 2 is rotated, the control unit 41 outputs a threshold value signal Sth to the threshold setting unit 44 in the signal processing unit 43 and thereby sets a threshold value outputted from the threshold setting unit 44. Further, the control unit 41 includes a rotation detection unit 42 that detects the rotation angle D and rotational speed N of the motor 2 based on a rotation pulse Sp from the signal processing unit 43.

The control unit 41 in this embodiment is comprised mainly of a microcomputer. The microcomputer executes various programs, including the motor drive control processing, described later, in FIG. 9, and control of rotation of the motor 2 and detection of the rotation angle D and rotational speed N of the motor 2 are thereby carried out.

Description will be given to the motor drive control processing carried out by the control unit 41 with reference to FIG. 9. When it starts this motor drive control processing, the control unit 41 first acquires and gets a target rotation angle Do and threshold value data Th at Step S110. The target rotation angle Do and the threshold value data may be fixed values stored beforehand in, for example, a memory or may be externally inputted to the control unit 41.

In this example, the target rotation angle Do represents timing with which braking is started and does not represent an angle to be taken as a target at which the motor is to be finally stopped. The target rotation angle Do is also a braking start angle. This is because, even when a brake is applied, the motor 2 is not necessarily immediately stopped and the motor 2 continues rotation through inertia until it is completely stopped.

Consequently, when an angle at which the motor will be finally stopped is set as the target rotation angle Do, it is required to set the target rotation angle to a value with the following taken into account: the amount of inertia rotation that occurs during the period from when braking is started to when the motor is completely stopped.

After the target rotation angle Do and the threshold value data are acquired, a threshold value is set at Step S115. That is, a threshold value signal Sth corresponding to the acquired threshold value data is outputted to the threshold setting unit 44. At the threshold setting unit 44, as a result, a threshold value corresponding to the threshold value data is set.

At Step S120, subsequently, the alternating current superimposition control signal Sac of H level is outputted to the alternating-current power switch 36. The alternating-current power switch 36 is thereby turned on to superimpose an alternating-current component on the energization path through which the motor current is passed. That is, alternating-current voltage from the alternating-current power source 4 is applied to the motor 2.

At Step S125, further, the direct current application control signal Sdc of H level is outputted to the direct-current power switch 34 and the direct-current power switch 34 is thereby turned on to apply direct-current voltage to the motor 2. As a result, alternating current superimposed voltage obtained by superimposing alternating-current voltage on direct-current voltage is applied from the power supply unit 33 to the motor 2 and the motor 2 starts rotation.

At Step S130, subsequently, it is determined whether or not a rotation pulse Sp has been detected, that is, whether or not the rotation pulse Sp has been inputted from the signal processing unit 43. When the rotation pulse Sp is detected (S130: YES), a rotation angle D and a rotational speed N are computed based on the rotation pulse Sp at Step S135. This computation is specifically carried out at the rotation detection unit 42 in the control unit 41.

The rotation angle D is computed based on a count value obtained by counting the rotation pulses Sp. The rotation angle N is computed based on the period of the rotation pulses Sp. For this reason, it is required to await the computation of rotational speed N at least until the second rotation pulse Sp is outputted.

After the rotation angle D and the rotational speed N are computed at Step S135, it is determined at Step S140 whether or not the current rotation angle D is equal to the target rotation angle Do. The processing of Steps S130 to S140 is repeated until the rotation angle D reaches the target rotation angle Do. When the rotation angle D reaches the target rotation angle Do (S140: YES), the following processing is carried out to brake the motor 2: at Step S145, the direct current application control signal Sdc of L level is outputted to the direct-current power switch 34 and the direct-current power switch 34 is thereby turned off to interrupt the application of direct-current voltage to the motor 2. As a result, braking of the motor 2 is started. Even after braking is started, however, the application of alternating-current voltage from the alternating-current power source 4 is continued.

After braking was started at Step S145, it is determined at Step S150 whether or not a time of y seconds has passed or elapsed after the start of braking at Step S145. That is, the time that has passed after the application of direct-current voltage was interrupted is determined. This time of y seconds is a time necessary and sufficient to completely stop the motor 2 after the start of braking. That is, the determination processing of Step S150 can also be considered as processing for determining whether or not the motor 2 has been completely stopped.

When it is determined at Step S150 that a time of y seconds has not passed after the start of braking, the flow proceeds to Step S155 and it is determined whether or not a rotation pulse Sp has been detected as at Step S130. When a rotation pulse Sp has been detected (S155: YES), a rotation angle D and a rotational speed N are computed at Step S160 as at Step S135 and the flow returns to Step S150 again.

When a time of y seconds has passed after the start of braking by the interruption of direct-current voltage at Step S145 (S150: YES), the following processing is carried out at Step S165: the alternating current superimposition control signal Sac of L level is outputted to the alternating-current power switch 36 to turn off the alternating-current power switch 36. The application of alternating-current voltage to the motor 2, that is, the superimposition of the alternating current-component is thereby stopped and this series of motor drive control processing is terminated.

In this example, a rotation angle D is computed at Step S160 each time a rotation pulse Sp is detected even after the start of braking by the interruption of direct-current voltage at Step S145. Instead, the invention may be so configured that the following is implemented: only counting of the rotation pulses Sp is carried out and, after the passage of y seconds, a final rotation angle D is computed based on the total count of rotation pulses Sp so far.

With the thus configured rotation detector 40 in this embodiment, the motor 2 can be easily controlled from start to stop by making it possible to individually control the direct-current power switch 34 and the alternating-current power switch 36.

Braking of the motor 2 is carried out by interrupting the application of direct-current voltage from the direct-current power source 3. In addition, the superimposition of alternating-current voltage by the superimposition unit 35 is continued until the motor 2 is completely stopped. Therefore, its rotation angle D and rotational speed N can be reliably detected until the motor 2 is completely stopped.

The direct-current power switch 34 in this embodiment is also designated as direct current interrupting means for interrupting the supply of direct-current power. The superimposition unit 35 is also designated as alternating-current voltage applying means for superimposing alternating-current power on direct-current power and supplying it. The control unit 41 is also designated as direct current interruption controlling means for interrupting the supply of direct-current power in braking control.

In this embodiment, the control unit 41 is comprised of a microcomputer; however, this is just an example and the control unit 41 can be variously configured as long as it can achieve the desired objects. For example, the control unit 41 can have various configurations in which the functions of controlling the rotation of the motor 2 and detecting the rotation angle D and rotational speed N of the motor 2 can be implemented. This is the same with each control unit in the individual embodiments described later.

In this embodiment, the control unit 41 computes a rotational speed N in addition to a rotation angle D. Instead, the control unit may be configured to compute only a rotation angle D or a rotational speed N.

This embodiment may be so configured that the following is implemented when the threshold setting unit 44 in the signal processing unit 43 can fix the threshold value to a certain value: the threshold value is fixed beforehand as with the threshold setting unit 27 in the signal processing unit 22 in the first embodiment illustrated in FIG. 3. In this case, the processing of Step S115 of the motor drive control processing in FIG. 9, that is, the processing of setting a threshold value is unnecessary.

(Third Embodiment)

Figure 10:
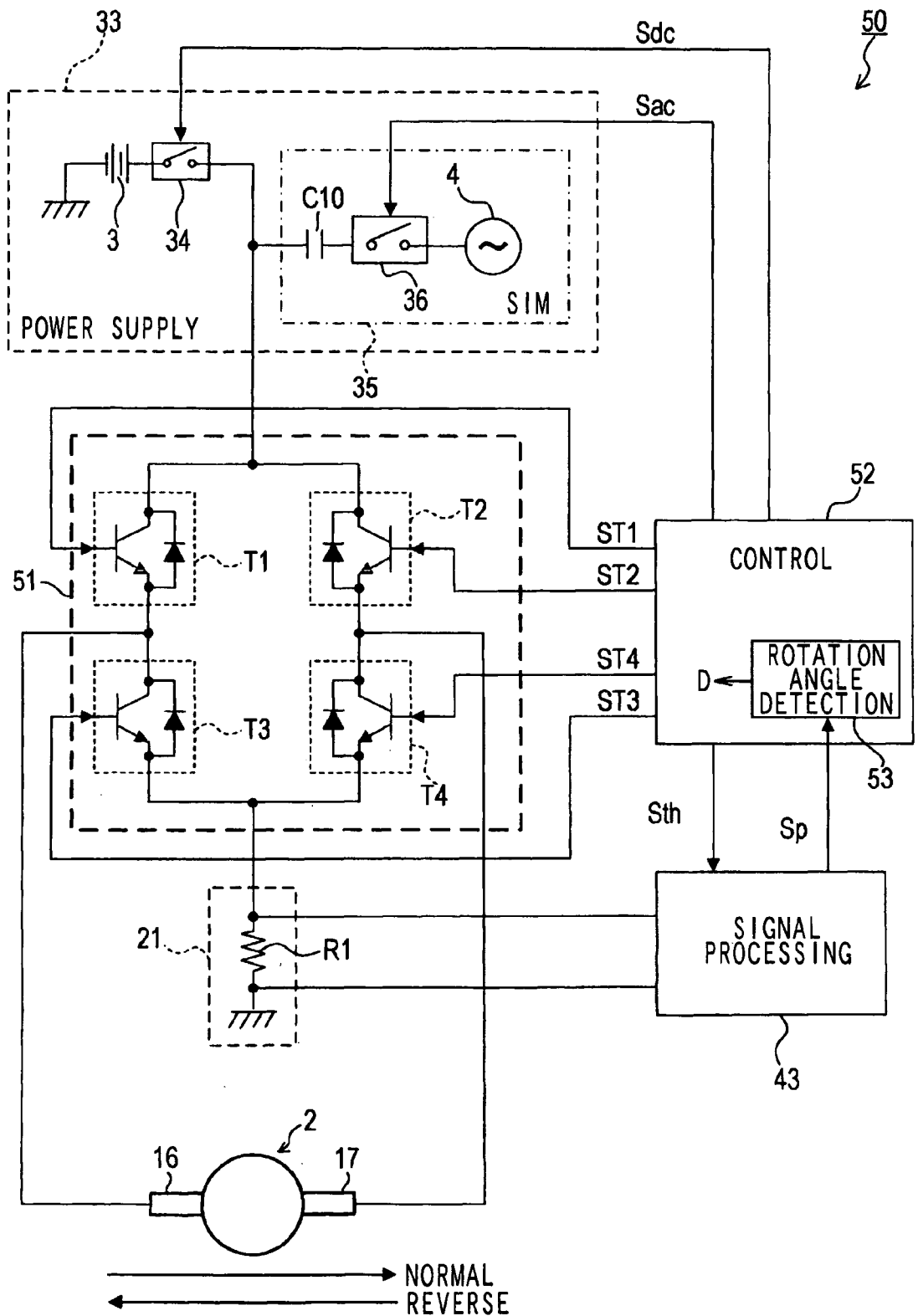
FIG. 10 is a block diagram of a rotation detector in a third embodiment.

FIG. 10 illustrates the general configuration of a rotation angle detector 50 in this embodiment. As illustrated in FIG. 10, the rotation angle detector 50 in this embodiment is different from the rotation detector 40 in the second embodiment illustrated in FIG. 8 mainly in that power is supplied from the power supply unit 33 to the motor 2 through a motor driver 51. The other regards with respect to the configuration are basically the same as those in the rotation detector 40 in the second embodiment. For this reason, the same constituent elements as in the rotation detector 40 in the second embodiment will be marked with the same reference numerals as in the second embodiment and the detailed description thereof will be omitted.

The motor driver 51 is comprised of a publicly known H-bridge circuit comprising four switches. The H-bridge circuit is also designated as full-bridge circuit.

More specific description will be given. The motor driver 51 includes a switch T1, a switch T2, a switch T3, and a switch T4 each composed of a bipolar transistor. The collectors of the switches T1, T2 on the high side are connected to the power supply unit 33; and the emitters of the switches T3, T4 on the low side are connected to ground potential through the current detection unit 21. The emitter of the switch T1 on the high side is connected to the collector of the switch T3 on the low side and this junction point, that is, one intermediate potential point of the H-bridge circuit is connected to one brush 16 of the motor 2. Similarly, the emitter of the other switch T2 on the high side is connected to the collector of the other switch T4 on the low side and this junction point, that is, the other intermediate potential point of the bridge circuit is connected to the other brush 17 of the motor 2.

The bases of the switches T1 to T4 are respectively inputted with motor driver control signals ST1 to ST4 from a control unit 52. Each of the switches T1 to T4 is turned on and off by the motor driver control signal inputted to its own base. Specifically, they are turned on when the motor driver control signal is of H level and turned off when the motor driver control signal is of L level.

Figure 11:
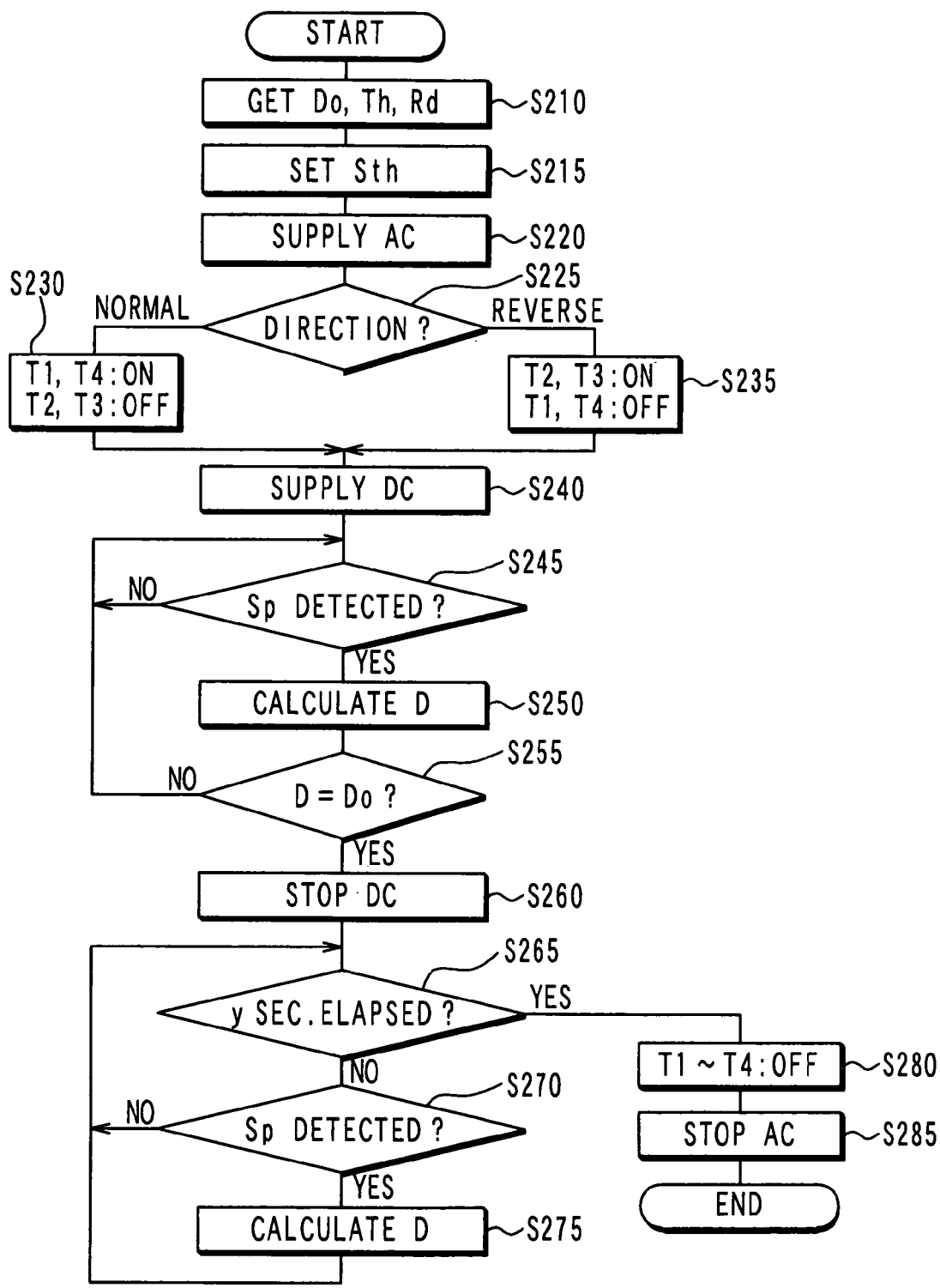
FIG. 11 is a flowchart illustrating motor drive control processing in the third embodiment.

Description will be given to the motor drive control processing carried out by the control unit 52 in this embodiment with reference to FIG. 11. When it starts the motor drive control processing in FIG. 11, the control unit 52 first acquires and gets a target rotation angle Do, threshold value data Th, and a rotation direction Rd at Step S210.

It sets a threshold value at Step S215 (as at Step S115 in FIG. 9) and superimposes an alternating-current component at Step S220 (as at Step S120 in FIG. 9) and determines a rotation direction at Step S225. This determination is made based on the rotation direction acquired at Step S210. When the acquired rotation direction is normal rotation, the flow proceeds to Step S230; and when it is reverse rotation, the flow proceeds to Step S235.

When the acquired rotation direction is normal rotation and thus the flow proceeds to Step S230, motor driver normal rotation control is carried out. That is, of the four switches T1 to T4 comprising the motor driver 51 the switch T1 and the switch T4 are turned on and the other two switches T2, T3 are turned off. At Step S240 direct-current voltage is applied (as at Step S125 in FIG. 9). As a result, alternating current superimposed voltage obtained by superimposing alternating-current voltage on direct-current voltage is applied from the power supply unit 33 to the motor 2 through the motor driver 51 and the motor 2 starts normal rotation. In normal rotation, a motor current flows from one brush 16 to the other brush 17 in the motor 2 as indicated in FIG. 10.

Meanwhile, when the rotation direction acquired at Step S210 is reverse rotation and thus the flow proceeds to Step S235, motor driver reverse rotation control is carried out. That is, of the four switches T1 to T4 comprising the motor driver 51 the switch 72 and the switch T3 are turned on and the other two switches T1, T4 are turned off. Then direct-current voltage is applied at Step S240. As a result, alternating current superimposed voltage is applied to the motor 2 through the motor driver 51 and the motor 2 starts reverse rotation. In reverse rotation, a motor current flows from the other brush 17 to the one brush 16 in the motor 2 as indicated In FIG. 10.

Figure 9:
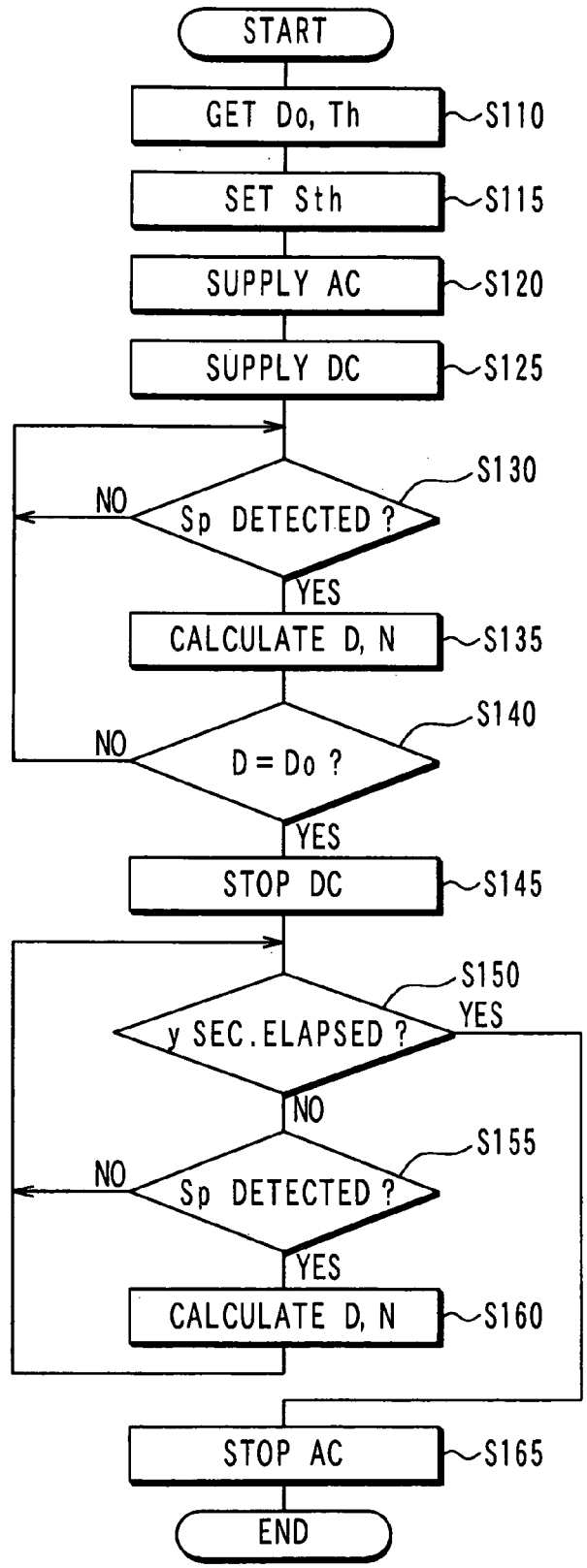
FIG. 9 is a flowchart illustrating motor drive control processing in the second embodiment.

At Step S245, it is determined whether or not a rotation pulse Sp has been detected (as at Step S130 in FIG. 9). When a rotation pulse Sp is detected (S245: YES), a rotation angle D is computed based on the rotation pulse Sp at Step S250. This computation of rotation angle D is specifically carried out at the rotation angle detection unit 53 in the control unit 52 and the computation method is the same as the computation method carried out at Step S135 in FIG. 9.

The processing of each of the subsequent steps S255 to S275 is the same as the processing of each of Steps S140 to S160 in FIG. 9, except that rotational speed N is not included in what should be computed at Step S275. In this embodiment, a rotational speed N is not computed. However, this is just an example and the following measure may be taken in this embodiment: both a rotation angle D and a rotational speed N may be computed as in the first embodiment or only a rotational speed N, not a rotation angle D, may be computed.

When a time of y seconds has passed after braking was started by the interruption of direct-current voltage at Step S260 (S265: YES), motor driver stopping control is carried out at Step S280. That is, all the four switches T1 to T4 comprising the motor driver 51 are turned off.

At Step S285 the alternating-current power switch 36 is turned off to stop the application of alternating-current voltage to the motor 2 as at Step S165 in FIG. 9 and this series of motor drive control processing is terminated.

As mentioned above, the rotation angle detector 50 in this embodiment has the motor driver 51 and can thus control normal rotation or reverse rotation of the motor 2. Both in normal rotation and in reverse rotation, a motor current is passed through the current detection unit 21 and the application of alternating-current voltage from the superimposition unit 35 is continued even after braking is started by the interruption of direct-current voltage. Both in normal rotation and in reverse rotation, for this reason, a rotational state can be reliably detected not only in steady rotation but also during the period from when braking is started to when the motor is completely stopped.

(Fourth Embodiment)

Description will be given to a rotation angle detector in this embodiment. The rotation angle detector in this embodiment is identical with the rotation angle detector 50 in the third embodiment illustrated in FIG. 10 in hardware configuration. That is, the motor 2 is driven by the motor driver 51 and the motor driver 51 is controlled according to the individual motor driver control signals ST1 to ST4 from the control unit 52.

A difference of the rotation angle detector in this embodiment from the rotation angle detector 50 in the third embodiment lies in a braking method for braking the motor 2. This will be described. In the third embodiment, a brake is applied by interrupting direct-current voltage from the direct-current power source 3 as in the second embodiment. In this embodiment, PWM braking is carried out. In this braking, a brake is applied by alternately switching the polarity of direct-current voltage applied from the direct-current power source 3 to the motor 2 at a predetermined duty ratio Sw [%]. The duty ratio Sw is also designated as braking PMW duty and this is equivalent to the switching time ratio described above.

Specifically, the following periods are alternately switched at the above duty ratio as illustrated in FIGS. 12A to 12E: a period during which the switch T1 and the switch T4 are turned on and the switch T2 and the switch T3 are turned off and one brush 16 in the motor 2 is thereby brought to high potential; and a period during which the switch T2 and the switch T3 are turned on and the switch T1 and the switch T4 are turned off and the other brush 17 in the motor 2 is thereby brought to high potential. In other words, a period during which the motor 2 is caused to normally rotate and a period during which the motor 2 is caused to reversely rotate are alternately switched.

In this embodiment, the above duty ratio Sw is set to 50[%] so that the average value of direct-current voltage applied to the motor 2 is zero. The following is Implemented by switching the polarity of direct-current power applied to the motor 2 at a duty ratio of 50% as mentioned above: rotary torque in a specific direction is not given to the motor 2 and thus the rotating motor 2 is braked and stopped. Switching of the polarity of direct-current power is equivalent to switching of the rotation direction.

Setting the duty ratio Sw to 50[%] is just an example and any value within a range within which the rotation of the motor 2 can be stopped can be appropriately set for the duty ratio Sw.

The frequency (hereafter, referred to as "PWM frequency") with which the polarity of direct-current voltage applied from the direct-current power source 3 to the motor 2 at the above duty ratio Sw can be appropriately set. However, it is required to set the frequency to a value different from that of the frequency of alternating-current voltage applied from the superimposition unit 35. That is, the PWM frequency is different from the frequency of alternating-current voltage outputted from the alternating-current power source 4. More specifically, it is advisable to ensure that the frequency of alternating-current voltage should be higher than the PWM frequency.

Figure 12A:
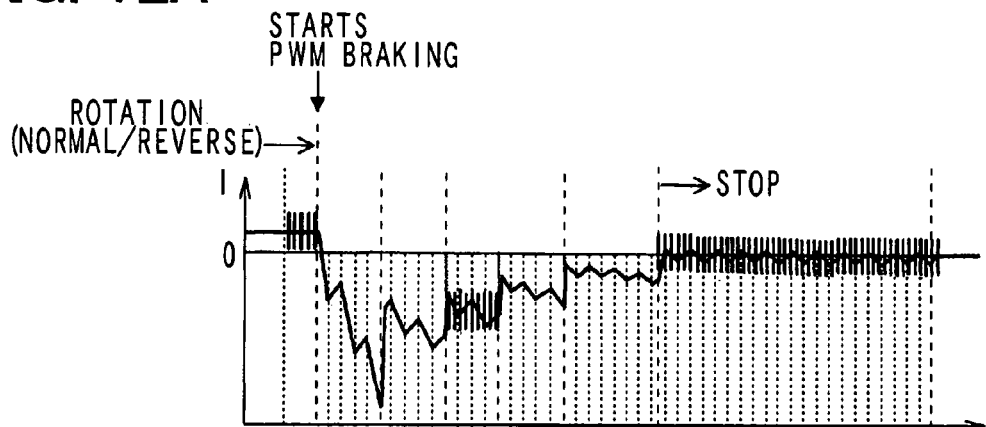
FIG. 12A is a waveform chart obtained when PWM braking in a fourth embodiment is carried out.
Figure 12B:
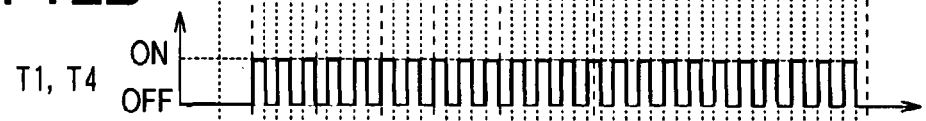
FIG. 12B is a waveform chart obtained when PWM braking in the fourth embodiment is carried out.
Figure 12C:
FIG. 12C is a waveform chart obtained when PWM braking in the fourth embodiment is carried out.
Figure 12D:
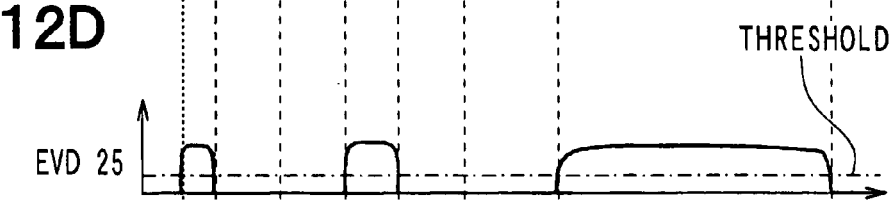
FIG. 12D is a waveform chart obtained when PWM braking in the fourth embodiment is carried out.
Figure 12E:
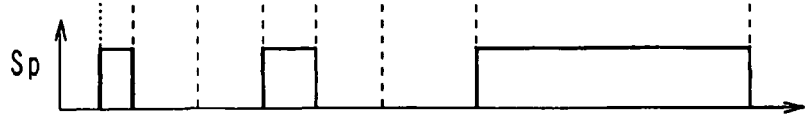
FIG. 12E is a waveform chart obtained when PWM braking in the fourth embodiment is carried out.

The motor current waveform detected by the current detection unit 21 in PWM braking is as indicated in FIG. 12A. This is current waveform disturbed by switching the polarity of applied direct-current voltage and the alternating-current component arising from alternating-current voltage from the superimposition unit 35 is superimposed on this disturbed waveform.

Consequently, the following can be implemented by setting the frequency of alternating-current voltage higher than the PWM frequency: the component of PWM frequency is removed through the HPF 23 located at the input stage of the signal processing unit 43; and only the alternating-current component arising from alternating-current voltage from the superimposition unit 35 can be easily taken out. When the alternating-current component from the superimposition unit 35 can be taken out as mentioned above, the following can be implemented: envelope detection is thereafter carried out by the envelope detection unit 25 and a rotation pulse Sp can be generated based on an envelope detection signal obtained as the result of this envelope detection.

Figure 13:
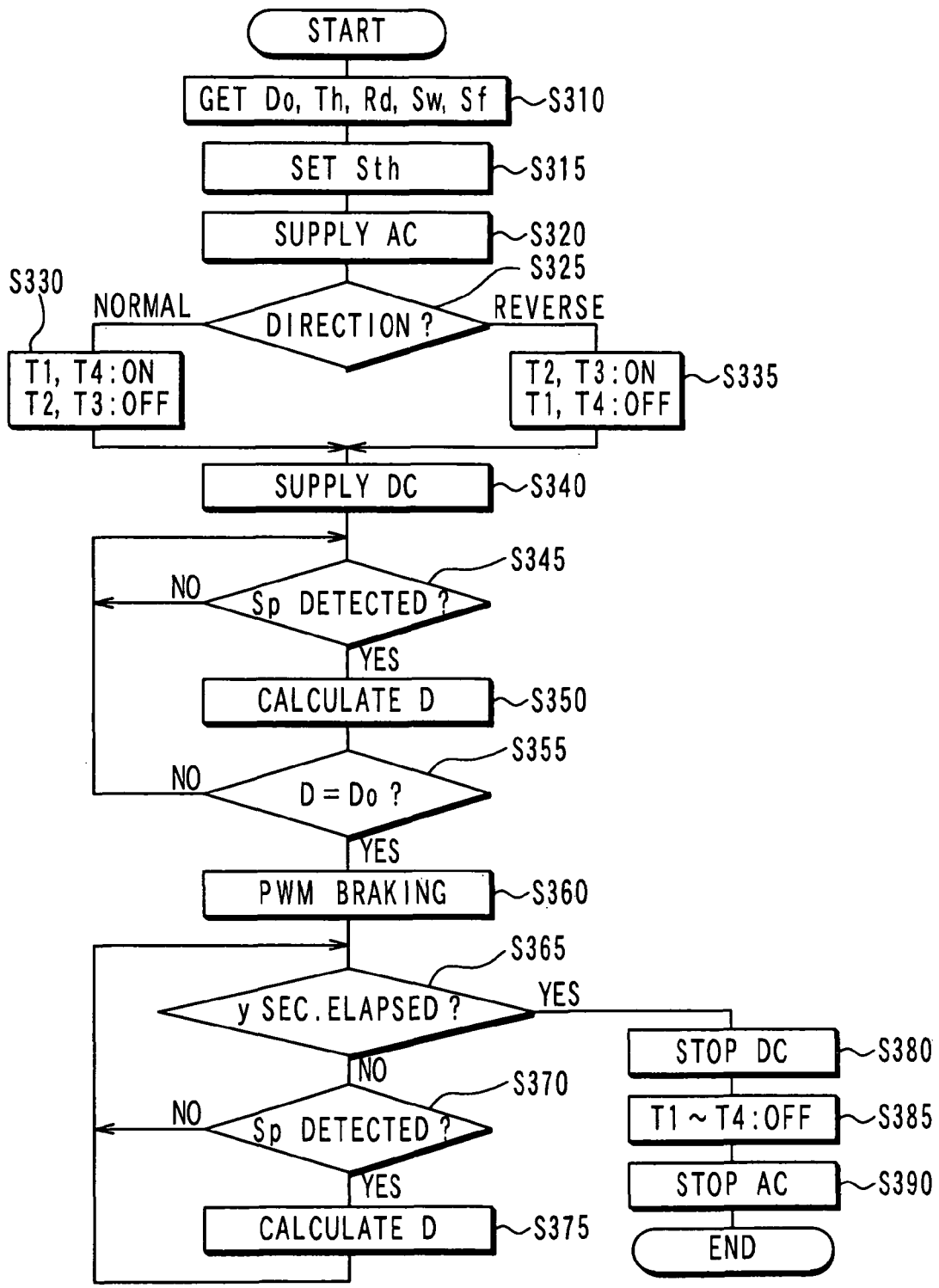
FIG. 13 is a flowchart illustrating motor drive control processing in a fourth embodiment.

Description will be given to motor drive control processing in this embodiment with reference to FIG. 13. When the motor drive control processing in FIG. 13 is started, the control unit first acquires a target rotation angle Do, threshold value data, a rotation direction, braking PWM duty Sw, and a PWM frequency Sf at Step S310.

The processing of the subsequent steps S315 to S355, that is, processing carried out before the rotation angle D of the motor 2 reaches the target rotation angle Do is the same as the following processing: the processing of Steps S215 to S255 of the motor drive control processing in the third embodiment illustrated in FIG. 1.

When the rotation angle D of the motor 2 reaches the target rotation angle Do (S355: YES), motor driver PWM braking control is carried out at Step S360. That is, the above-mentioned PWM braking is carried out at a duty ratio of Sw [%] and a PWM frequency of Sf.

At Step S365, it is determined whether or not a time of y seconds has passed after the start of PWM braking control at Step S360. Until a time of y seconds has passed, a rotation angle D is computed each time a rotation pulse Sp is detected. When a time of y second has passed (S365: YES), the direct-current power switch 34 is turned off to Interrupt the application of direct-current voltage at Step S380. At Step S385, further, motor driver stopping control is carried out as at Step S280 in FIG. 11 and at Step S390, subsequently, the alternating-current power switch 36 is turned off to stop the application of alternating-current voltage to the motor 2. This series of motor drive control processing is thereby terminated.

In this embodiment, as mentioned above, the motor 2 can be braked and stopped in braking by taking the following measure without interrupting the application of direct-current voltage: PWM braking is carried out and the average value of direct-current voltage applied to the motor 2 is thereby zeroed. Or, the average value of direct-current voltage may be reduced to so small a value that the motor 2 is not rotated.

Also in this PWM braking, the application of alternating current superimposed voltage to the motor 2 is continued during a period from when braking is started to when the motor 2 is completely stopped. Therefore, a rotational state can be reliably detected until the motor is completely stopped.

(Fifth Embodiment)

Figure 14:
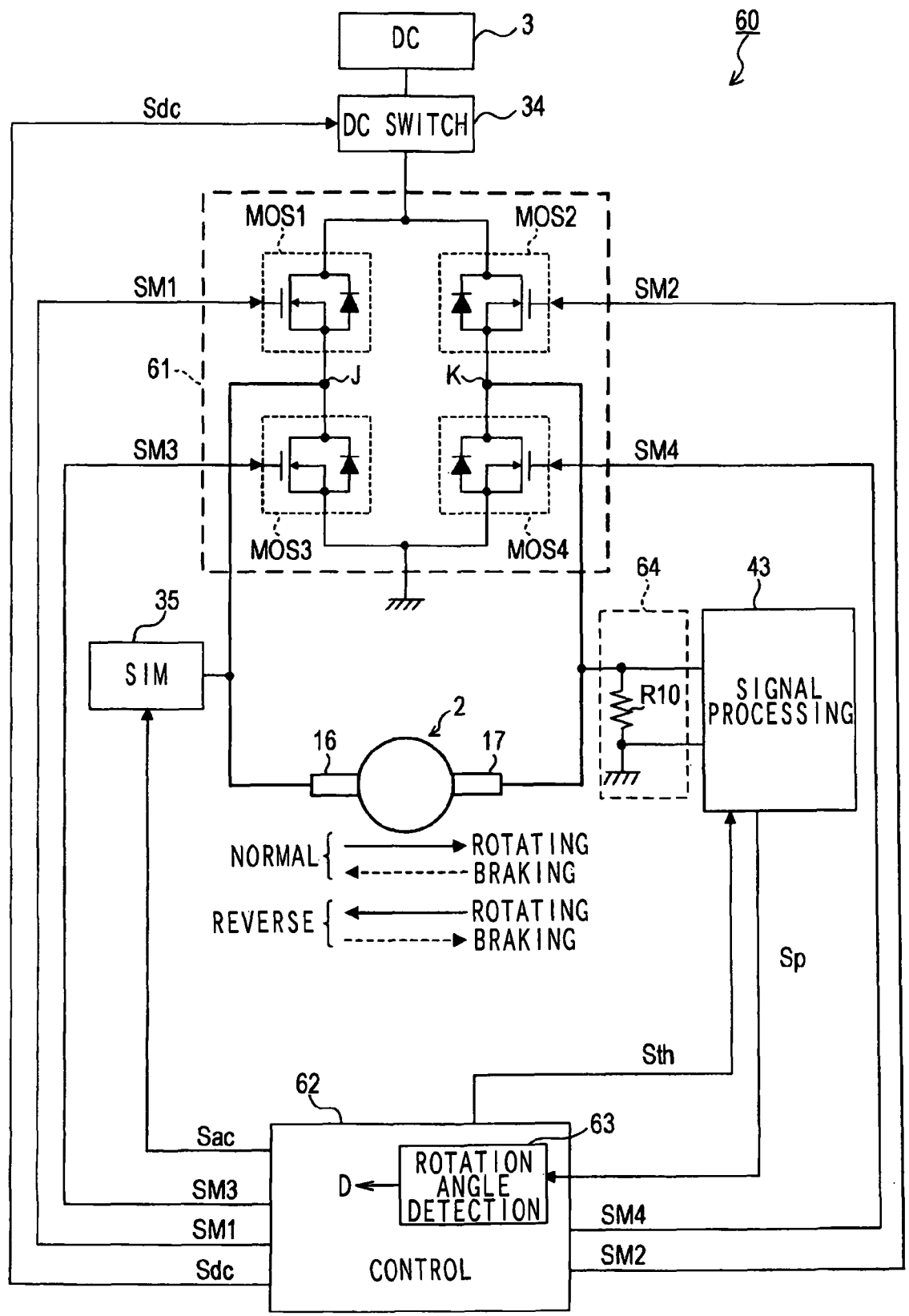
FIG. 14 is a block diagram of a rotation detector in a fifth embodiment.

FIG. 14 illustrates the general configuration of a rotation angle detector 60 in this embodiment. In FIG. 14 illustrating the rotation angle detector 60, the same constituent elements as those of the rotation angle detector 50 in the third embodiment illustrated in FIG. 10 will be marked with the same reference numerals as in FIG. 10. The detailed description thereof will be omitted.

The rotation angle detector 60 in this embodiment is identical with the rotation angle detector 50 in the third embodiment illustrated in FIG. 10 in that direct-current voltage from the direct-current power source 3 is applied to the motor 2 through a motor driver 61. However, while the motor 2 is braked by PWM braking in the third embodiment, the motor 2 is braked by short circuit braking in the rotation angle detector 60 in this embodiment.

The motor driver 61 is formed of a publicly known H-bridge circuit comprised of four switches.

More specific description will be given. The motor driver 61 includes a switch MOS1, a switch MOS2, a switch MOS3, and a switch MOS4 each composed of MOSFET. The drains of the switches MOS1, MOS2 on the high side are connected to the direct-current power source 3 through the direct-current power switch 34; and the sources of the switches MOS3, MOS4 on the low side are connected to ground potential. The source of the switch MOS1 on the high side is connected to the drain of the switch MOS3 on the low side and this junction point (intermediate potential point J) is connected to one brush 16 in the motor 2. Similarly, the source of the other switch MOS2 on the high side is connected to the drain of the other switch MOS4 on the low side and this junction point (intermediate potential point K) is connected to the other brush 17 in the motor 2.

The gates of the switches MOS1 to MOS4 are respectively inputted with motor driver control signals SM1 to SM4 from a control unit 62. Each of the switches MOS1 to MOS4 is turned on and off by the motor driver control signal inputted to its own base. Specifically, they are turned on when the motor driver control signal is of H level and turned off when the motor driver control signal is of L level.

The short circuit braking carried out in this embodiment is as follows: of the four switches MOS1 to MOS4 comprising the motor driver 61, the two switches MOS3, MOS4 on the low side are turned on; and the terminals of the motor 2, that is, the brushes 16, 17 are thereby short-circuited to each other through these switches MOS3, MOS4 to brake the motor 2. When the brushes 16, 17 of the rotating motor 2 are short-circuited to each other through the switches MOS3, MOS4, the following takes place: energy arising from the back electromotive force of the motor 2 produced as the result of this short circuit is consumed by the switches MOS3, MOS4 on the low side and the motor 2; and as a result, the motor 2 is braked and eventually stopped.

In the rotation angle detector 50 in the third embodiment illustrated in FIG. 10, the superimposition unit 35 is provided upstream of the motor driver and the current detection unit 21 is provided downstream of the motor driver. When the motor 2 is braked by short circuit braking in this configuration, the following takes place: during a period during which short circuit braking is carried out, alternating-current voltage from the superimposition unit 35 is not applied to the motor 2; and at the same time the motor current passed through the motor 2 is not passed through the current detection unit 21.

In this embodiment, consequently, the superimposition unit 35 and the detection unit 64 are provided on the following common current paths among the energization paths from the direct-current power source 3 to the motor 2: common current paths through which motor current flows both during a period from start to steady rotation and in short circuit braking.

As illustrated in FIG. 14, more specifically, the superimposition unit 35 is provided on a first common current path extending from one intermediate potential point 3 of the motor driver 61 to one brush 16 of the motor 2; and the detection unit 64 is provided on a second common current path extending from the other intermediate potential point K of the motor driver 61 to the other brush 17 of the motor 2.

The detection unit 64 is comprised of a resistor R10 connected between the second common current path and ground potential. Voltage across the resistor R10, that is, voltage on the second common current path relative to ground potential is inputted to the signal processing unit 43. In this embodiment, that is, the voltage on an energization path from the direct-current power source 3 to the motor 2 is detected by the detection unit 64. The signal processing unit 43 generates a rotation pulse Sp based on the alternating-current component contained in the detected voltage.

FIGS. 15A to 15D illustrate examples of the following: the waveform of motor current passed through the motor 2 in this embodiment; the waveform of output from the HPF 23 in the signal processing unit 43; an envelope detection signal from the envelope detection unit 25; and rotation pulses Sp.

Figure 15A:
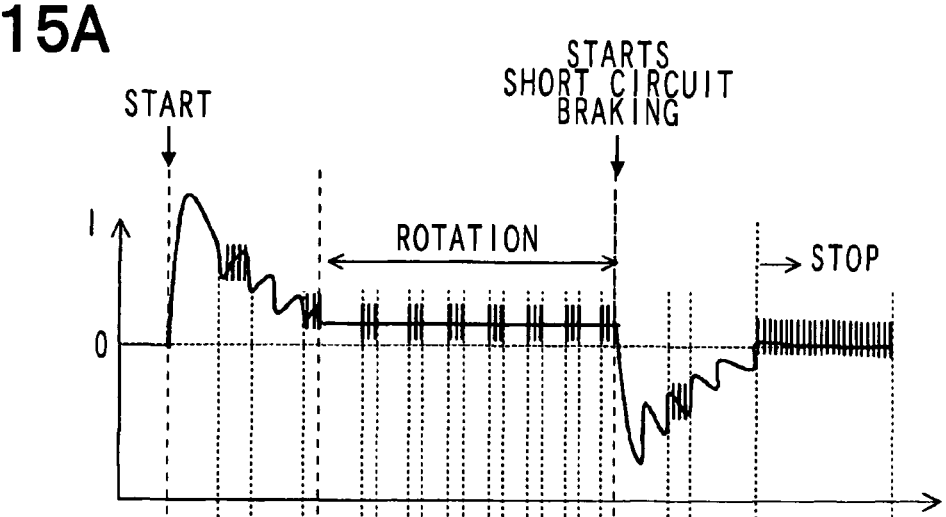
FIG. 15A is a waveform chart obtained when short circuit braking in the fifth embodiment is carried out.
Figure 15B:
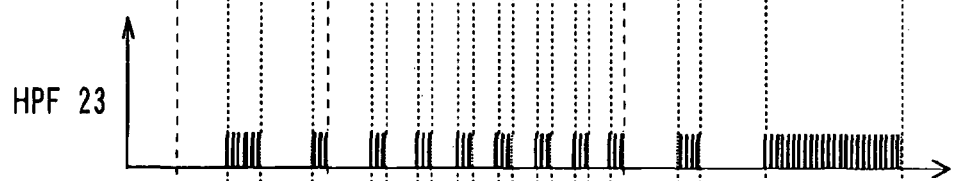
FIG. 15B is a waveform chart obtained when short circuit braking in the fifth embodiment is carried out.
Figure 15C:
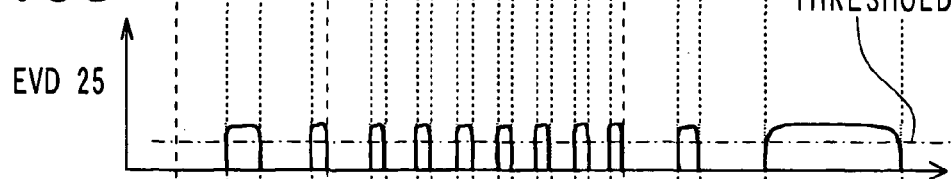
FIG. 15C is a waveform chart obtained when short circuit braking in the fifth embodiment is carried out.
Figure 15D:
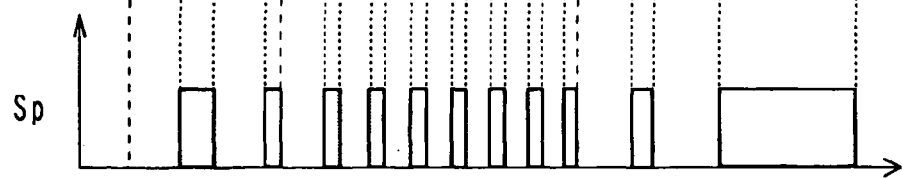
FIG. 15D is a waveform chart obtained when short circuit braking in the fifth embodiment is carried out.

In this embodiment, as described above, the superimposition unit 35 and the detection unit 64 are provided on common current paths through which motor current constantly flows during all the periods from start to stop. For this reason, the motor current contains the alternating-current component arising form alternating-current voltage from the superimposition unit 35 during all the periods from start to steady rotation to stop as indicated in FIG. 15A. For this reason, a rotation pulse Sp can be generated based on detection signals inputted from the detection unit 64 during all these periods.

Figure 16:
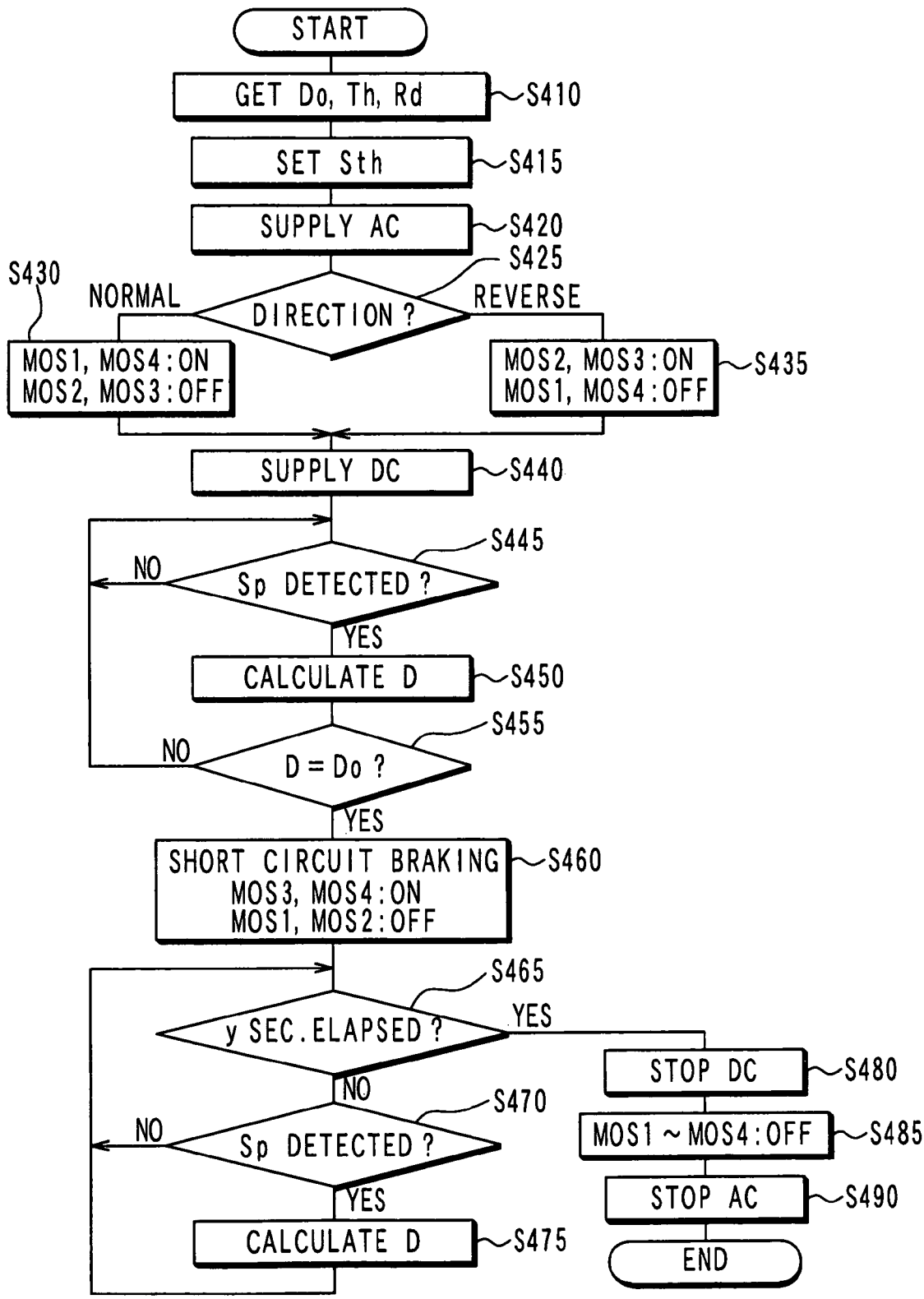
FIG. 16 is a flowchart illustrating motor drive control processing in the fifth embodiment.

Description will be given to the motor drive control processing carried out by the control unit 62 in this embodiment with reference to FIG. 16. The processing of each of Steps S410 to S455, that is, the processing from start till the target rotation angle Do being reached in the motor drive control processing in FIG. 16 is the same as the following processing: the processing of Steps S210 to S255 in the motor drive control processing in the third embodiment illustrated in FIG. 11. However, while the motor driver 51 in the third embodiment is comprised of four switches T1 to T4 each composed of a bipolar transistor, the motor driver 61 in this embodiment is comprised of four switches MOS1 to MOS4 each composed of MOSFET.

In the motor drive control processing in this embodiment, for this reason, the following processing is carried out in motor driver normal rotation control (S430): of the four switches MOS1 to MOS4 comprising the motor driver 61, the switch MOS1 and the switch MOS4 are turned on and the other two switches MOS2, MOS3 are turned off. Meanwhile, the following processing is carried out in motor driver reverse rotation control (S435): of the four switches MOS1 to MOS4, the switch MOS2 and the switch MOS3 are turned on and the other two switches MOS1, MOS4 are turned off.

When the rotation angle D of the motor 2 reaches the target rotation angle Do (S455: YES), motor driver short circuit braking control is carried out at Step S460. That is, of the four switches MOS1 to MOS4 comprising the motor driver 61, the two switches MOS3, MOS4 on the low side are turned on so that a short-circuit current is passed through the motor 2 through the switches MOS3, MOS4.

As a result, the application of direct-current voltage from the direct-current power source 3 to the motor 2 is interrupted. Further, energy arising form the back electromotive force of the motor 2 is consumed in this short circuit path and the motor 2 gradually approaches a stop.

Until a time of y seconds has passed from the start of motor driver short circuit braking control at Step S460, the computation of rotation angle D based on a rotation pulse Sp is continued (S470 to S475). When a time of y seconds has passed (S465: YES), the application of direct-current voltage is interrupted (S480) and motor driver stopping control is carried out. In this motor driver stopping control, all the switches MOS1 to MOS4 in the motor driver 61 are turned off (S490). The superimposition of alternating-current component by the superimposition unit 35 is thereby stopped (S490).

In this embodiment, as mentioned above, braking of the motor 2 is carried out by short circuit braking. When short circuit braking is carried out by turning on the two switches MOS3, MOS4 on the low side in the motor driver 61, the following path is produced among the energization paths from the direct-current power source 3 to the motor 2: a path through which a motor current flows in steady rotation but a motor current does not flow in short circuit braking.

In this embodiment, consequently, the following measure is taken: alternating-current voltage is applied from the superimposition unit 35 to common current paths through which motor current flows during all the periods from start to steady rotation to braking to stop; and further the detection unit 64 is also provided on a common current path to detect voltage on this common current path. For this reason, the following can be implemented even in the rotation angle detector 60 so configured that the motor 2 is braked by short circuit braking as in this embodiment: the rotation angle of the motor 2 can be reliably detected during all the periods from start to steady rotation to braking to stop.

(Sixth Embodiment)

Figure 17:
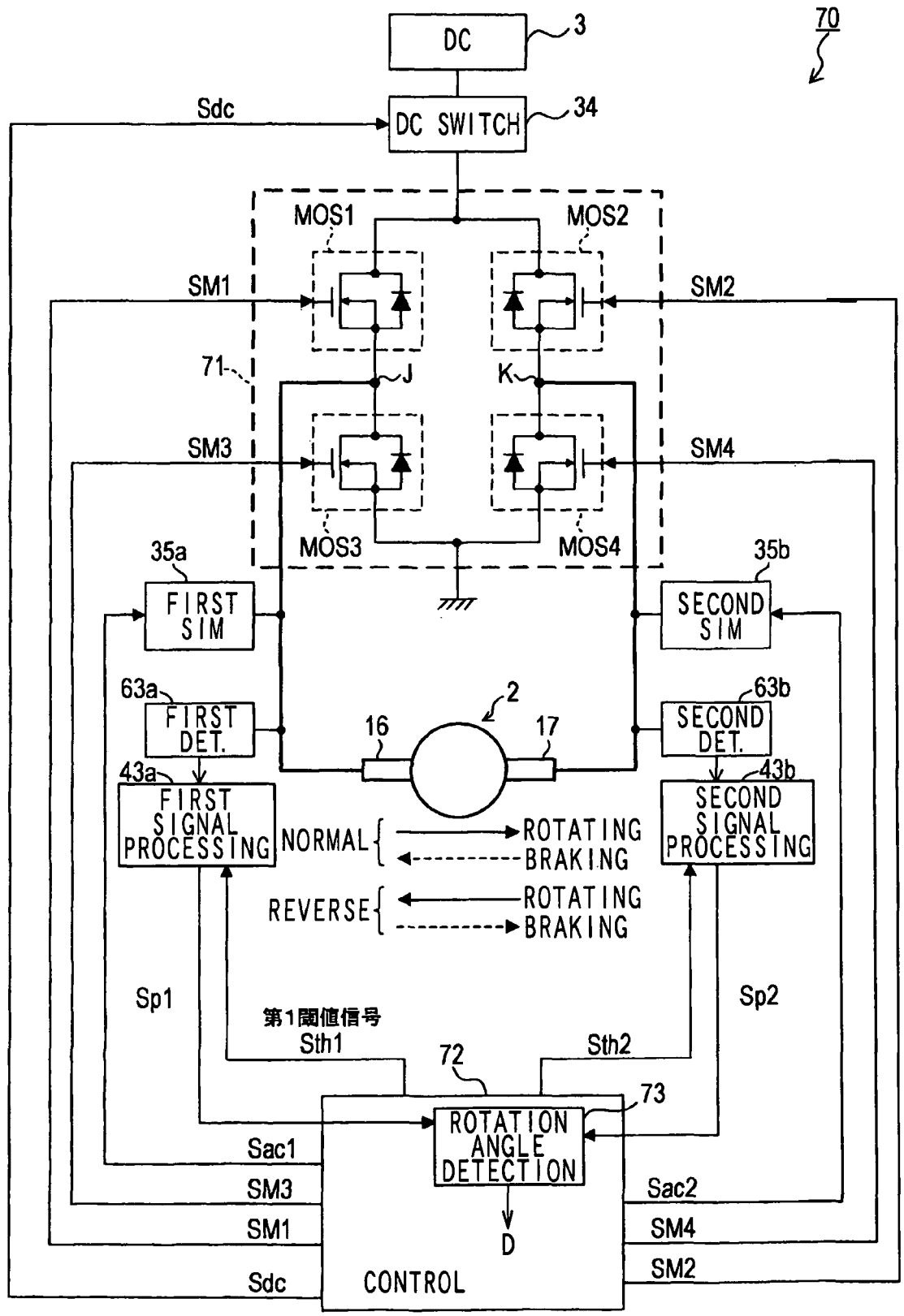
FIG. 17 is a block diagram of a rotation detector in a sixth embodiment.

FIG. 17 illustrates the general configuration of a rotation angle detector 70 in this embodiment. In FIG. 17 illustrating the rotation angle detector 70, the same constituent elements as those of the rotation angle detector 60 in the fifth embodiment illustrated in FIG. 14 will be marked with the same reference numerals as in FIG. 14. The detailed description thereof will be omitted.

A difference of the rotation angle detector 70 in this embodiment from the rotation angle detector 60 in FIG. 14 lies in the method for connecting a superimposition unit and a detection unit to each common current path. In this embodiment, as is apparent from FIG. 17, a first superimposition unit 35a and a first detection unit 63a are provided on a first common current path between one intermediate potential point J in a motor driver 71 and one brush 16 in the motor 2. In addition, a second superimposition unit 35b and a second detection unit 63b are provided on a second common current path between the other intermediate potential point K in the motor driver 71 and the other brush 17 in the motor 2.

The first superimposition unit 35a and the second superimposition unit 35b provided on the respective common current paths both have the same configuration as that of the superimposition unit 35 illustrated In FIG. 8. The first detection unit 63a and the second detection unit 63b provided on the respective common current paths both have the same configuration as that of the detection unit 64 illustrated in FIG. 14.

With this configuration, an alternating current superimposition control signal Sac1 for turning on and off the alternating-current power switch 36 provided in the first superimposition unit 35a is outputted from a control unit 72 to the first superimposition unit 35a. Further, an alternating current superimposition control signal Sac2 for turning on and off the alternating-current power switch 36 provided in the second superimposition unit 35b is outputted to the second superimposition unit 35b.

The rotation angle detector further includes: a first signal processing unit 43a that generates a first rotation pulse Sp1 based on the result of detection by the first detection unit 63a; and a second signal processing unit 43b that generates a second rotation pulse Sp2 based on the result of detection by the second detection unit 63b. The signal processing units 43a, 43b both have the same configuration as that of the signal processing unit 43 illustrated in FIG. 8.

For this reason, the following threshold value signal are outputted from the control unit 72: a first threshold value signal Sth1 for causing the threshold setting unit 44 provided in the first signal processing unit 43a to set a threshold value is outputted to the first signal processing unit 43a; and a second threshold value signal Sth2 for causing the threshold setting unit 44 provided in the second signal processing unit 43b to set a threshold value is outputted to the second signal processing unit 43b.

In the thus configured rotation angle detector 70, the following processing is carried out to normally rotate the motor 2: during a period from start to steady rotation, alternating-current voltage is applied at the first superimposition unit 35a. Then the second signal processing unit 43b generates a second rotation pulse Sp2 based on the result of detection by the second detection unit 63b.

When the motor 2 in normal rotation is subjected to short circuit braking, a current arising from back electromotive force is passed through the motor 2 in the opposite direction to the direction in steady rotation as mentioned above. In short circuit braking, consequently, alternating-current voltage is applied by the second superimposition unit 35b in place of the first superimposition unit 35a. In place of the second signal processing unit 43b, the first signal processing unit 43a generates a first rotation pulse Sp1 based on the result of detection by the first detection unit 63a.

Meanwhile, to reversely rotate the motor 2, the following processing is carried out during a period from start to steady rotation: alternating-current voltage is applied at the second superimposition unit 35b and the first signal processing unit 43 generates a first rotation pulse Sp1 based on the result of detection by the first detection unit 63a.

When the motor 2 in reverse rotation is subjected to short circuit braking, a current arising from back electromotive force is passed through the motor 2 in the opposite direction to the direction in steady rotation as mentioned above. In short circuit braking, consequently, alternating-current voltage is applied by the first superimposition unit 35a in place of the second superimposition unit 35b. In place of the first signal processing unit 43a, the second signal processing unit 43b generates a second rotation pulse Sp2 based on the result of detection by the second detection unit 63b.

That is, during a period from start to steady rotation, alternating-current voltage is applied by the superimposition unit provided on the common current path connected to the positive pole of the direct-current power source 3. A rotation angle D is detected based on the result of detection by the detection unit provided on the common current path connected to the negative pole of the direct-current power source 3. In short circuit braking, meanwhile, alternating-current voltage is applied by the other superimposition unit different from that in the period from start to steady rotation. A rotation angle D is detected based on the result of detection by the other detection unit from that in the period from start to steady rotation.

Description will be given to the motor drive control processing carried out by the control unit 72 in this embodiment with reference to FIG. 18. When it starts this motor drive control processing, the control unit 72 acquires a target rotation angle Do, threshold value data, and a rotation direction at Step S510. The threshold value data corresponds to the threshold setting unit 44 in the first signal processing unit 43a and the threshold setting unit 44 in the second signal processing unit 43b.

At Step S515, threshold values are set. Specifically, a first threshold value signal Sth1 is outputted to the first signal processing unit 43a and a second threshold value signal Sth2 is outputted to the second signal processing unit 43b.

At Step S520, a rotation direction is determined. When the rotation direction is normal rotation, an alternating-current component is superimposed at the first superimposition unit 35a at Step S525. That is, alternating-current voltage from the alternating-current power source 4 in the first superimposition unit 35a is superimposed. At Step S530, then, motor driver normal rotation control is carried out.

The processing of each of Steps S535 to S555 is basically the same as the processing of each of Steps S440 to S460 in FIG. 16. However, the rotation pulse to be detected at Step S540 is a second rotation pulse Sp2 from the second signal processing unit 43b.

After the motor driver short circuit braking control is started at Step S555, at Step S560, subsequently, the superimposition unit is changed and the rotation pulse to be detected is changed. That is, alternating-current voltage is superimposed by the second superimposition unit 35b in place of the first superimposition unit 35a and the rotation pulse to be detected is changed to a first rotation pulse Sp1. Thereafter, the flow proceeds to the next step, Step S565.

The processing of each of Steps S565 to S575 is basically the same as the processing of each of Steps S465 to S475 in FIG. 16. However, the rotation pulse to be detected at Step S570 is a first rotation pulse Sp1 from the first signal processing unit 43a. When it is determined at Step S565 that a time of y seconds has passed after the start of short circuit braking control, the flow proceeds to Step S635. The processing of each of Steps S635 to S645 is the same as the processing of each of Steps S480 to S490 in FIG. 16.

When it is determined by the rotation direction determination of Step S520 that the rotation direction is reverse rotation, an alternating-current component is superimposed at the second superimposition unit 35b at Step S580. That is, alternating-current voltage from the alternating-current power source 4 in the second superimposition unit 35b is superimposed. At Step S585, then, motor driver reverse rotation control is carried out.

The processing of each of Steps S590 to S610 is basically the same as the processing of each of Steps S440 to S460 in FIG. 16. However, the rotation pulse to be detected at Step S595 is a first rotation pulse Sp1 from the first signal processing unit 43a.

After motor driver short circuit braking control is started at Step S610, at Step S615, subsequently, the superimposition unit is changed and the rotation pulse to be detected is changed. That is, alternating-current voltage is superimposed by the first superimposition unit 35a in place of the second superimposition unit 35b and the rotation pulse to be detected is changed to a second rotation pulse Sp2. Thereafter, the flow proceeds to the next step, Step S620.

The processing of each of Steps S620 to S630 is basically the same as the processing of each of Steps S465 to S475 in FIG. 16. However, the rotation pulse to be detected at Step S625 is a second rotation pulse Sp2 from the second signal processing unit 43b.

As mentioned above, the superimposition unit and the detection unit are changed between normal rotation and reverse rotation and further the superimposition unit and the detection unit are changed between the period from start to steady rotation and short circuit braking. This is because the following takes place when one superimposition unit 35 and one detection unit 64 are provided as in the rotation angle detector 60 in the fifth embodiment Illustrated in FIG. 14: the impedance of the alternating-current circuit differs in normal rotation. In reverse rotation, and in short circuit braking. This impedance of the alternating-current circuit is impedance viewed from the superimposition units 35.

Figure 19A:
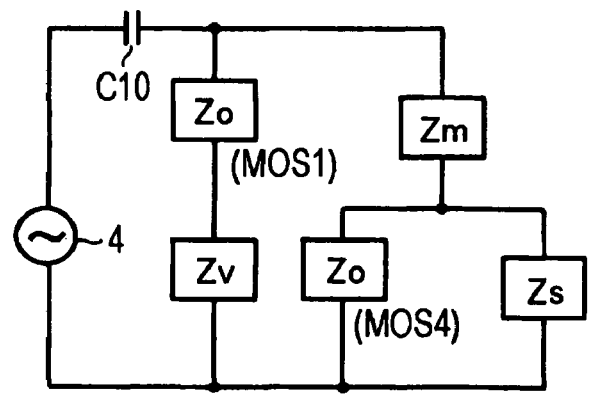
FIG. 19A is a circuit diagram illustrating an equivalent circuit of an alternating-current circuit established in normal rotation is a rotation detector in the fifth embodiment.
Figure 19B:
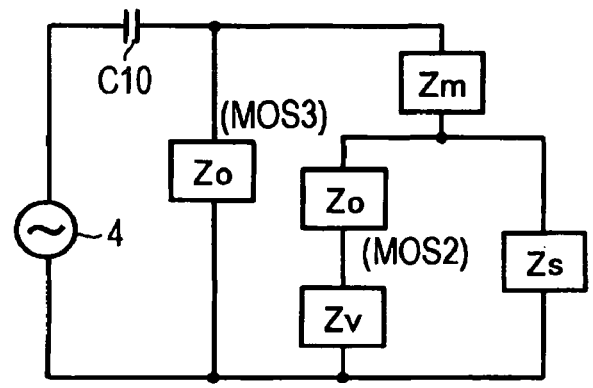
FIG. 19B is a circuit diagram illustrating an equivalent circuit of an alternating-current circuit established in reverse rotation in a rotation detector in the fifth embodiment.
Figure 19C:
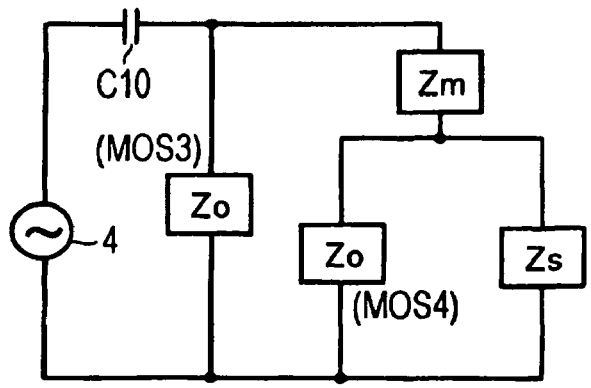
FIG. 19C is a circuit diagram illustrating an equivalent circuit of an alternating-current circuit established in short circuit braking in a rotation detector in the fifth embodiment.

FIGS. 19A to 19C respectively illustrate the equivalent circuits of the alternating-current circuit in the rotation angle detector 60 in FIG. 14 in normal rotation, in reverse rotation, and in short circuit braking. In the rotation angle detector 60 in FIG. 14, the switch MOS1 and the switch MOS4 are turned on in the motor driver 61 in normal rotation. Therefore, the equivalent circuit of the alternating-current circuit in normal rotation is as illustrated in FIG. 19A. In FIG. 19A to FIG. 19C, Zv denotes the alternating-current impedance of the direct-current power source 3; Zm is the alternating-current impedance of the motor 2; Zo Is the alternating-current impedance, that is, the on resistance of each of the switches MOS1 to MOS4; and Zs is the alternating-current impedance of the detection units 63 and the signal processing units 43.

In reverse rotation, the switch MOS2 and the switch MOS3 are turned on in the motor driver 61. Therefore, the equivalent circuit of the alternating-current circuit in reverse rotation is as illustrated in FIG. 19B. In short circuit braking, the switch MOS3 and the switch MOS4 are turned on in the motor driver 61. Therefore, the equivalent circuit of the alternating-current circuit in reverse rotation is as illustrated in FIG. 19C.

In the rotation angle detector 60 in FIG. 14, as mentioned above, the equivalent circuit of the alternating-current circuit differs in normal rotation, in reverse rotation, and in short circuit braking. Consequently, the alternating-current voltage applied to the detection unit has different values. That is, the amplitude level of the alternating-current component contained in the result of detection by the detection unit varies in normal rotation, in reverse rotation, and in short circuit braking.

In the rotation angle detector 60 in FIG. 14, for this reason, it is required to take the following measure so that a rotation pulse Sp is accurately generated in any of normal rotation, reverse rotation, and short circuit braking: it is required to set an amplification factor of the amplification unit 24 and a threshold value set at the threshold setting unit 27.

In this embodiment, consequently, a superimposition unit is respectively provided at both ends of the motor 2. Further, the superimposition units are provided on common current paths. In other words, one superimposition unit is provided on the common current path at one end of the motor 2 and another superimposition unit is provided on the common current path at the other end of the motor 2. In addition, the detection units and the signal processing units are provided at both ends of the motor 2. Furthermore, the detection units and the signal processing unit are provided on common current paths. As a result, the following processing is carried out in any of normal rotation, reverse rotation, and short circuit braking: the superimposition of alternating-current voltage is carried out from the high potential side of both ends of the motor 2; and a rotation pulse is generated based on the result of detection by the detection unit on the low potential side of both ends of the motor 2.

This makes it possible to share an amplification factor of the amplification unit 24 and a threshold value set at the threshold setting unit 27 among normal rotation, reverse rotation, and short circuit braking.

With the rotation angle detector 70 in this embodiment, therefore, alternating-current voltage is applied from the high potential side of the motor 2 both in steady rotation and in short circuit braking. Further, this is regardless of whether the motor is normally rotated or reversely rotated. Therefore, the following can be implemented as compared with cases where alternating-current voltage is applied from the low potential side of the motor 2: it is possible to more reliably produce variation in alternating-current component arising from rotation and to further enhance the accuracy of rotational state detection.

(Seventh Embodiment)

In the sixth embodiment, the following processing is carried out in any of normal rotation, reverse rotation, and short circuit braking: alternating-current voltage is applied from the high potential side of the motor 2 and a rotation pulse is generated based on the result of detection by the detection unit on the low potential side of the motor 2. Aside from the foregoing, the following measure may be taken with respect to each of normal rotation and reverse rotation: the same configuration as that of the sixth embodiment is used during a period from start to steady rotation; and the same superimposition unit and detection unit as in steady rotation are used in transition from steady rotation to short circuit braking.

The thus configured rotation angle detector will be taken as the seventh embodiment and description will be given to the motor drive control processing in this embodiment with reference to FIG. 20.

Figure 18:
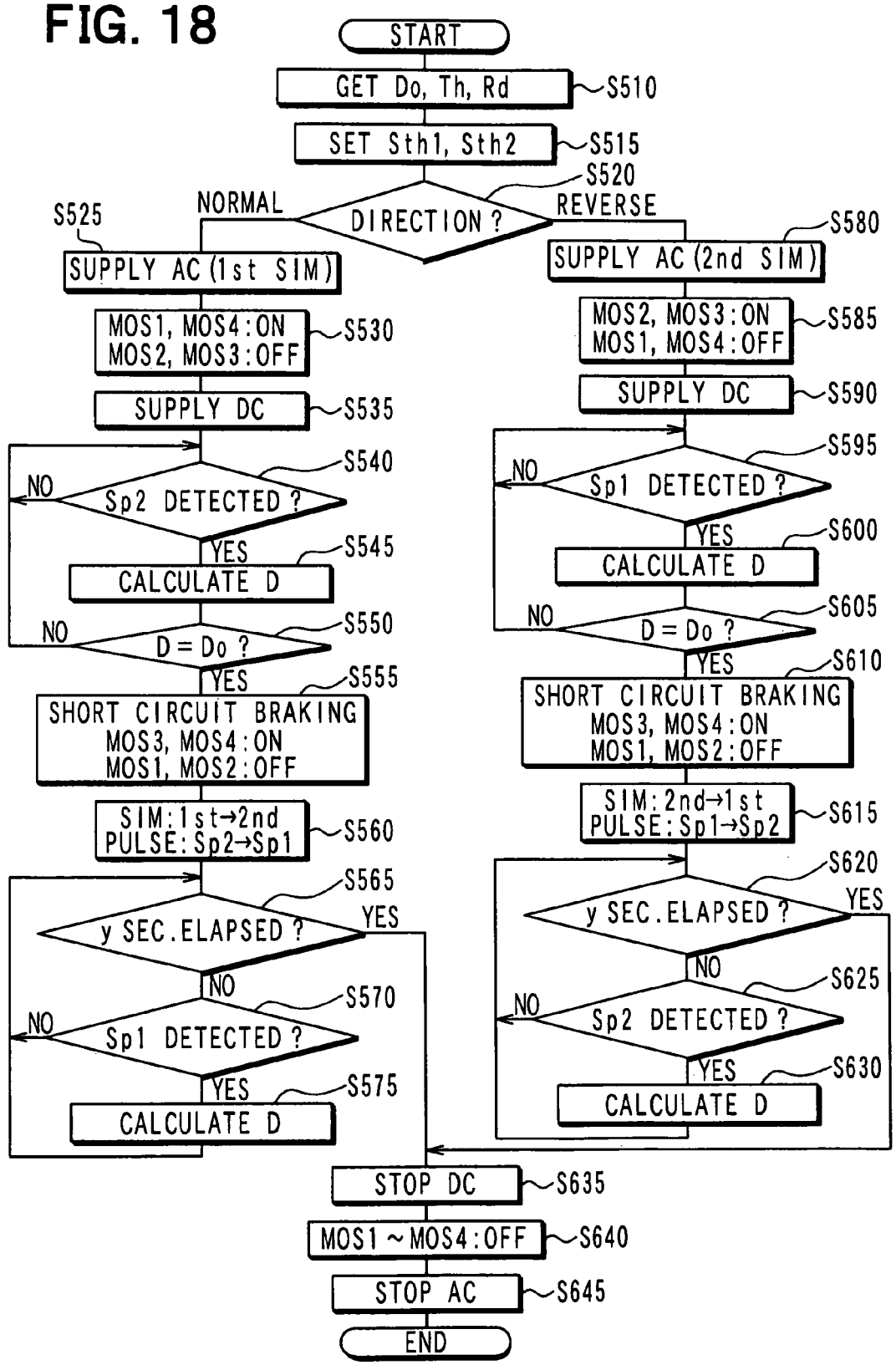
FIG. 18 is a flowchart illustrating motor drive control processing in the sixth embodiment.
Figure 20:
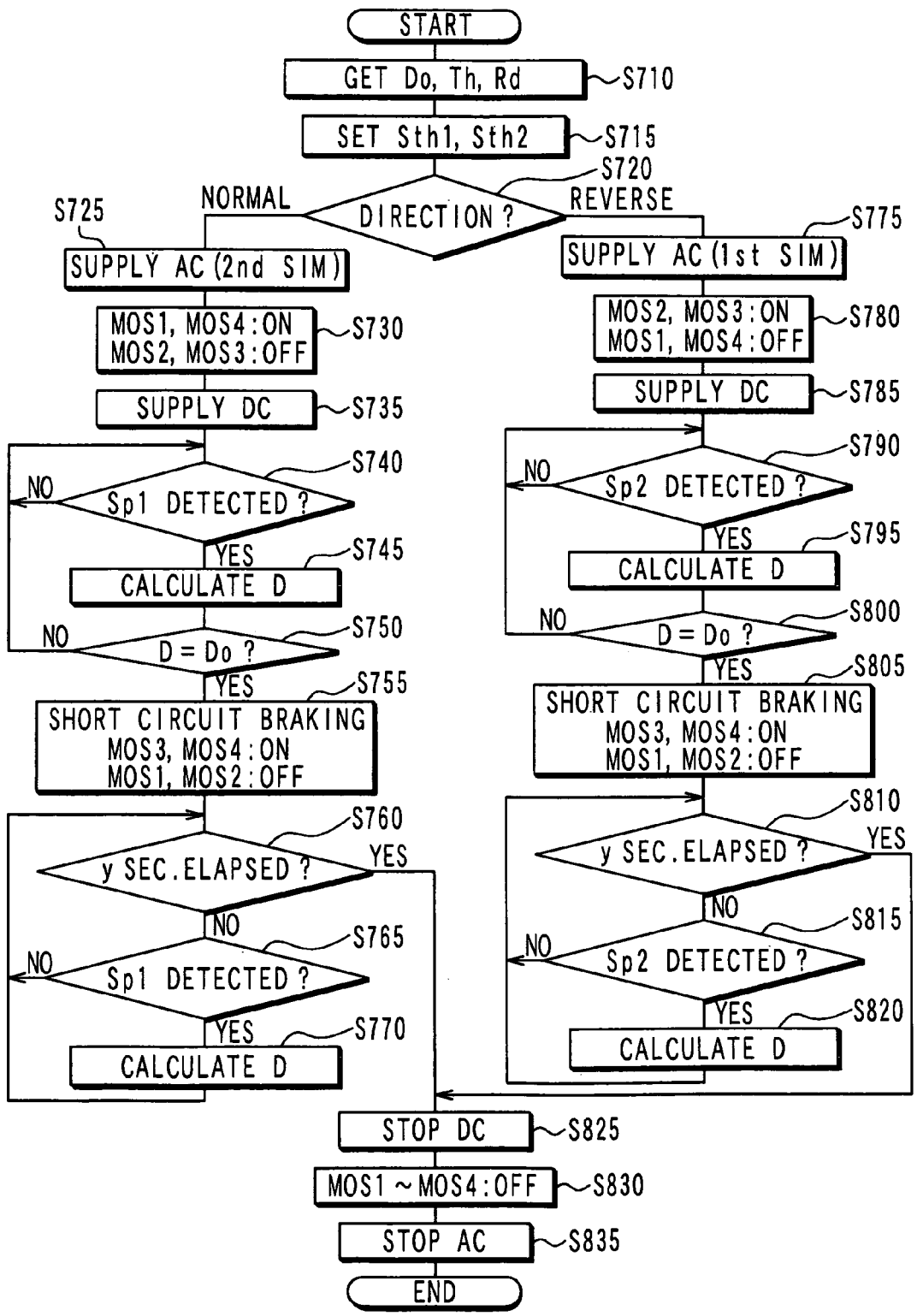
FIG. 20 is a flowchart illustrating motor drive control processing in a seventh embodiment.

The motor drive control processing in this embodiment illustrated in FIG. 20 is only partly different from the motor drive control processing in the sixth embodiment illustrated In FIG. 18. Hereafter, description will be given to a difference.

The processing of each of Steps S710 to S720 is the same as the processing of each of Steps S510 to S520 in FIG. 18. When the rotation direction is normal rotation in the sixth embodiment, alternating-current voltage is applied by the first superimposition unit 35a provided on the high potential side of both ends of the motor 2 (S525). Meanwhile, when it is determined as the result of the rotation direction determination of Step S720 that the rotation direction is normal rotation, the following processing is carried out in this embodiment: alternating-current voltage is applied by the second superimposition unit 35b provided on the low potential side of both ends of the motor 2 (S725).

The processing of each of the subsequent steps, Steps S730 to S755 is basically the same as the processing of each of Steps S530 to S555 in FIG. 18. In this embodiment, however, alternating-current voltage is applied by the second superimposition unit 35b in normal rotation (S725). Therefore, the computation of a rotation angle D In normal rotation is carried out based on a first rotation pulse Sp1 from the first signal processing unit 43a (S740 to S745).

When motor driver short circuit braking control is started in normal rotation, in the sixth embodiment, the superimposition unit that applies alternating-current voltage is changed and further the rotation pulse to be detected is also changed (S560). Meanwhile, when motor driver short circuit braking control of Step S755 is started in normal rotation, the following processing is carried out in this embodiment: such change as made in the sixth embodiment is not made and alternating-current voltage is applied by the same superimposition unit as in steady rotation even after the start of short circuit braking. The processing of each of Steps S760 to S770 is the same as the processing of each of Steps S565 to S575 in FIG. 18.

Also when the rotation direction is reverse rotation at Step S720, processing different from that in the sixth embodiment is carried out. That is, alternating-current voltage is applied by the first superimposition unit 35a provided on the low potential side of both ends of the motor 2 (S775).

The processing of each of the subsequent steps, Steps S780 to S805 is basically the same as the processing of each of Steps S585 to S610 in FIG. 18. In this embodiment, however, alternating-current voltage is applied by the first superimposition unit 35a in reverse rotation (S775). Therefore, the computation of a rotation angle D in reverse rotation is carried out based on a second rotation pulse Sp2 from the second signal processing unit 43b (S790 to S795).

When motor driver short circuit braking control is started in reverse rotation, in the sixth embodiment, the superimposition unit that applies alternating-current voltage is changed and further the rotation pulse to be detected is also changed (S615). Meanwhile, when motor driver short circuit braking control of Step S805 is started in reverse rotation, the following processing is carried out in this embodiment: such change as made in the sixth embodiment is not made and alternating-current voltage is applied by the same superimposition unit as in steady rotation even after the start of short circuit braking. The processing of each of Steps S810 to S835 is the same as the processing of each of Steps S620 to S645 in FIG. 18.

(Eighth Embodiment)

Figure 21:
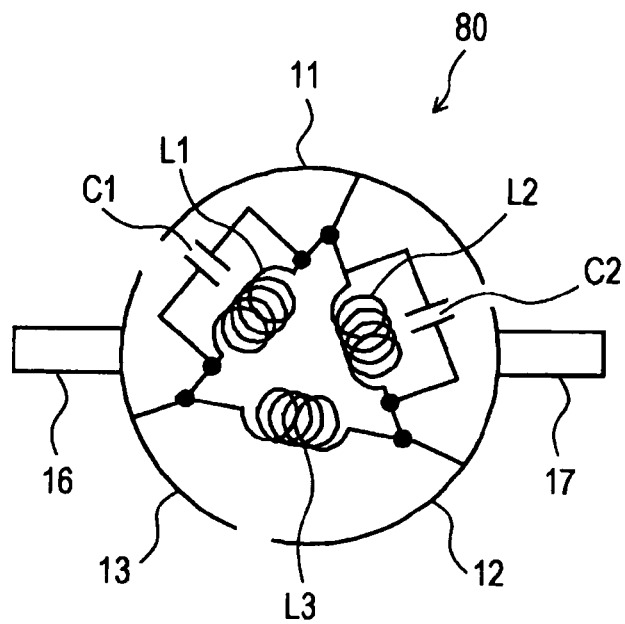
FIG. 21 is a schematic sectional view of a motor in an eighth embodiment.

FIG. 21 illustrates the configuration of a motor 80 comprising a rotation detector in this embodiment. The rotation detector in this embodiment is basically identical with the rotation angle detector 1 in the first embodiment in configuration though not shown in the drawing. It is different from the rotation angle detector 1 in the first embodiment mainly in that: the motor 80 in FIG. 21 is used in place of the motor 2; two different threshold values to be compared with an envelope detection signal are set in the signal processing unit 22 and two comparison units are provided, and an envelope detection signal is compared with the individual threshold values by these comparison units; two different rotation pulses are generated based on the results of comparison with the two different threshold values; and the rotation angle D, rotation direction, and rotational speed N of the motor 80 are detected by a rotation detection unit 82 based on these two different rotation pulses.

In the motor 80 in this embodiment, as illustrated in FIG. 21, a capacitor C2 is also connected in parallel with the second phase coil L2 unlike the motor 2 in the first embodiment. The other regards with respect to the configuration are the same as those of the motor 2 in the first embodiment. The capacitance value of the capacitor C2 is different from that of the capacitor C1.

For the reason, the following takes place while the motor 80 is rotated 180°: each time the commutator segments in contact with the respective brushes 16, 17 are changed, that is, each time the motor circuit between the brushes 16, 17 is changed, the impedance of the motor circuit varies and takes a different value. More specific description will be given. In the first embodiment, as illustrated in FIG. 4A, the motor circuit is changed into three different states, states A to C while the motor is restated 180°. However, variation in impedance is in two stages, high impedance in states A and B and low impedance in state C. In this embodiment, meanwhile, the impedance takes a different value each time the motor circuit is changed into three different states. The impedance takes three different values. That is, the impedance also varies stepwise each time the motor circuit is changed.

Figure 22:
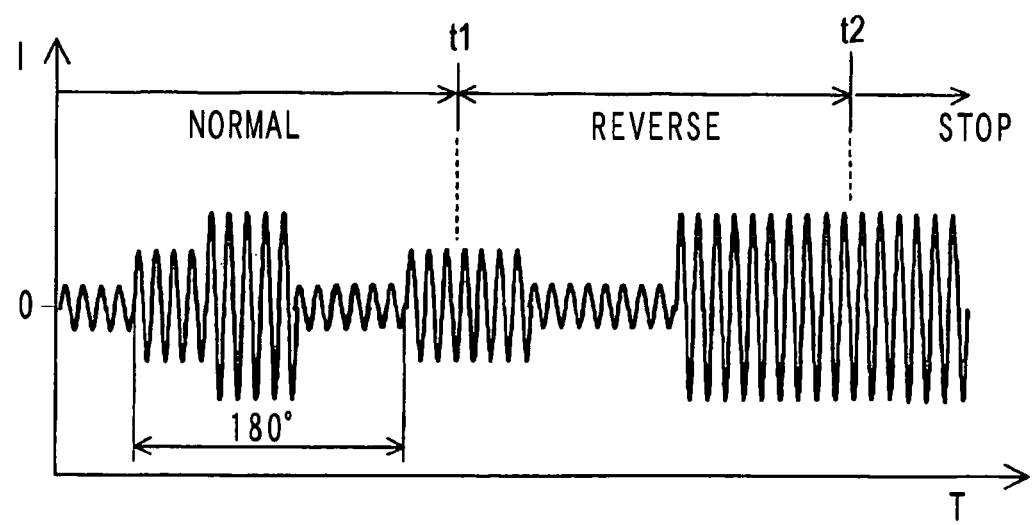
FIG. 22 is a waveform chart indicating an example of motor current waveform observed when a motor in the eighth embodiment is at a stop.

For this reason, the following takes place as long as the motor 80 is rotating in one and the same direction: the amplitude of the alternating current component of the motor current passed through the motor 80 sequentially varies in three stages, small amplitude, medium amplitude, and large amplitude. FIG. 22 indicates this variation in amplitude. FIG. 22 indicates only the alternating current component in the motor current when the motor 80 is under stopping control.

In this embodiment, the two capacitors C1, C2 having different capacitance values are connected. As indicated in FIG. 22, therefore, the alternating current component of the current passed through the motor 80 varies in amplitude every 60°-rotation as long as the motor is rotating in one and the same direction. For this reason, a rotation angle D can be detected every 60° based on this variation in amplitude.

Figure 23A:
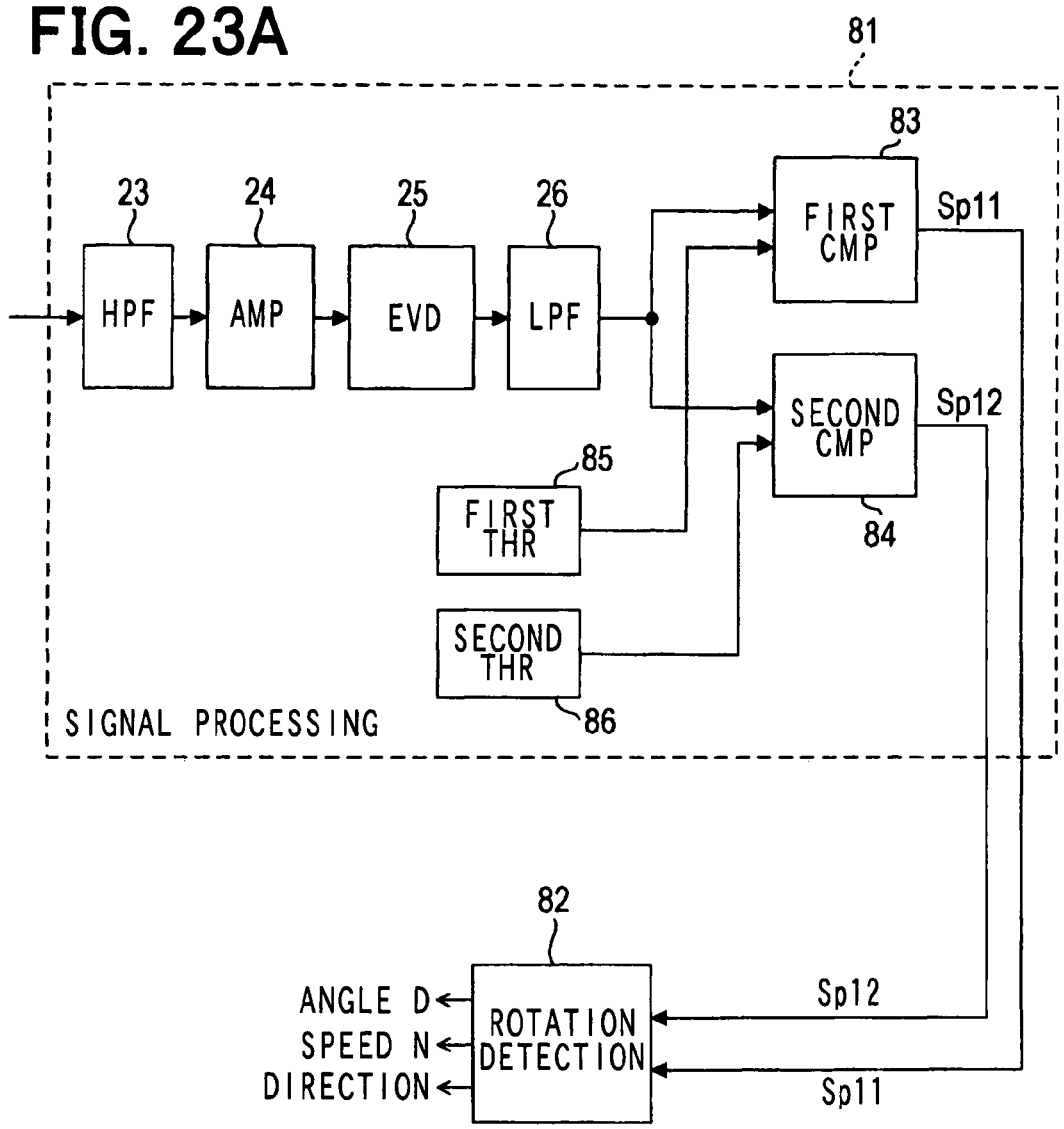
FIG. 23A is a block diagram of a signal processing unit and a control unit in the eighth embodiment.

Consequently, a signal processing unit 81 comprising the rotation detector in this embodiment is provided with two threshold setting units 85, 86 and two comparison units 83, 84 as illustrated in FIG. 23A. The signal processing unit is so configured that a first rotation pulse Sp11 and a second rotation pulse Sp12 are respectively outputted from the comparison units 83, 84.

That is, the signal processing unit 81 illustrated in FIG. 23A is identical with the signal processing unit 22 in the first embodiment illustrated in FIG. 3 in that: it includes the HPF 23, amplification unit 24, envelope detection unit 25, and LPF 26. In the signal processing unit 81 in this embodiment, an envelope detection signal outputted from the LPF 26 is inputted to the first comparison unit 83 and the second comparison unit 84.

At the first comparison unit 83, the inputted envelope detection signal is compared with the first threshold value set on the first threshold setting unit 85. Then a rotation pulse corresponding to the result of comparison is outputted as in the comparison unit 28 in the first embodiment. This pulse is designated as first rotation pulse Sp11.

At the second comparison unit 84, the inputted envelope detection signal is compared with the second threshold value set on the second threshold setting unit 86. Then a rotation pulse corresponding to the result of comparisons is outputted. This pulse is designated as second rotation pulse Sp12.

The first threshold value and the second threshold value are set as follows. The envelope detection signal obtained after envelope detection by the envelope detection unit 25 when the alternating current component contained in a detection signal is of small amplitude will be taken as small envelope detection signal. The envelope detection signal obtained after envelope detection by the envelope detection unit 25 when the alternating current component is of medium amplitude will be taken as medium envelope detection signal. The envelope detection signal obtained after envelope detection by the envelope detection unit 25 when the alternating current component is of large amplitude will be taken as large envelope detection signal. The first threshold value is set to a predetermined value larger than the small envelope detection signal and smaller than the medium envelope detection signal. The second threshold value is set to a predetermined value larger than the medium envelope detection signal and smaller than the large envelope detection signal.

For this reason, the following determination can be made based on the result of comparison obtained by comparing an envelope detection signal from the envelope detection unit 25 with the first threshold value at the first comparison unit 83: when the envelope detection signal is smaller than the first threshold value, it can be determined as small envelope detection signal; and when the envelope detection signal is larger than the first threshold value, it can be estimated as either medium envelope detection signal or large envelope detection signal. In this case, the following determination can be made based on the result of comparison with the second threshold value by the second comparison unit 84: when the envelope detection signal is smaller than the second threshold value, it can be determined as medium envelope detection signal; and when the envelope detection signal is larger than the second threshold value, it can be determined as large envelope detection signal.

Figure 23B:
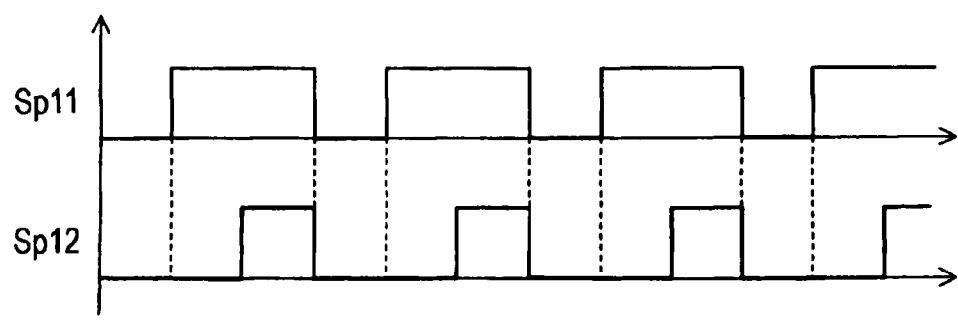
FIG. 23B is a waveform chart indicating rotation pulses outputted from a signal processing unit in the eighth embodiment.

Conversely, the first threshold value and the second threshold value are set so that an envelope detection signal can be determined as any of small envelope detection signal, medium envelope detection signal, and large envelope detection signal. Thus, each time the commutator segments are changed, this change can be detected to generate the rotation pulses Sp11, Sp12. That is, the rotation pulses Sp11, Sp12 are generated each time the motor circuit is changed. For this reason, rotation angle detection with a higher resolution than in the first embodiment can be achieved. FIG. 23B indicates examples of the rotation pulses Sp11, Sp12.

In this embodiment, the amplitude of the alternating current component varies in three stages, small, medium, and large, each time the commutator segments are changed while the motor is rotated 180°. For this reason, the rotation direction of the motor 80 can be detected based on the pattern of this variation.

FIG. 22 indicates a waveform obtained when the motor 80 is reversely rotated at time t1 immediately before it is stopped when the motor 80 is under stopping control.

If reverse rotation is not caused at time t1 and the motor is directly stopped, the amplitude of the alternating current component must not be changed from the medium amplitude state in which it was at time t1. Or, if changed, the amplitude must be changed to large amplitude.

Meanwhile, when reverse rotation is caused at time t1, the amplitude returns from the medium amplitude state to small amplitude and then it is changed from the small amplitude state to large amplitude as indicated in FIG. 22. That is, the order of variation in amplitude is reversed from the order of variation in normal rotation by reverse rotation. For example, the order of variation in normal rotation is small amplitude→medium amplitude→large amplitude→small amplitude→ . . . In the example in FIG. 22, the amplitude of the alternating current component after stop is kept large because the motor 80 is completely stopped at time t2 during the period of large amplitude.

In this embodiment, for this reason, the rotation direction of the motor 80 can also be detected according to how the amplitude is varied. In FIG. 22, for example, the amplitude is varied from medium amplitude to small amplitude after time t1. For this reason, it can be detected that the rotation direction of the motor 80 has been changed, based on this variation from medium amplitude to small amplitude.

Consequently, the rotation detection unit 82 in this embodiment is so configured to detect the rotation angle D, rotational speed N, and rotation direction of the motor 80 based on the following pulses: the first rotation pulse Sp11 and the second rotation pulse Sp12 generated at the signal processing unit 81. Detection of a rotational speed N can be carried out based on the period of the first rotation pulse Sp11 or the second rotation pulse Sp12.

According to this embodiment described up to this point, in the motor 80, the two capacitors C1, C2 different in capacitance value are respectively connected in parallel with the first phase coil L1 and the second phase coil L2. As a result, the amplitude of the alternating current component is varied each time the commutator segments in contact with the respective brushes 16, 17 are changed. For this reason, a rotation angle can be detected with a high resolution and further it is possible to also detect a rotation direction in addition to a rotation angle D and a rotational speed N. For this reason, reverse rotation that is prone to occur in proximity to when the motor 80 is stopped can also be accurately detected and more accurate rotation angle D detection with rotation direction as well taken into account can be achieved.

(Ninth Embodiment)

This embodiment demonstrates a concrete example of the disposition of the capacitor C1 with respect to the motor 2 comprising the rotation angle detector 1 in the first embodiment.

Figure 24:
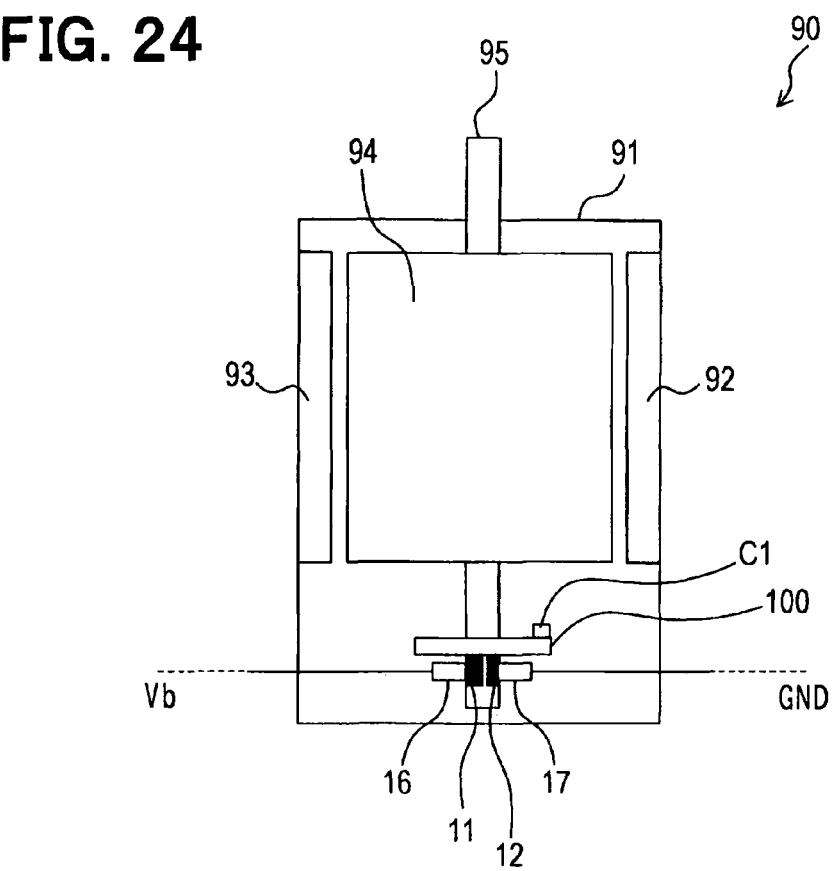
FIG. 24 is a side view of a motor in a ninth embodiment.

FIG. 24 illustrates the general configuration of a motor 90 in this embodiment. In the motor 90, as illustrated in FIG. 24, magnetic field systems 92, 93 comprised of a permanent magnet are fixed on the inner wall of a yoke housing 91. In the yoke housing 91, an armature 94 is disposed opposite to the magnetic field systems 92, 93. The armature 94 is comprised of three phase armature coils.

The commutator segments 11, 12, 13 comprising the commutator 10 are provided at one end of a shaft 95 fixed on the armature 94, that is, a rotating shaft and the two brushes 16, 17 are disposed in contact with this commutator 10.

Figure 25A:
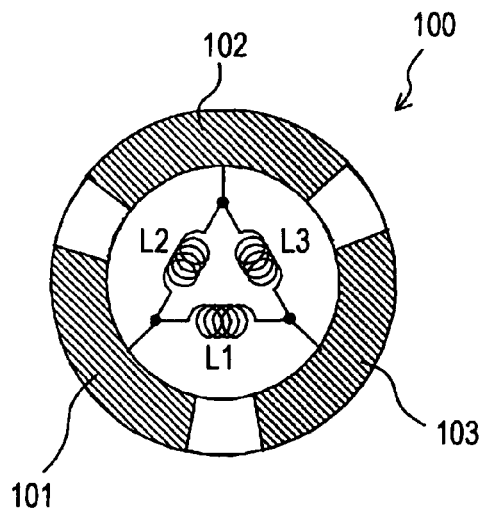
FIG. 25A is a schematic plan view illustrating a ring varistor in a motor in the ninth embodiment.
Figure 25B:
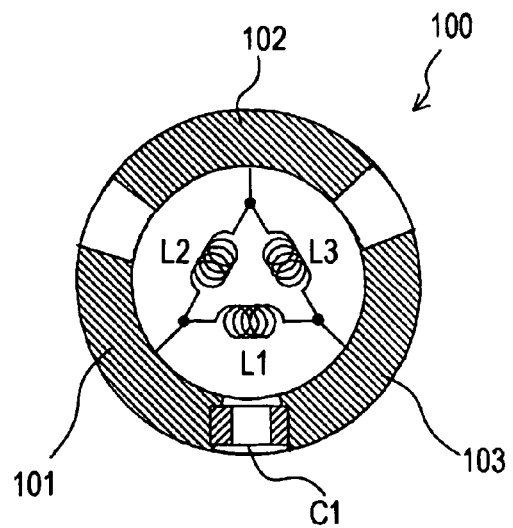
FIG. 25B is a schematic plan view illustrating how a capacitor is installed on a ring varistor in a motor in the ninth embodiment.

On the one end side of the shaft 95, further, a ring-shaped plate-like ring varistor 100 is provided coaxially with the shaft 95. This ring varistor 100 is an ordinary one frequently used for surge absorption in a direct-current motor. On one plate surface of this ring varistor 100, three electrodes 101, 102, 103 are formed as illustrated in FIGS. 25A and 25B. In other words, the three electrodes 101, 102, 103 are formed on the opposite side to the commutator 10. In this embodiment, further, the capacitor C1 is installed on the plate surface with the three electrodes 101, 102, 103 formed thereon.

As illustrated in FIGS. 25A and 25B, specifically, the first electrode 101 of the three electrodes 101, 102, 103 formed on the ring varistor 100 is electrically connected with the junction point between the first phase coil L1 and the second phase coil L2. That is, it turns out that this first electrode 101 is also electrically connected with the first commutator segment 11. The second electrode 102 is electrically connected with the junction point between the second phase coil L2 and the third phase coil L3. That is, it turns out that this second electrode 102 is also electrically connected with the second commutator segment 12. The third electrode 103 is electrically connected with the junction point between the third phase coil L3 and the first phase coil L1. That is, it turns out that this third electrode 103 is also electrically connected with the third commutator segment 13.

In this embodiment, the capacitor C1 is installed on the thus configured ring varistor 100 in the boundary area between the first electrode 101 and the third electrode 103. Parallel connection is thereby achieved between the capacitor C1 and the first phase coil L1. FIG. 25A illustrates the ring varistor 100 before the capacitor C1 is installed. FIG. 25B illustrates the ring varistor 100 after the capacitor C1 is installed. The connection of the capacitor C1 to the electrodes 101, 103 of the ring varistor 100 can be carried out by, for example, soldering. This makes it possible to simultaneously fix the capacitor C1 on the ring varistor 100.

As mentioned above, the capacitor C1 is installed and fixed on the plate surface of the ring varistor 100 in the motor 90 with the ring varistor 100 provided therein. This makes it possible to reduce the number of man-hours needed to manufacture the motor 90 and further the number of man-hours needed to manufacture the entire rotation angle detector.

(Modifications)

Up to this point, description has been given to embodiments of the invention. However, the mode for carrying out the invention is not limited to the above embodiments and the invention can be variously modified without departing from its technical scope, needless to add.

Some examples will be taken. In the description of the above embodiments, the following cases have been taken as examples: a case where the capacitor C1 is connected to only one phase coil of the three phase coils L1, L2, L3 in a direct-current motor (for example, the first embodiment); and a case where the capacitors C1, C2 different in capacitance value are respectively connected to two phase coils (for example, the eighth embodiment). Instead, capacitors different in capacitance may be respectively connected to three phase coils. Also in this case, it is possible to detect a rotation angle and a rotation direction with a high resolution.

When capacitors are respectively connected to three phase coils, any two capacitors may be identical in capacitance value. In this case, however, a rotation angle and a rotational speed can be detected but a rotation direction cannot be detected.

In the description of the above embodiments, cases where the phase coils L1, L2, L3 in the motor are in Δ connection. However, Δ connection need not be adopted and the Invention can be applied to a motor in which the phase coils L11, L12, L13 as armature coils are in star connection like the motor 110 illustrated in FIG. 26 as an example. In case of star connection, the following can be implemented by connecting the capacitor C11 in parallel with any one phase coil (for example, the first phase coil L11) as illustrated in FIG. 26: the amplitude of the alternating current component is varied in conjunction with rotation and a rotation pulse Sp can be generated and a rotation angle and a rotational speed can be detected by detecting this variation.

Figure 26:
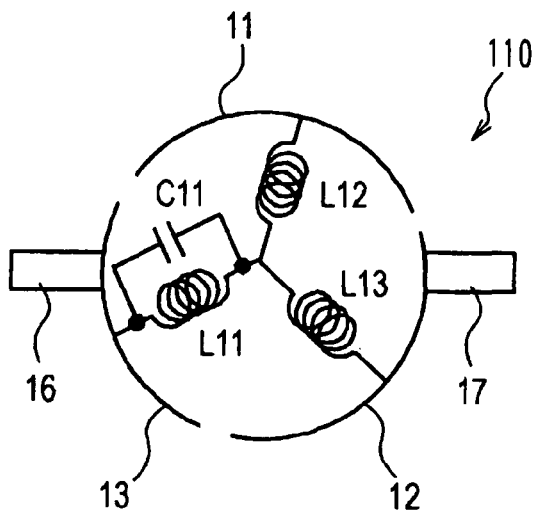
FIG. 26 is a schematic sectional view of another embodiment.

In the example in FIG. 26, in addition to the capacitor C11, another capacitor may be connected in parallel with any of the other phase coils L12, L13 or capacitors may be respectively connected in parallel with all the phase coils L11, L12, L13. In this case, however, it is required to use at least two different capacitance values for the capacitors. A capacitor may be connected between, for example, two commutator segments.

In the description of the ninth embodiment, a case where the capacitor C1 is connected onto the plate surface of the ring varistor 100 by soldering or the like has been taken as an example. Other various methods can be adopted to install the capacitor C1 on the ring varistor 100. For example, the following measure may be taken: a ring varistor with capacitor in which the ring varistor 100 and the capacitor C1 are integrally molded is formed as one component and this component is used. This reduces the number of man-hours needed to assemble the motor and thus the number of man-hours needed for the entire rotation angle detector. The capacitor C1 need not be fixed so that the electrodes 101, 103 of the ring varistor 100 are respectively in direct contact with the electrodes of the capacitor C1. Instead, the following measure may be taken; the ring varistor 100 is simply used as a base for fixing the capacitor C1 and electrical connection between the capacitor C1 and the armature coils is separately carried out.

In the description of the above embodiments, a three-phase direct-current motor In which the number of phases of its armature coils is three has been taken as examples. The application of the invention is not limited to three-phase motors and it can be applied to a motor of four or more phases.

Figure 27:
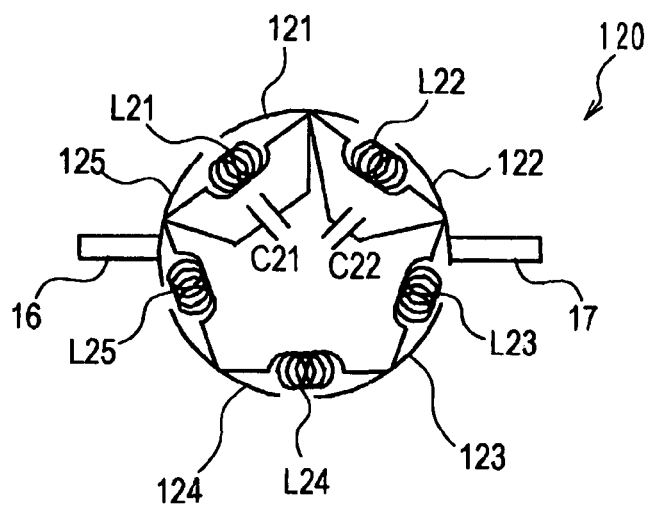
FIG. 27 is a schematic sectional view of another embodiment.

FIG. 27 illustrates a five-phase direct-current motor as an example in which the Invention is applied to a motor of four or more phases. The motor 120 illustrated in FIG. 27 includes a commutator comprised of five commutator segments 121, 122, 123, 124, 125. Each phase coil L21, L22, L23, L24, L25 as an armature coil is in ring connection with each pair of adjoining commutator segments. The phase coils are identical in inductance.

Capacitors C21, C22 are respectively connected in parallel with two phase coils (for example, the first phase coil L21 and the second phase coil L22) of the phase coils L21, L22, L23, L24, L25. Also with respect to this five-phase motor 120, a rotation angle and a rotational speed can be detected.

With a capacitor connected in parallel with only any one phase coil in a motor of four or more phases, at least a rotation angle and a rotational speed can be detected. Also in a motor of four or more phases, the following can be implemented by respectively connecting capacitors different in capacitance value to at least two phase coils: a rotation direction can also be detected based on the pattern of stepwise variation in impedance arising from rotation as in the eighth embodiment Variation in impedance appears as variation in alternating current component.

Figure 28:
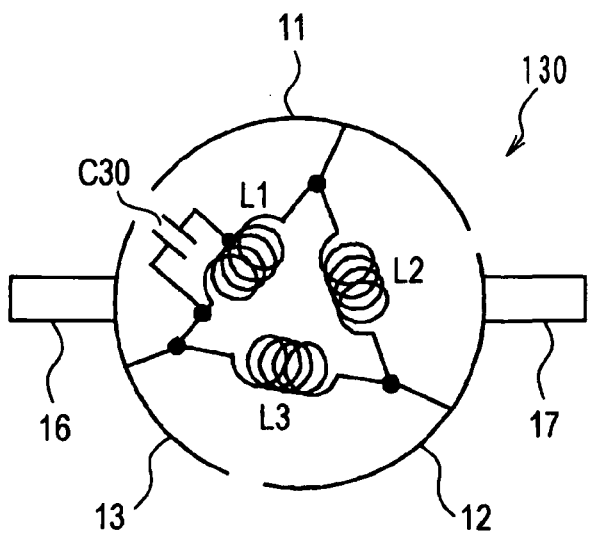
FIG. 28 is a schematic sectional view of another embodiment.

In the first embodiment, the capacitor C1 is connected in complete parallel with the entire first phase coil L1. Instead, a capacitor C30 may be connected in parallel with part of the first phase coil L1 as in the motor 130 illustrated in FIG. 28. This connection is achieved by providing an intermediate tap at some midpoint in the first phase coil and connecting one end of the capacitor C30 to the tap. This connection method is similarly applicable to other embodiments.

In the first embodiment, the power supply unit 5 that applies direct-current voltage and alternating-current voltage to the motor 2 is configured by separately providing the direct-current power source 3 and the alternating-current power source 4. Voltages (currents) from the individual power sources 3, 4 are superimposed through the coupling capacitor C10 and then applied (supplied) to the motor 2. This configuration of the power supply unit 5 is just an example. For example, one supply device that generates and supplies an alternating current and direct current-mixed current (pulsating current) in which a direct current and an alternating current are superimposed may be used. There is no special limitation on the concrete configuration of the power supply unit 5 as long as it can finally supply an alternating current and a direct current to the motor 2.

Figure 29:
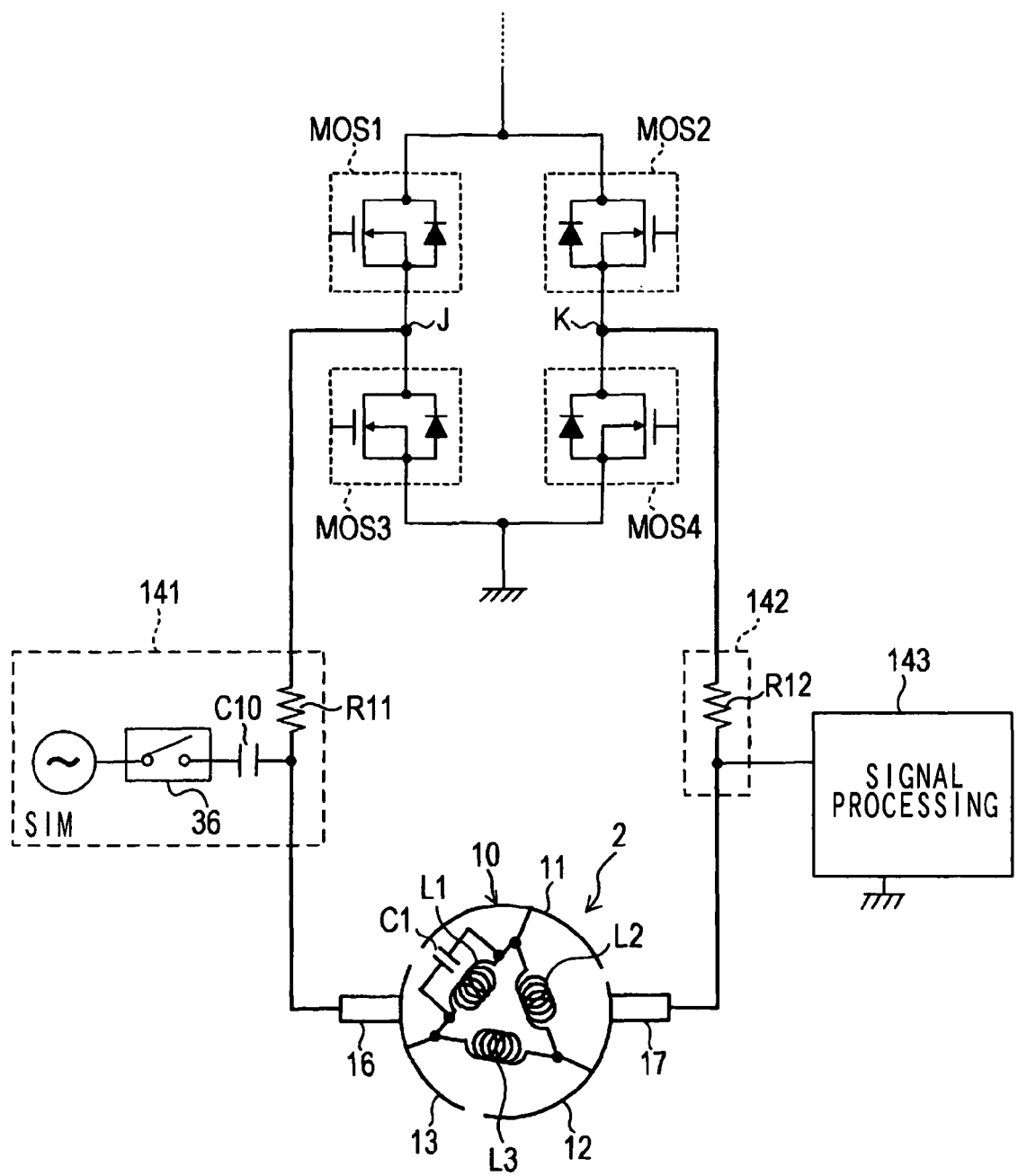
FIG. 29 is a block diagram illustrating another example of the configuration of a superimposition unit and a detection unit.

The superimposition unit 35 and detection unit 64 in the rotation angle detector 60 in the fifth embodiment may be configured as illustrated in FIG. 29 as an example. That is, in the superimposition unit 141 illustrated in FIG. 29, a resistor R11 is provided so that the following is implemented: the resistor is located on the first common current path extending from one brush 16 of the motor 2 to one intermediate potential point J of the motor driver 61 between the junction point between it and the coupling capacitor C10 and the motor driver 61. The following can be implemented by providing the resistor R11 as mentioned above: even when the switch MOS3 between the intermediate potential point J in the motor driver 61 and ground potential is turned on, the point at which alternating-current voltage is applied can be separated from ground potential and alternating-current voltage can be effectively applied.

A detection unit 142 is so configured that a resistor R12 is provided on a common current path and the potential at one end of this resistor R12 connected to the motor 2 side is outputted to a signal processing unit 143. In this case, the detection unit 142 detects a motor current passed through the common current path and outputs it to the signal processing unit 143.

The superimposition unit 141 and detection unit 142 illustrated in FIG. 29 are also just one example.

In the description of the above embodiments, cases where one that outputs sinusoidal voltage with an amplitude of Vs is used as the alternating-current power source 4 as described with reference to FIG. 2A have been taken as examples. However, the alternating current outputted by the alternating-current power source 4 is not limited to a sinusoidal alternating current, needless to add, and alternating-current voltage having various waveforms can be outputted.

As a concrete example, the square-wave voltage indicated in FIG. 30A may be outputted. When such square-wave voltage is outputted from the alternating-current power source 4, the current passed through the motor 2 contains the alternating current component as indicated in FIG. 30B.

The alternating-current component contained in a motor current when sinusoidal voltage is outputted as alternating-current voltage and the alternating-current component contained in a motor current when square-wave voltage is outputted are such that: when these voltages are identical in amplitude, their peak values are largely different from each other as indicated in FIG. 30C. More specific description will be given. The peak value of the alternating-current component contained in a motor current when square-wave voltage is outputted is higher than the peak value of the alternating-current component contained in a motor current when sinusoidal voltage is outputted.

For this reason, when alternating-current voltages identical in amplitude are outputted, a rotation angle and the like can be more easily detected by square waves than by sine waves.

From the viewpoint of noise, square-wave voltage contains many harmonic components but harmonic components contained in sinusoidal voltage are small in quantity. For this reason, sinusoidal voltage is preferable when a higher priority is given to noise suppression.

Figure 31:
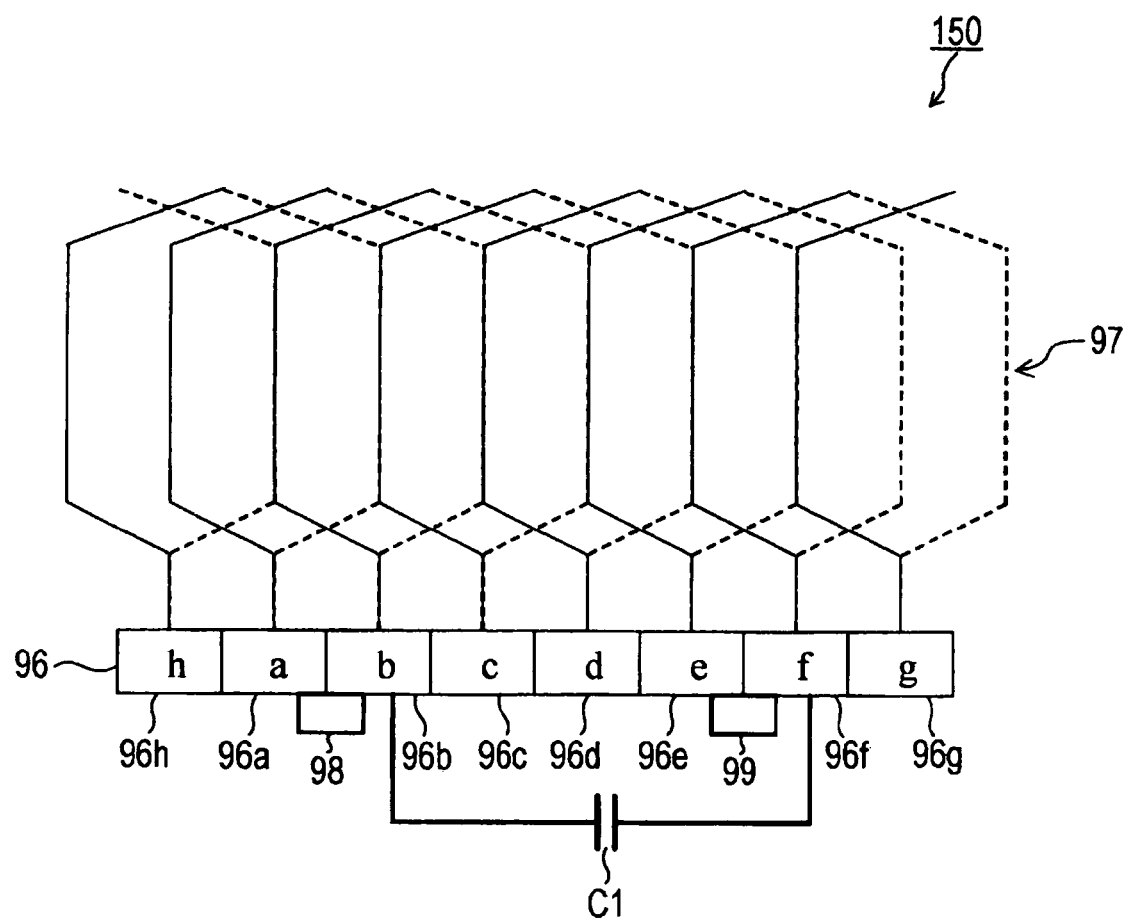
FIG. 31 is a development view illustrating winding in another embodiment.

The invention is also applicable to multi-slot direct-current motors as illustrated in FIG. 31 as an example. The motor 150 in FIG. 31 includes a pair of brushes 98, 99 and a commutator 96 comprised of eight commutator segments 96a to 96h. A coil 97 is formed by lap winding in each section between adjoining commutator segments.

The capacitor C1 is connected between two specific commutator segments 96b, 96f of the eight commutator segments 96a to 96h. For this reason, when the pair of brushes 98, 99 are brought into contact with the two specific commutator segments 96b, 96f, the impedance is reduced and an alternating current becomes prone to flow.

In the above embodiments, the following measure is taken to produce variation in the impedance of the motor circuit: a capacitor is connected to part or whole of a phase coil of at least one phase among the multiple phase coils comprising a motor. However, this connection of a capacitor is just an example and a motor of various configurations can be used as long as the motor can be so configured that the following can be implemented: of the multiple commutator segments, any two commutator segments are taken as one set and the section between commutator segments in at least one set has a capacitance value different from those of the sections between commutator segments in the other sets.

Figure 32A:
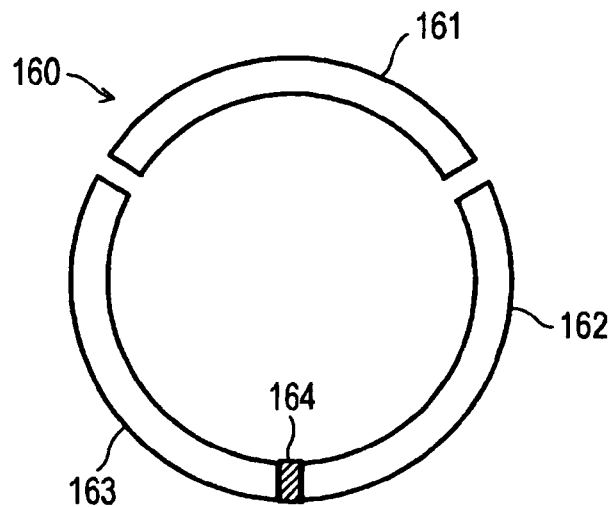
FIG. 32A is a plan view of another embodiment.
Figure 32B:
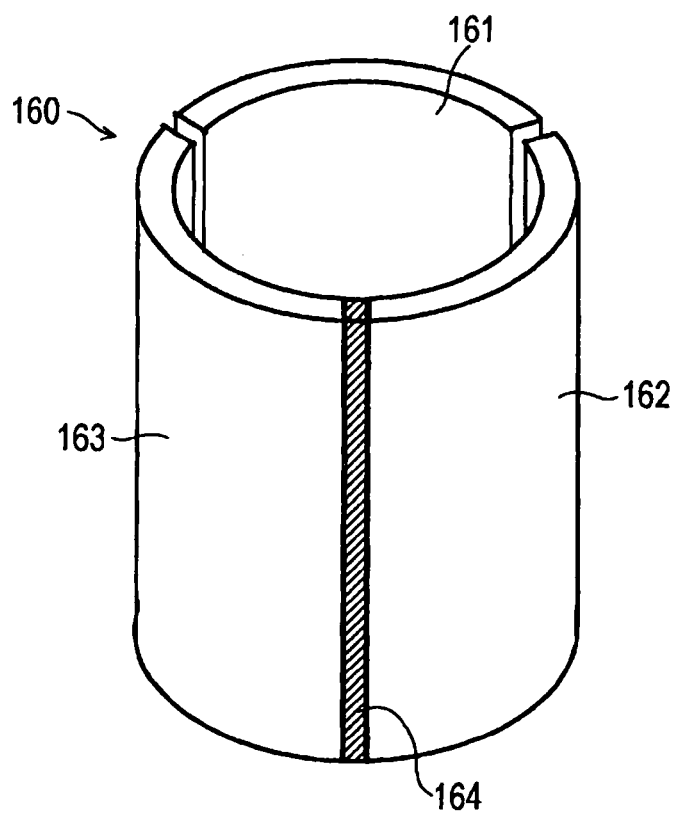
FIG. 32B is a perspective view of another embodiment.

FIGS. 32A and 32B illustrate an example in which a dielectric is sandwiched only between two specific commutator segments so that only the section between these two commutator segments has a capacitance value. In FIGS. 32A and 32B, only the commutator 160 comprising a motor is taken out and depicted. FIG. 32A is a plan view of the commutator 160 and FIG. 32B is a perspective view of the commutator 160.

The commutator 160 illustrated in FIGS. 32A and 32B is comprised of three commutator segments 161, 162, 163. A dielectric 164 is inserted between two specific commutator segments 162, 163 among the three commutator segments.

A motor in which the impedance of a motor circuit is varied in conjunction with rotation can also be achieved by configuring a commutator as mentioned above.

In the above embodiments, an H-bridge circuit comprised of four switching elements is provided as a motor driver. Instead, a motor driver may be composed of a circuit other than the H-bridge circuits.

Figure 33:
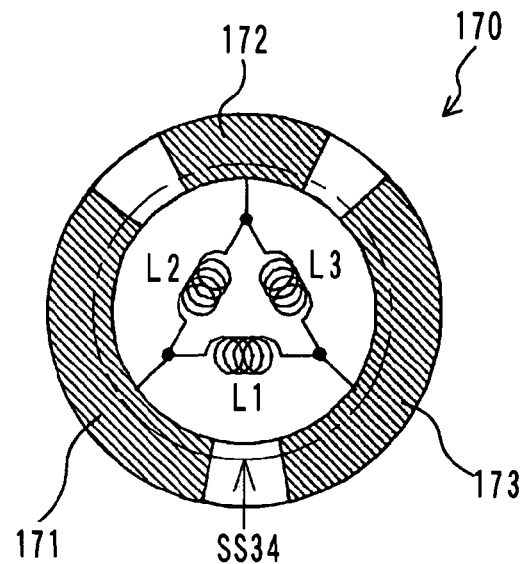
FIG. 33 is a schematic plan view showing a ring varistor in a motor of another embodiment.
Figure 34:
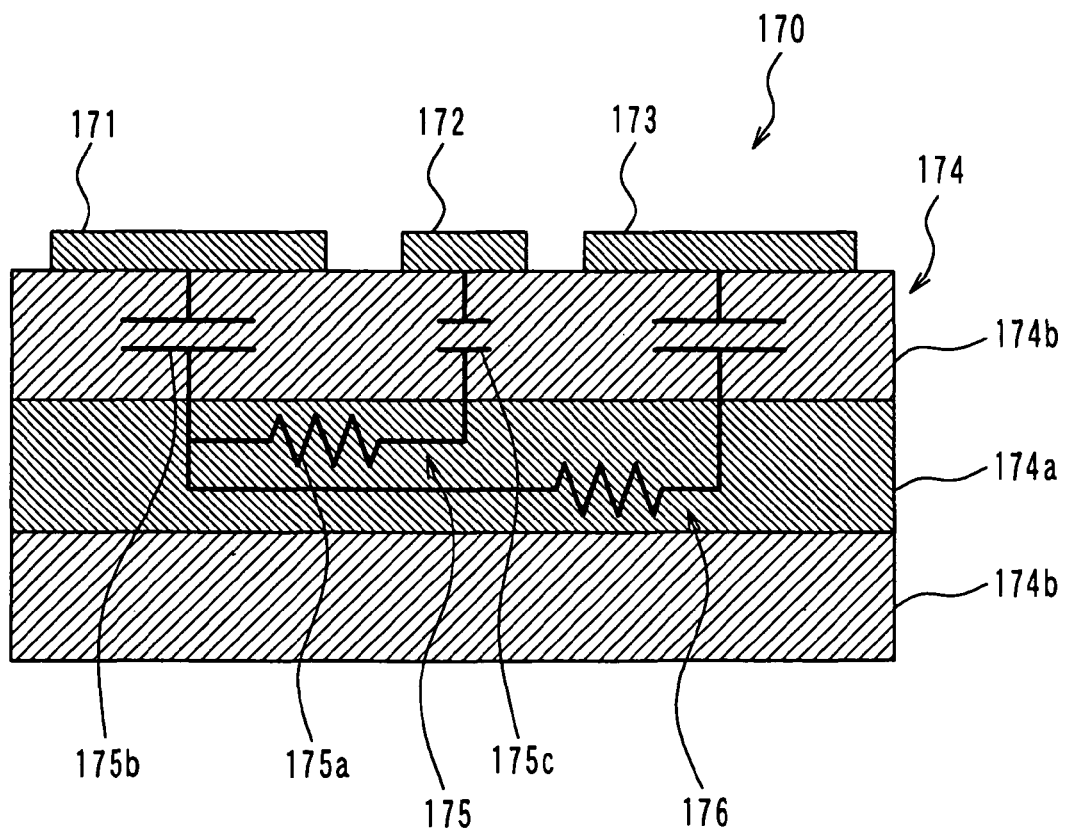
FIG. 34 is a development sectional view showing a cylindrical cross section along a line SS34 of FIG. 33.

FIG. 33 shows another embodiment of a ring varistor 170 for providing an asymmetric capacitive circuit on a direct current motor. FIG. 34 is a development view of a cylindrical cross section along a line SS34 in FIG. 33. In FIG. 34, two equivalent circuits formed between pairs of electrodes are shown.

The ring varistor 170 is mounted to a rotatable shaft of a direct current motor as a component thereof. The ring varistor 170 has a base member 174 formed in an annular plate shape, and a plurality of electrodes 171, 172, and 173 formed on the base member 174. The electrodes are connected with the coils L1, L2 and L3 as shown in FIG. 33.

The base member 174 has a low resistive member 174a and a high resistive member 174b. The plurality of electrodes 171, 172, and 173, the low resistive member 174a, and the high resistive member 174b are stacked to form layers. The low resistive member 174a has an electric resistance lower than that of the high resistive member 174b. The high resistive member 174b has an electric resistance higher than that of the low resistive member 174a. The high resistive member 174b completely covers the low resistive member 174a and is placed as a layer between the electrodes and the low resistive member 174a. The low resistive member 174a may be called as an inner member, and the high resistive member 174b may be called as an outer member. The high resistive member 174b has an electric characteristic for providing capacitive elements between the plurality of electrodes 171, 172, and 173, and the low resistive member 174a.

The plurality of electrodes 171, 172, and 173 provides a plurality of different electrodes which are different in size, i.e., surface area. At least one electrode of the plurality of electrodes 171, 172, and 173 is formed to have a smaller area than that of the other electrodes. In an example illustrated, the electrode 172 has a smaller area than that of the electrodes 171 and 173. The electrodes 171 and 173 have the same area. As a result, a capacitance provided between the electrode 172 and the low resistive member 174a is smaller than a capacitance provided between the electrode 171 and the low resistive member 174a. Similarly, the capacitance provided between the electrode 172 and the low resistive member 174a is smaller than a capacitance provided between the electrode 173 and the low resistive member 174a.

An equivalent circuit 175 is formed between the electrodes 171 and 172. An equivalent circuit 176 is formed between the electrodes 171 and 173. Further, an equivalent circuit, not illustrated, is formed between the electrodes 172 and 173 similar to the equivalent circuit 175.

Each equivalent circuit includes at least one resistive component and at least one capacitive component. For example, as illustrated, the equivalent circuit 175 has a resistive component 175a provided by a series circuitry of the low resistive member 174a and the high resistive member 174b, and a capacitive components 175b and 175c provided between the electrodes 171 and 172, and the low resistive member 174a. A capacitance of the capacitive component 175c corresponding to the electrode 172 is smaller than a capacitance of the capacitive component 175b corresponding to the electrode 171 depending on a difference between areas of the electrodes 171 and 172. Similarly, a capacitance of the capacitive component 175c corresponding to the electrode 172 is smaller than a capacitance of the capacitive component corresponding to the electrode 173.

A capacitance of the equivalent circuit 176 is greater than a capacitance of the equivalent circuit 175. Therefore, a capacitance between the electrodes 171 and 173 is greater than a capacitance between the electrodes 171 and 172. A capacitance between the electrodes 171 and 173 is greater than a capacitance between the electrodes 172 and 173. Therefore, a capacitance between one specific pair of electrodes 171 and 173 is different from capacitances between the other pairs of electrodes 171 and 172, and 172 and 173.

As explained above, since the plurality of electrodes 171, 172 and 173 are connected with the plurality of commutator segments 11, 12 and 13 in a one to one associated fashion, the ring varistor 170 having an asymmetric capacitance can provide a capacitance between a specific pair of commutator segments which is different from capacitances between the other pairs of commutator segments.

Figure 35:
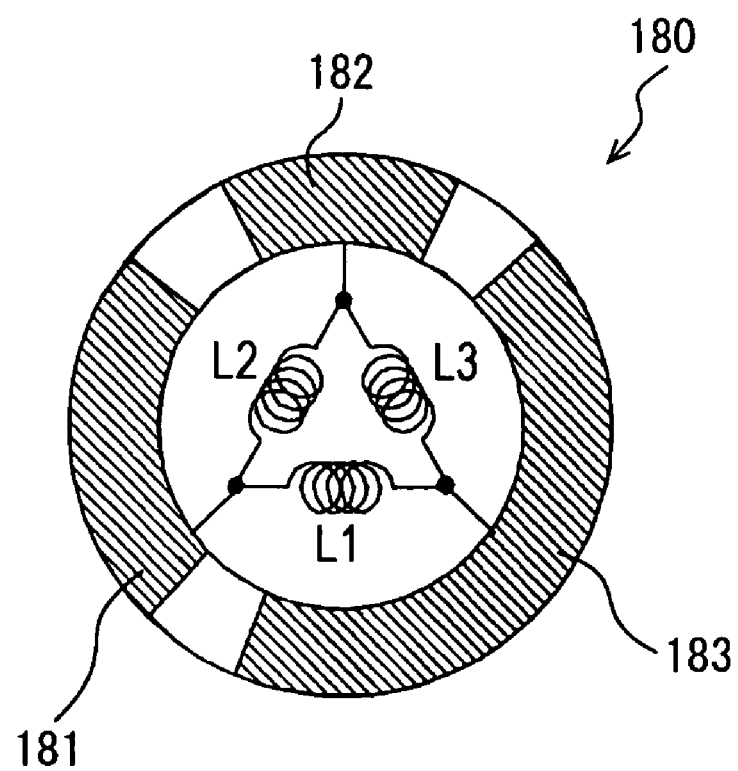
FIG. 35 is a schematic plan view showing a ring varistor in a motor of another embodiment.

FIG. 35 shows another embodiment of a ring varistor 180. In the embodiment, the ring varistor 180 has a plurality of electrodes 181, 182 and 183. The plurality of electrodes 181, 182 and 183 have surface areas that are different each other. Therefore, the plurality of electrodes 181, 182 and 183 provide different capacitances each other. As a result, different impedance changing patterns are provided in accordance with rotational directions. It is possible to detect the rotational directions based on the impedance changing patterns indicative of the rotational directions.

Figure 36A:
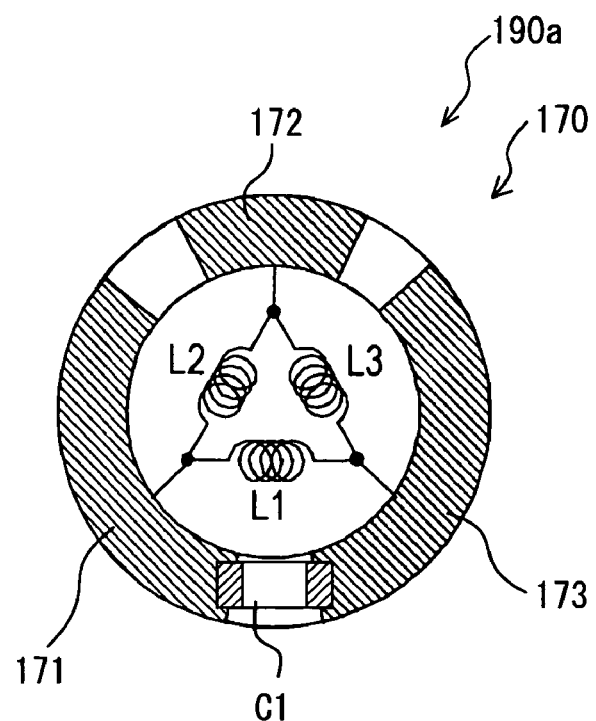
FIG. 36A is a schematic plan view showing a ring varistor in a motor of another embodiment.
Figure 36B:
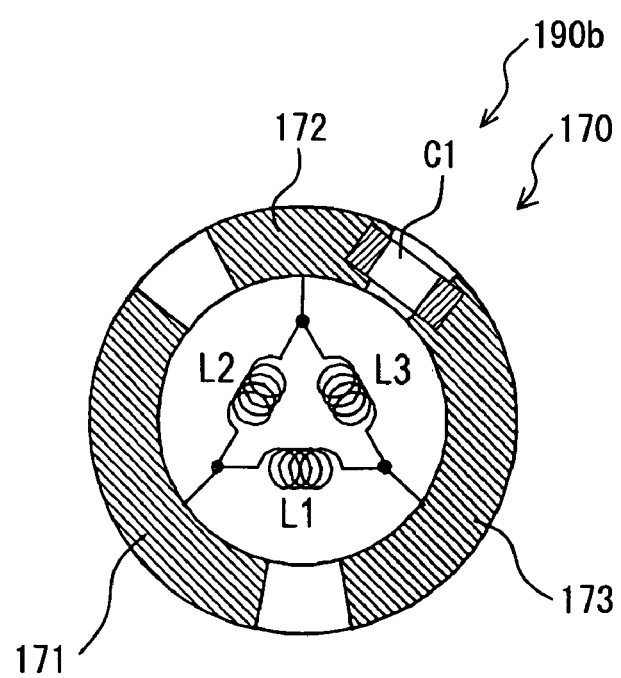
FIG. 36B is a schematic plan view showing a ring varistor in a motor of another embodiment.

FIG. 36A shows another embodiment of a capacitive circuit element 190a. The capacitive circuit element 190a has the ring varistor 170 described in the embodiment shown in FIG. 33 and a capacitor C1 mounted on the ring varistor 170. The capacitor C1 has a pair of terminal electrodes that are electrically connected with an adjacent pair of the electrodes 171 and 173 of the ring varistor 170. In other word, the capacitor C1 is electrically connected with the electrodes 171 and 173 that are formed for providing relatively greater capacitance. According to the configuration, it is possible to increase an amplitude of an impedance change generated with the rotation. Then, it is possible to improve detecting capability of an amplitude change of an AC component. FIG. 36B shows another embodiment of a capacitive circuit element 190b. The capacitive circuit element 190b has the ring varistor 170 described in the embodiment shown in FIG. 33 and a capacitor C1 mounted on the ring varistor 170. The capacitor C1 has a pair of terminal electrodes that are electrically connected with an adjacent pair of the electrodes 172 and 173 of the ring varistor 170. In other word, the capacitor C1 is electrically connected with the electrodes 172 and 173 that are formed for providing relatively smaller capacitance. According to the configuration, different impedance changing patterns are provided in accordance with rotational directions. It is possible to detect the rotational directions based on changing patterns of an AC component. In this configuration, a capacitance of the capacitor C1 and a capacitance between each electrodes of the ring varistor are set in different values. Alternative to the configuration shown in FIGS. 36A and 36B, the terminal electrodes of the capacitor C1 may be electrically connected with the commutator segments instead of the electrodes on the ring varistor. The ring varistor 180 shown in FIG. 35 may further include a capacitor C1 similar to the embodiment shown in FIGS. 36A and 36B. According to the above described embodiments, the motor provides a poly-phase circuit that may be called as an unbalanced or asymmetric with respect to the capacitive component by including the capacitive circuit element.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A rotation detector detecting a rotational state of a direct-current motor having armature coils comprised of phase coils of at least three phases, a commutator having a plurality of commutator segments with which the armature coils are connected, and at least one pair of brushes supplying a current to each of the phase coils through the commutator, the rotation detector comprising:
   a power supplying means so configured that at least alternating current superimposed voltage obtained by superimposing alternating-current voltage on direct-current voltage can be applied to between at least the one pair of brushes of the direct-current motor;
   an energization detecting means detecting a motor current passed through the direct-current motor through the brushes or path voltage, or the voltage on an energization path through which the motor current flows; and
   a rotational state detecting means detecting at least any one of the rotation angle, rotation direction, and rotational speed as the rotational state of the direct-current motor based on the motor current or the alternating-current component contained in the path voltage detected by the energization detecting means, wherein
   the direct-current motor is so configured that any two commutator segments among the commutator segments are taken as one set and the section between commutator segments in at least one set has a capacitance value different from the capacitance values of the sections between commutator segments in the other sets; wherein
   the power supplying means includes:
   a direct-current power source applying the direct-current voltage to the direct-current motor;
   a direct current interrupting means interrupting the application of direct-current voltage from the direct-current power source to the direct-current motor; and
   an alternating-current voltage applying means applying the alternating-current voltage to the direct-current motor, and wherein the rotation detector further comprises;
   a direct current interruption controlling means which controls the direct-current interrupting means, and applies direct-current voltage from the direct-current power source to the direct-current motor so that the alternating current superimposed voltage is applied to the direct-current motor when the direct-current motor is rotated and interrupts the application of direct-current voltage from the direct-current power source when the direct-current motor is braked.

2. The rotation detector according to claim 1, wherein the direct-current motor includes a capacitive element having a predetermined capacitance value connected in parallel with part or whole of the phase coil of at least one phase.

3. The rotation detector according to claim 1, wherein the direct-current motor includes capacitive elements different in capacitance value respectively connected to the phase coils of at least two phases, and wherein the rotational state detecting means detects the rotation direction of the direct-current motor based on the pattern of variation in the alternating-current component.

4. The rotation detector according to claim 2, wherein the direct-current motor includes the armature coils comprised of the phase coils of three phases.

5. The rotation detector according to claim 2, wherein
the direct-current motor includes the armature coils comprised of the phase coils of three phases, and wherein
the capacitive element is connected to the phase coil of any one phase.

6. The rotation detector according to claim 3, wherein
the direct-current motor includes the armature coils comprised of the phase coils of three phases, and wherein
the capacitive elements different in capacitance value are respectively connected to the phase coils of any two phases.

7. The rotation detector according to claim 2, wherein
the direct-current motor includes a ring varistor having a plurality of electrodes fixed on the rotating shaft of the direct-current motor, wherein
the commutator segments are respectively connected with any of the electrodes of the ring varistor, and wherein
the capacitive element is fixed and connected between any two of the electrodes in the ring varistor.

8. The rotation detector according to claim 1, wherein
the direct-current motor includes a ring varistor having a plurality of electrodes fixed on the rotating shaft of the direct-current motor, wherein
the commutator segments are respectively connected with any of the electrodes of the ring varistor, and wherein
the ring varistor has a capacitance on at least one pair of the electrodes that is different from capacitances on the other pairs of the electrodes.

9. The rotation detector according to claim 2, wherein
the direct-current motor includes, in addition to the capacitor, a ring varistor having a plurality of electrodes fixed on the rotating shaft of the direct-current motor, wherein
the commutator segments are respectively connected with any of the electrodes of the ring varistor, and wherein
the ring varistor has a capacitance on at least one pair of the electrodes that is different from capacitances on the other pairs of the electrodes.

10. The rotation detector according to claim 8, wherein
at least one of the electrodes of the ring varistor is formed different in size from the other electrode to provide the difference among the capacitances on the pairs of the electrodes.

11. The rotation detector according to claim 2, wherein
the capacitive element is composed of a capacitor.

12. The rotation detector according to claim 1, wherein the power supplying means further includes:
a motor driver inputted with direct-current voltage from the direct-current power source and applying this direct-current voltage to the direct-current motor to thereby drive the direct-current motor.

13. The rotation detector according to claim 1, wherein
the direct current interrupting means is comprised of a semiconductor switching element.

14. The rotation detector according to claim 1, wherein
the power supplying means further includes:
a motor driver inputted with direct-current voltage from the direct-current power source and applying this direct-current voltage to the direct-current motor to thereby drive the direct-current motor; and
the rotation detector further comprises:
a motor driver controlling means which controls the motor driver and alternately switches the polarity of the direct-current voltage applied to the direct-current motor at a predetermined frequency when the direct-current motor is braked.

15. The rotation detector according to claim 14, wherein
the frequency at which alternate switching is carried out is set to a value different from the frequency of the alternating-current voltage.

16. The rotation detector according to claim 15, wherein
the frequency at which alternate switching is carried out is set to a value smaller than the frequency of the alternating-current voltage.

17. The rotation detector according to claim 1, wherein the power supplying means further includes:
a motor driver inputted with direct-current voltage from the direct-current power source, applying this direct-current voltage to the direct-current motor to thereby drive the direct-current motor, and so configured that at least the one pair of brushes can be short-circuited to each other; and
the rotation detector further comprises:
a motor driver controlling means which controls the motor driver, and applies direct-current voltage from the direct-current power source to the direct-current motor to thereby apply the alternating current superimposed voltage to the direct-current motor when the direct-current motor is steadily rotated and carries out short circuit braking in which at least the one pair of brushes are short-circuited to each other to apply a brake when the direct-current motor is braked, and wherein
the alternating-current voltage applying means and the energization detecting means are provided on a common current path which is an energization path through which the motor current flows both in the steady rotation and in the short circuit braking among the energization paths from the direct-current power source to the direct-current motor.

18. The rotation detector according to claim 17, wherein
the alternating-current voltage applying means is provided on a first common current path extending from one brush of the two brushes comprising the one pair of brushes of the direct-current motor to the motor driver among the common current paths, and wherein
the energization detecting means is provided on a second common current path extending from the other brush of the two brushes comprising the one pair of brushes of the direct-current motor to the motor driver among the common current paths.

19. The rotation detector according to claim 17, wherein
the alternating-current voltage applying means is provided both on a first common current path extending from one brush of the two brushes comprising the one pair of brushes of the direct-current motor to the motor driver among the common current paths and on a second common current path extending from the other brush to the motor driver,
the energization detecting means is also provided both on the first common current path and on the second common current path, and wherein
the rotation detector further comprises:
an applied alternating current controlling means applying the alternating-current voltage to the direct-current motor is provided on either one of the alternating-current voltage applying means provided on the respective common current paths, wherein
the rotational state detecting means detects the rotational state based on the result of detection by either one or both of the energization detecting means provided on the respective common current paths.

20. The rotation detector according to claim 19, wherein
when the direct-current motor is in the steady rotation, the applied alternating current controlling means causes the alternating-current voltage applying means provided on one of the common current paths connected to the positive pole side of the direct-current power source to apply the alternating-current voltage and the rotational state detecting means detects the rotational state based on the result of detection by the energization detecting means provided on one of the common current paths connected to the negative pole side of the direct-current power source, and wherein
when the direct-current motor is subjected to the short circuit braking, the applied alternating current controlling means causes the other alternating-current voltage applying means different from that in the steady rotation to apply the alternating-current voltage and the rotational state detecting means detects the rotational state based on the result of detection by the other energization detecting means different from that in the steady rotation.

21. The rotation detector according to claim 19, wherein
when the direct-current motor is in the steady rotation, the applied alternating current controlling means causes the alternating-current voltage applying means provided on one of the common current paths connected to the positive pole side of the direct-current power source to apply the alternating-current voltage and the rotational state detecting means detects the rotational state based on the result of detection by the energization detecting means provided on one of the common current paths connected to the negative pole side of the direct-current power source, and wherein
also when the direct-current motor is subjected to the short circuit braking, the applied alternating current controlling means causes the same alternating-current voltage applying means as in the steady rotation to apply the alternating-current voltage and the rotational state detecting means detects the rotational state based on the result of detection by the same energization detecting means as in the steady rotation.

22. The rotation detector according to claim 17, wherein
the motor driver is formed of an H-bridge circuit comprised of a plurality of switching elements, and wherein
the switching elements comprising the H-bridge circuit are MOSFETs.

23. A rotation detector detecting a rotational state of a direct-current motor having armature coils comprised of phase coils of at least three phases, a commutator having a plurality of commutator segments with which the armature coils are connected, and at least one pair of brushes supplying a current to each of the phase coils through the commutator, the rotation detector comprising:
a power supply configured so that at least alternating current superimposed voltage obtained by superimposing alternating-current voltage on direct-current voltage can be applied to between at least the one pair of brushes of the direct-current motor;
an energization detector configured to detect a motor current passed through the direct-current motor through the brushes or path voltage, or the voltage on an energization path through which the motor current flows; and
a rotational state detector configured to detect at least any one of the rotation angle, rotation direction, and rotational speed as the rotational state of the direct-current motor based on the motor current or the alternating-current component contained in the path voltage detected by the energization detector, wherein
the direct-current motor is so configured that any two commutator segments among the commutator segments are taken as one set and the section between commutator segments in at least one set has a capacitance value different from the capacitance values of the sections between commutator segments in the other sets; wherein
the power supplying includes:
a direct-current power source configured to apply the direct-current voltage to the direct-current motor;
a direct current interrupting unit configured to interrupt the application of the direct-current voltage from the direct-current power source to the direct-current motor; and
an alternating-current voltage applying unit configured to apply the alternating-current voltage to the direct-current motor, and wherein the rotation detector further comprises:
a direct current interruption controller configured to control the direct current interrupting unit, and apply direct-current voltage from the direct-current power source to the direct-current motor so that the alternating current superimposed voltage is applied to the direct-current motor when the direct-current motor is rotated and interrupts the application of direct-current voltage from the direct-current power source when the direct-current motor is braked.

* * * * *